United States Patent
Cho et al.

(10) Patent No.: US 10,582,522 B2
(45) Date of Patent: Mar. 3, 2020

(54) DATA TRANSMISSION AND RECEPTION METHOD AND DEVICE OF TERMINAL IN WIRELESS COMMUNICATION SYSTEM

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 15/757,578

(22) PCT Filed: Sep. 4, 2015

(86) PCT No.: PCT/KR2015/009378
§ 371 (c)(1),
(2) Date: Mar. 5, 2018

(87) PCT Pub. No.: WO2017/039042
PCT Pub. Date: Mar. 9, 2017

(65) Prior Publication Data
US 2018/0249479 A1  Aug. 30, 2018

(51) Int. Cl.
*H04W 72/12*  (2009.01)
*H04W 12/08*  (2009.01)
(Continued)

(52) U.S. Cl.
CPC ......... *H04W 72/12* (2013.01); *H04L 63/0428* (2013.01); *H04W 12/06* (2013.01);
(Continued)

(58) Field of Classification Search
CPC ..... H04W 72/12; H04W 12/06; H04W 12/08; H04W 48/14; H04W 76/00; H04W 74/0833
See application file for complete search history.

(56) References Cited

U.S. PATENT DOCUMENTS

| 2014/0036685 A1* | 2/2014 | Kim | H04W 48/20 370/236 |
| 2014/0226607 A1 | 8/2014 | Holma et al. | |
| 2016/0066316 A1* | 3/2016 | Bhushan | H04W 72/0446 370/329 |

FOREIGN PATENT DOCUMENTS

WO  20150129985 A1  9/2015

OTHER PUBLICATIONS

"Protocol Impact of Fast Uplink Access Solution for Latency Reduction"; Intel Corporation; R2-153294, 3GPP TSG-RAN WG2 Meeting #91, pp. 1-3; Aug. 15, 2015.
(Continued)

*Primary Examiner* — Kent Krueger
(74) *Attorney, Agent, or Firm* — Dentons US LLP

(57) ABSTRACT

The present invention relates to a method and apparatus for transmitting and receiving data in a wireless communication system supporting a low latency service. According to the present invention, a terminal transmits a request message for requesting transmission of data to provide the low latency service in an idle state to a base station, and in response to the request message, receives a response message including resource information related to transmission and reception of low latency service data from the base station, thereby when additional data is generated for providing the low latency service for transmitting and receiving the low latency service data, the additional resources may be extended to transmit the additional data.

20 Claims, 37 Drawing Sheets

(51) Int. Cl.

| | | |
|---|---|---|
| *H04W 12/10* | (2009.01) | |
| *H04W 76/00* | (2018.01) | |
| *H04L 29/06* | (2006.01) | |
| *H04W 48/14* | (2009.01) | |
| *H04W 12/06* | (2009.01) | |
| *H04W 74/08* | (2009.01) | |

(52) U.S. Cl.
CPC ........... *H04W 12/08* (2013.01); *H04W 12/10* (2013.01); *H04W 48/14* (2013.01); *H04W 72/1268* (2013.01); *H04W 76/00* (2013.01); *H04W 72/1278* (2013.01); *H04W 74/0833* (2013.01)

(56) References Cited

OTHER PUBLICATIONS

"Uplink Latency Reduction for Synchronized UEs"; Huawei, et al.; R2-153374, 3GPP TSG-RAN WG2 Meeting #91, pp. 1-4; Aug. 14, 2015.

"L2 Enhancements to Reduce Latency"; Ericsson; R2-153490, 3GPP TSG-RAN WG2 Meeting #91, pp. 1-4; Aug. 14, 2015.

\* cited by examiner

DATA TRANSMISSION AND RECEPTION METHOD AND DEVICE OF TERMINAL IN WIRELESS COMMUNICATION SYSTEM

This application is a 35 USC § 371 National Stage entry of International Application No. PCT/KR2015/009378, filed on Sep. 4, 2015, which is incorporated by reference in its entirety herein.

The present relates to a method of transmitting and receiving data of a terminal in a wireless communication system, and more particularly, to a method in which a terminal transmits and receives data for providing a low latency service in an idle state and an apparatus that supports the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

The present invention has an object to provide a method of transmitting/receiving data of a terminal in an idle state in a wireless communication system.

Furthermore, it is another object of the present invention to provide a method for transmitting/receiving data without transition to a connected state when emergency data to be transmitted/received by a terminal in an idle state is generated in a wireless communication system.

Furthermore, it is another object of the present invention to provide a method for transmitting/receiving additional data when additional data is generated while a terminal in an idle state transmits data in a wireless communication system.

Furthermore, it is another object of the present invention to provide a method for transmitting/receiving additional data when additional data is generated while a terminal in an idle state receives data in a wireless communication system.

The technical problems to be solved by the present invention are not limited to the above-mentioned technical problems and other technical problems which are not mentioned can be clearly understood by those skilled in the art in the technical field in which the present invention is pertained from the following description.

Technical Solution

In order to solve the above-described problems, the present invention provides a method and apparatus for transmitting and receiving data in a wireless communication system.

Specifically, a method of transmitting and receiving data in an embodiment of the present invention, comprises receiving system information from a base station; performing a random access procedure with the base station based on the system information; transmitting a request message requesting transmission of first data for a low latency service to the base station through a resource allocated from the random access procedure; receiving a response message including first resource information for transmission of the first data in response to the request message; transmitting a transmission message including the first data to the base station based on the first resource information, wherein the transmission message further includes data information indicating second data for providing the low latency service; receiving second resource information for transmission of the second data from the base station; and transmitting the second data based on the second resource information, and the method is performed in an idle state of the terminal.

Further, in the present invention, the request message further includes a first Quality of Service (QoS) Information Element (IE) field indicating a characteristic of the first data, and the data information includes at least one of a request time point field indicating an extension request time point of the release time of the identifier for identifying the terminal by the base station, a cause field indicating a reason, or a second QoSIE field indicating a characteristic of the second data.

Further, in the present invention, the system information includes at least one of a support field indicating whether the base station supports transmission and reception of the low latency service data in an idle state of the terminal, or a security algorithm field indicating the security algorithm field which the base station supports.

Further, in the present invention, the security algorithm field includes at least one of an encryption algorithm supported by the base station for encrypting the transmission message or an integrity algorithm for verifying whether the transmission message has been changed.

Further, in the present invention, the request message includes at least one of a UE ID IE field indicating the terminal or a Tx indicator field indicating transmission and reception of the first data.

Further, in the present invention, the transmission message further includes a security information element field for determining a validity of the terminal.

Further, in the present invention, the security information includes at least one of a security header type field indicating whether the transmission message is encrypted or integrity protection is applied to determine whether the transmission message is changed or damaged or an authentication code for determining whether the low latency service data has been changed.

Further, the present invention further comprises receiving a first result message including at least one of a first result field indicating a result of transmission of the first data or an extension time information indicating an extension time of a release time point of an identifier for identifying the terminal by the base station; and receiving a second result message including a second result field indicating a result of transmission of the second data during the extension time.

Further, the present invention comprises transmitting system information to a terminal; performing a random access procedure with the terminal based on the system information; receiving a request message requesting transmission of first data for a low latency service from the terminal using a resource allocated to the terminal through the random access procedure; transmitting a response message including first resource information for transmission of the first data in response to the request message; receiving a transmission message including the first data from the base station based on the first resource information, wherein the transmission message further includes data information indicating second data for providing the low latency service; transmitting second resource information for transmission of the second data to the terminal; and receiving the second data from the terminal based on the second resource information, and the method provides a method performed in an idle state of the terminal.

Further, in the present invention, the request message further includes a first Quality of Service (QoS) Information Element (IE) field indicating a characteristic of the first data, and the data information includes at least one of a request time point field indicating an extension request time point of the release time of the identifier for identifying the terminal by the base station, a cause field indicating a reason, or a second QoSIE field indicating a characteristic of the second data.

Further, in the present invention, the system information includes at least one of a support field indicating whether the base station supports transmission and reception of the low latency service data in an idle state of the terminal, or a security algorithm field indicating the security algorithm field which the base station supports.

Further, in the present invention, the security algorithm field includes at least one of an encryption algorithm supported by the base station for encrypting the transmission message or an integrity algorithm for verifying whether the transmission message has been changed.

Further, in the present invention, the request message includes at least one of a UE ID IE field indicating the terminal or a Tx indicator field indicating transmission and reception of the first data.

Further, in the present invention, the transmission message further includes a security information element field for determining a validity of the terminal.

Further, in the present invention, the security information includes a security header type field indicating whether the transmission message is encrypted or integrity protection is applied to determine whether the transmission message is changed or damaged or an authentication code for determining whether the low latency service data has been changed.

Further, the present invention further comprises transmitting a data transmission request message including the first data to a Mobility Management Entity (MME); receiving a data transmission response message from the MME in response to the data transmission request message; and transmitting the second data to the MME or gateway.

Further, the present invention further comprises when transmitting the second data to the MME, receiving a transmission result message including a transmission result field indicating a transmission result of the second data from the MME.

Further, in the present invention, when transmitting the second data to the gateway, the transmission message further includes at least one of an EPS Bearer ID for identifying a session of the second data or a data size field indicating a size of the second data.

Further, the present invention provides a terminal comprising a communication configured to transmit and receive a radio signal with external; and a processor operatively coupled to the communication unit, wherein the processor controls to receive system information from a base station; perform a random access procedure with the base station based on the system information; transmit a request message requesting transmission of first data for a low latency service to the base station through a resource allocated from the random access procedure; receive a response message including first resource information for transmission of the first data in response to the request message; transmit a transmission message including the first data to the base station based on the first resource information, wherein the transmission message further includes data information indicating second data for providing the low latency service; receive second resource information for transmission of the second data from the base station; and transmit the second data based on the second resource information, and wherein the terminal provides a terminal in an idle state.

Further, the present invention provides a base station comprising a communication configured to transmit and receive a radio signal with external; and a processor operatively coupled to the communication unit, wherein the processor controls to transmit system information to a terminal; perform a random access procedure with the terminal based on the system information; receive a request message requesting transmission of first data for a low latency service from the terminal using a resource allocated to the terminal through the random access procedure; transmitting a response message including first resource information for transmission of the first data in response to the request message; receive a transmission message including the first data from the base station based on the first resource information, wherein the transmission message further includes data information indicating second data for providing the low latency service; transmit second resource information for transmission of the second data to the terminal; and receive the second data from the terminal based on the second resource information, and wherein the terminal is in an idle state.

Advantageous Effects

The present invention has an effect that a terminal supporting a low latency service can transmit and receive data in an idle state.

Furthermore, the present invention has an effect that when a terminal supporting a low latency service generates data for providing emergency data or a low delay service in an idle state, the data for providing the emergency data or low delay service can be transmitted/received.

Furthermore, the present invention has an effect that when additional data is generated while a terminal supporting a low latency service transmits and receives data in an idle state, the additional data can be transmitted and received by extending the release time of the allocated resource without transition to a connection state.

The effects that can be obtained in the present specification are not limited to the effects mentioned above, and other effects not mentioned can be clearly understood by those skilled in the art in which the present invention is pertained from the following description will be.

MODE FOR INVENTION

Figure 1:
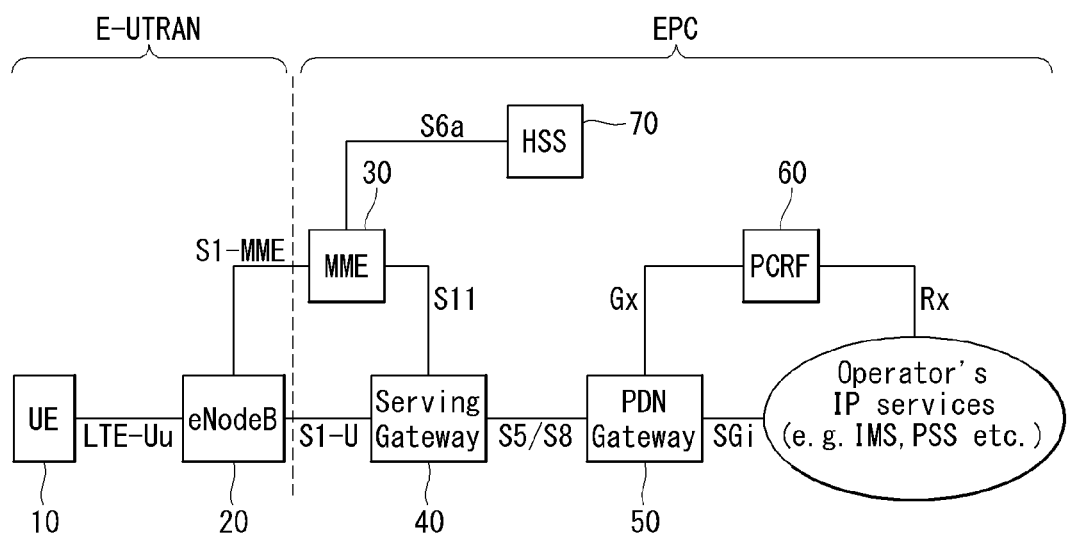
FIG. 1 illustrates an Evolved Packet System which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a message, frame, a signal, field and an apparatus are not limited to each of the names as for the purpose of explaining the invention, and may be replaced with a other message, other frame, a other signal, other field and a other apparatus that performs the same function.

In the embodiments of the present invention, the enhanced Node B (eNodeB or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

Further, a 'terminal' may be fixed or may have mobility and may be replaced with a term such as a User Equipment (UE), Mobile Station (MS), user terminal (UT), Mobile Subscriber Station (MSS), Subscriber Station (SS), Advanced Mobile Station (AMS), Wireless terminal (WT), Machine-Type Communication (MTC) device, Machine-to-Machine (M2M) device, and Device-to-Device (D2D) device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 illustrates an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also referred to as a Home Location Register (HLR) and includes SAE subscription data including information about access control for roaming and an EPS-subscribed QoS profile. Further, the HSS 70 also includes information about a PDN to which the user accesses. Such information may be maintained in an Access Point Name (APN) form, and the APN is an identification technique that describes a PDN address representing an access point of the PDN or a subscribed IP address with a Domain Name system (DNS)-based label.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
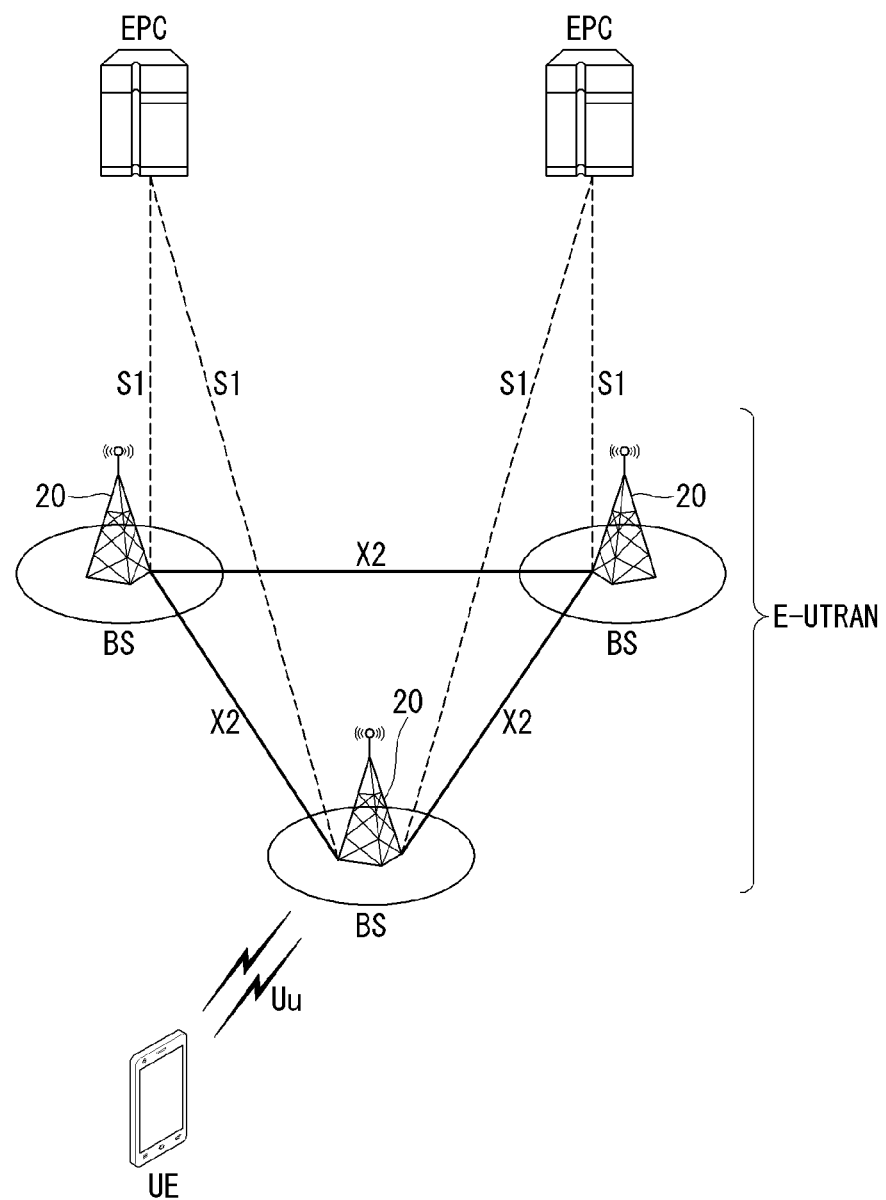
FIG. 2 illustrates a wireless communication system to which the present invention is applied.

FIG. 2 illustrates a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
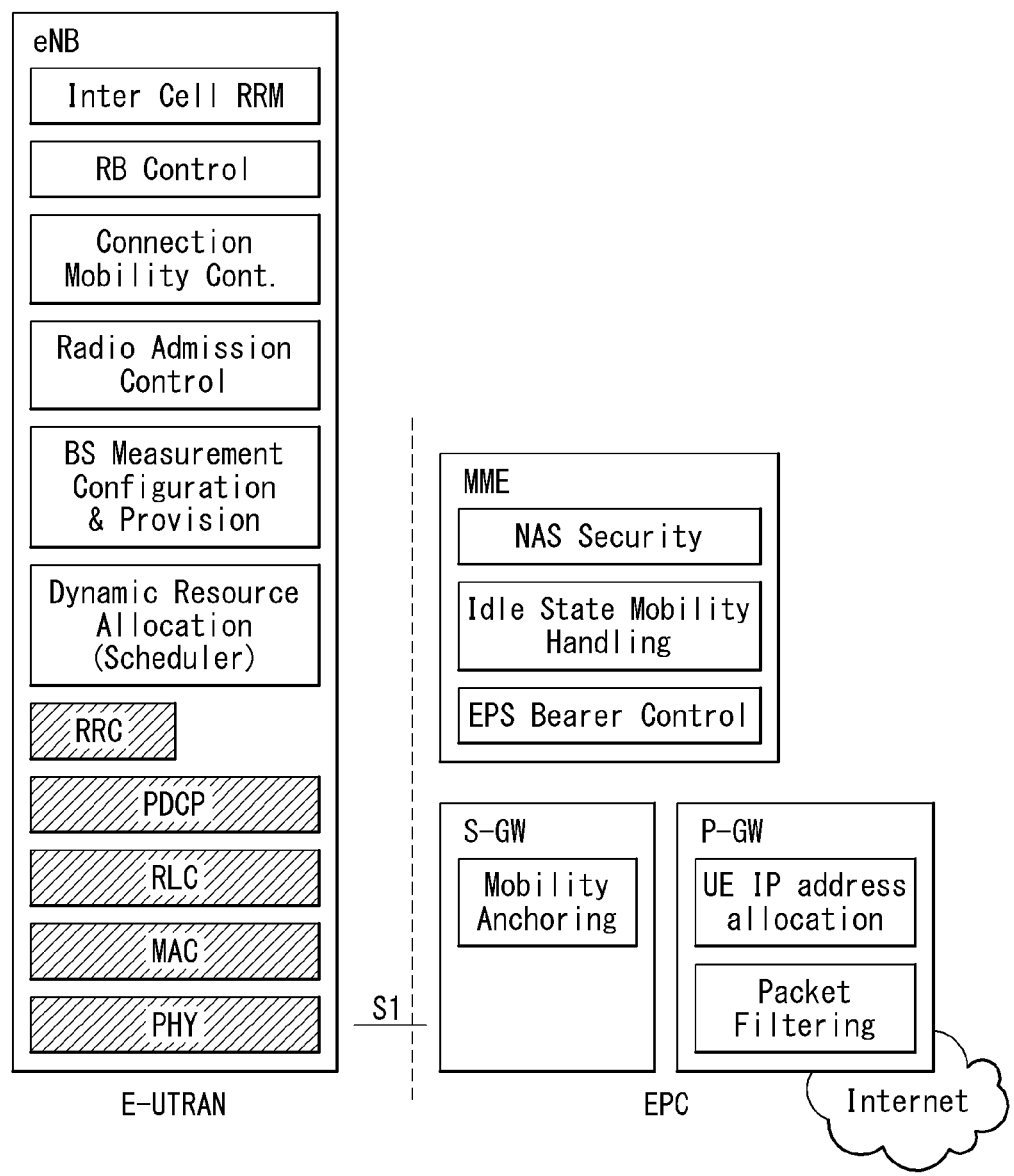
FIG. 3 illustrates a functional split of an E-UTRAN and an EPC to which the present invention can be applied.

FIG. 3 illustrates a functional split of an E-UTRAN and an EPC to which the present invention can be applied.

Referring to FIG. 3, a slashed block represents a radio protocol layer, and an empty block represents a functional entity of a control plane.

The base station performs the following functions. (1) a Radio Resource Management (RRM) function such as Radio Bearer Control, Radio Admission Control, Connection Mobility Control, and dynamic resource allocation to the terminal, (2) Internet Protocol (IP) header compression and encryption of user data stream, (3) routing of user plane data to S-GW, (4) scheduling and transmission of a paging message, (5) scheduling and transmission of broadcast information, and (6) measurement and measurement report setup for mobility and scheduling.

The MME performs the following functions. (1) Distribution of a paging message to base stations, (2) Security Control, (3) Idle State Mobility Control, (4) SAE bearer control, and (5) Integrity Protection and Ciphering of Non-Access Stratum (NAS) signaling.

The S-GW performs the following functions. (1) Termination of a user plane packet of paging, and (2) user plane switching for supporting terminal mobility.

Figure 4:
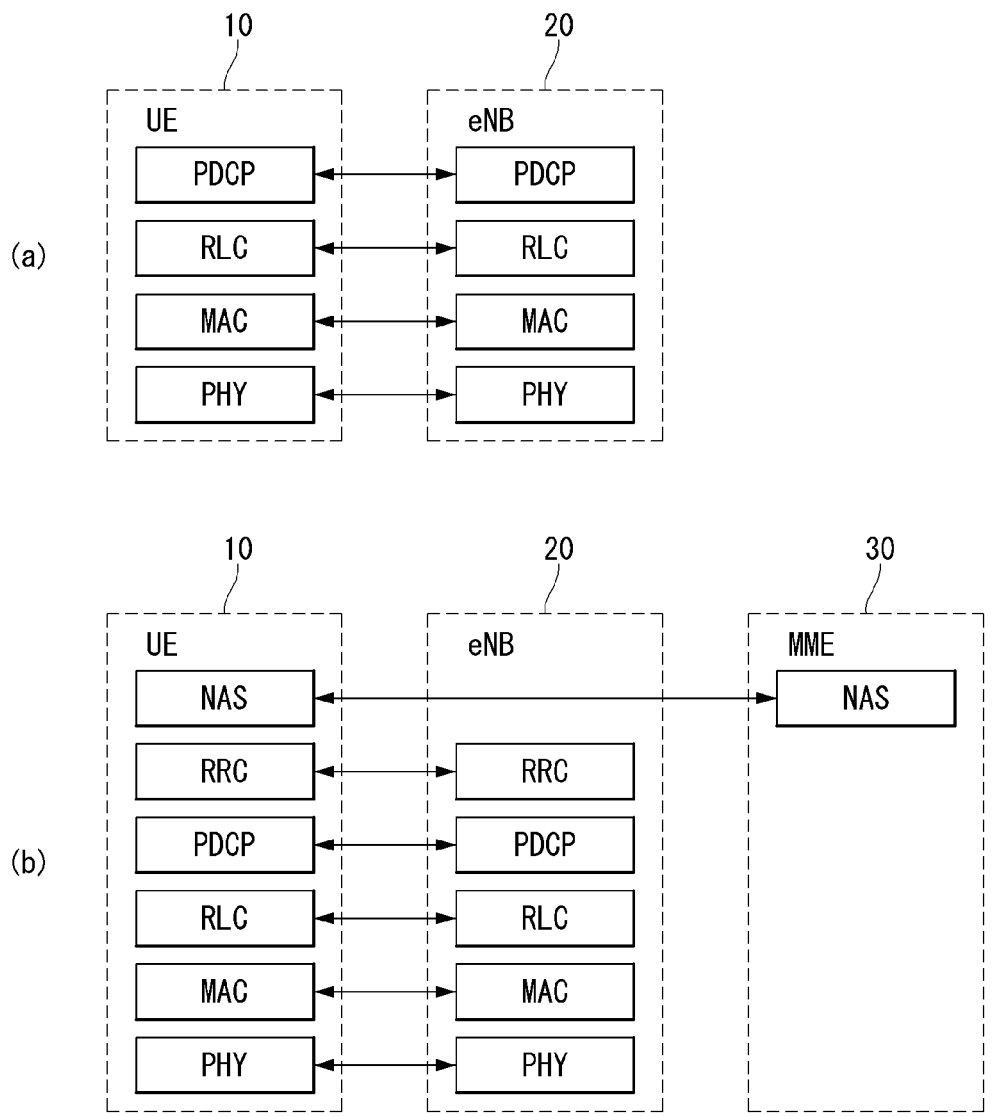
FIG. 4 is a block diagram illustrating an example of a radio protocol architecture to which a technical characteristic of the present invention may be applied.

FIG. 4 is a block diagram illustrating an example of a radio protocol architecture to which a technical characteristic of the present invention may be applied.

FIG. 4(*a*) is a block diagram illustrating an example of a radio protocol architecture of a user plane, and FIG. 4(*b*) is a block diagram illustrating an example of a radio protocol architecture of a control plane.

The user plane is a protocol stack for transmitting user data, and the control plane is a protocol stack for transmitting a control signal.

Referring to FIGS. 4(*a*) and 4(*b*), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Figure 5:
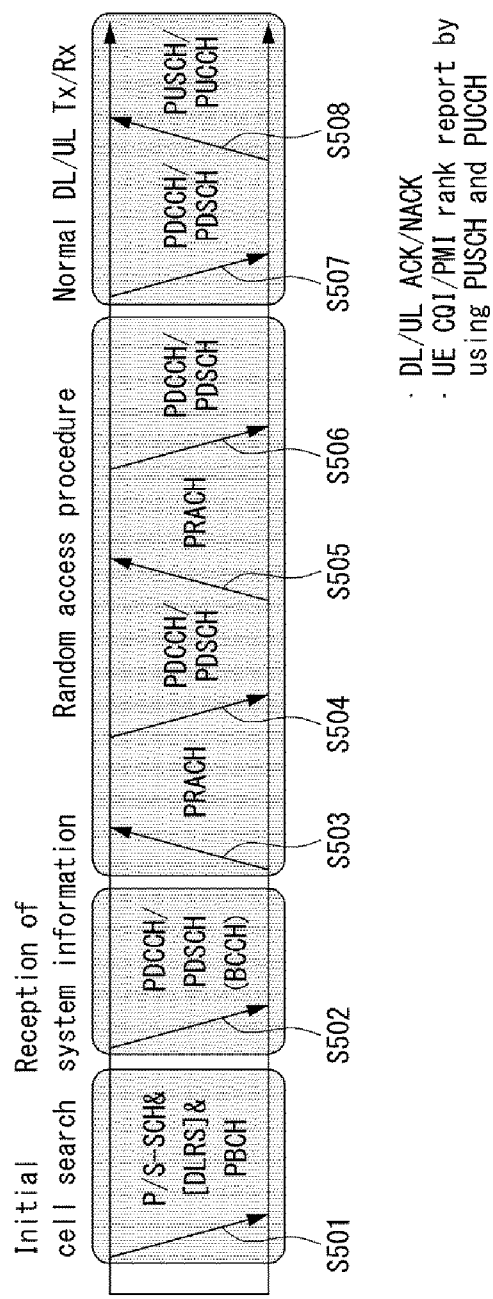
FIG. 5 illustrates physical channels used for the 3GPP LTE/LTE-A system to which the present invention can be applied and a general signal transmission method using the physical channels.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Figure 6:
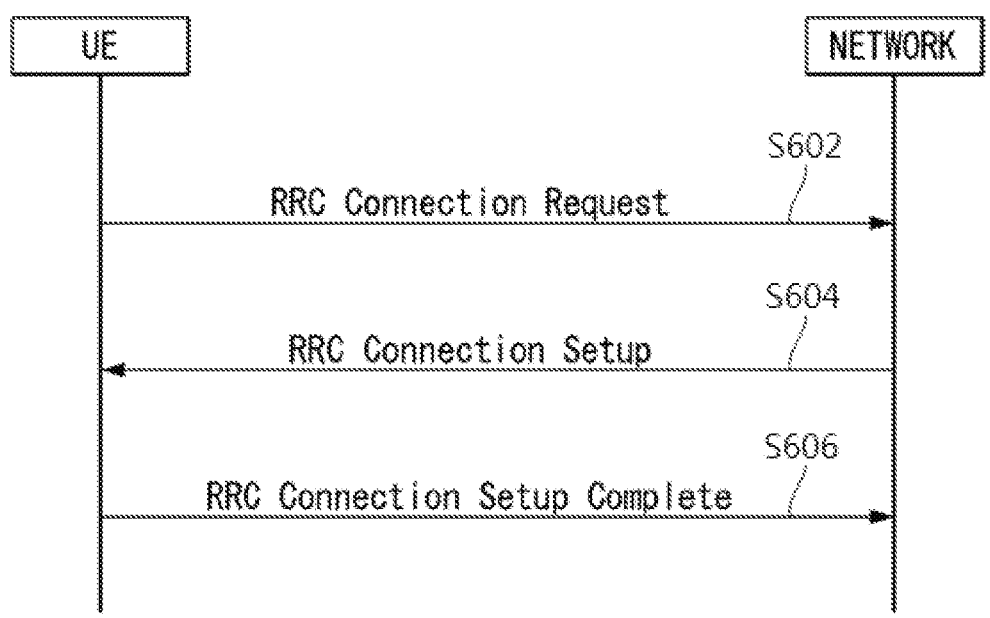
FIG. 6 is a flowchart illustrating a process of establishing an RRC connection to which the present invention may be applied.

FIG. 6 is a flowchart illustrating a process of establishing an RRC connection to which the present invention may be applied.

An RRC state represents whether an RRC layer of the UE is logically connected to an RRC layer of the E-UTRAN, and a state in which an RRC layer of the UE is logically connected to an RRC layer of the E-UTRAN is referred to as an RRC connected state, and a state in which an RRC layer of the UE is not logically connected to an RRC layer of the E-UTRAN is referred to as an RRC idle state. In the UE of an RRC connected state, because an RRC connection exists, the E-UTRAN may determine in a cell unit whether a corresponding UE exists, thereby effectively controlling the UE.

However, the E-UTRAN may not determine the UE in an RRC idle state, but a core network (CN) manages the UE in an RRC idle state in a tracking area unit, which is an area unit larger than a cell. That is, it is determined only whether the UE in an RRC idle state exists in a large area unit, and in order to receive a common mobile communication service such as voice or data, the UE should be changed to an RRC connected state.

When a user turns on power of the UE, the UE first searches for an appropriate cell and stays an RRC idle state in the corresponding cell. When it is necessary that the UE in an RRC idle state performs an RRC connection, the UE establishes an RRC connection with the E-UTRAN through an RRC connection procedure and is changed to an RRC connected state. Several cases in which the UE in an RRC idle state should perform an RRC connection may include, for example, a case in which uplink data transmission is required with the reason such as a user's call attempt or a case of transmission of a response message when the UE receives a paging message from the E-UTRAN.

A non-access stratum (NAS) layer located at a superordinate layer of an RRC layer performs a function of session management and mobility management.

In the NAS layer, in order to manage mobility of the UE, two states of EPS Mobility Management-REGISTERED (EMM-REGISTERED) and EMM-DEREGISTERED are defined and are applied to the UE and the MME. An initial UE is in an EMM-DEREGISTERED state, and in order to access to the network, the UE performs a process of registering at the corresponding network through an initial attach procedure. When the attach procedure is successfully performed, the UE and the MME become an EMM-REGISTERED state.

In order to manage signaling connection between the UE and an EPC, two states of an EPS Connection Management (ECM)-IDLE state and an ECM-CONNECTED state are defined and are applied to the UE and the MME. When the UE of an ECM-IDLE state is RRC-connected with the E-UTRAN, the corresponding UE becomes an ECM-CONNECTED state.

When the MME in an ECM-IDLE state is S1-connected with E-UTRAN, the MME becomes an ECM-CONNECTED state. When the UE is in an ECM-IDLE state, the E-UTRAN does not have context information of the UE. Therefore, the UE in an ECM-IDLE state performs a UE-based mobility related procedure such as cell selection or cell reselection without necessity to receive a command of the network. However, when the UE is in an ECM-CONNECTED state, mobility of the UE is managed by a command of the network. In an ECM-IDLE state, when a location of the UE is different from a location in which the network knows, the UE notifies the network of a corresponding location thereof through a tracking area update procedure.

Hereinafter, system information will be described.

The system information includes indispensable information in which the UE should know in order to access to the eNB. Therefore, before the UE accesses to the eNB, the UE should receive the entire system information and always have update system information. Because the system information is information in which all UEs within one cell should know, the eNB periodically transmits the system information.

According to a chapter 5.2.2 of 3GPP TS 36.331 V8.7.0 (2009-September) "Radio Resource Control (RRC); Protocol specification (Release 8)", the system information is divided into a Master Information Block (MIB), a Scheduling Block (SB), and a System Information Block (SIB). The MIB enables the UE to know a physical configuration, for example, a bandwidth of a corresponding cell. The SB notifies transmission information, for example, a transmission cycle of SIBs. The SIB is an assembly of related system information. For example, any SIB includes only information of a peripheral cell and includes only information of an uplink radio channel in which the UE uses.

In order to enter from an RRC idle state to an RRC connected state, the UE transmits an RRC connection request message that requests connection to the network (S602). The network transmits an RRC connection setup message to the UE in response to the RRC connection request (S604). The UE receives the RRC connection setup message and enters an RRC connected state.

The UE transmits an RRC connection setup complete message used for determining successful completion of RRC connection establishment to the network (S606).

However, when the network may not perform an RRC connection, the network transmits an RRC connection reject message to the UE in response to the RRC connection request.

Figure 7:
FIG. 7 is a flowchart illustrating a method of transmitting a Non Access Stratum (NAS) message to which the present invention may be applied.

FIG. 7 is a flowchart illustrating a method of transmitting a Non Access Stratum (NAS) message to which the present invention may be applied.

Referring to FIG. 7, the NAS message may be included in an Information Element (IE) of an initial UE message, a Downlink NAS Transport Message, or an Uplink NAS Transport Message to be transmitted to the MME (S702).

The NAS Transport is required for transmitting signaling between the UE and the MME through an S1 interface, and when the S1 interface is not connected, a procedure that sets the S1 interface may be first performed.

In this way, the UE may transmit Tracking Area Update (TAU) or a service request to the MME through the eNB and an initial UE message, which is the NAS message.

Figure 8:
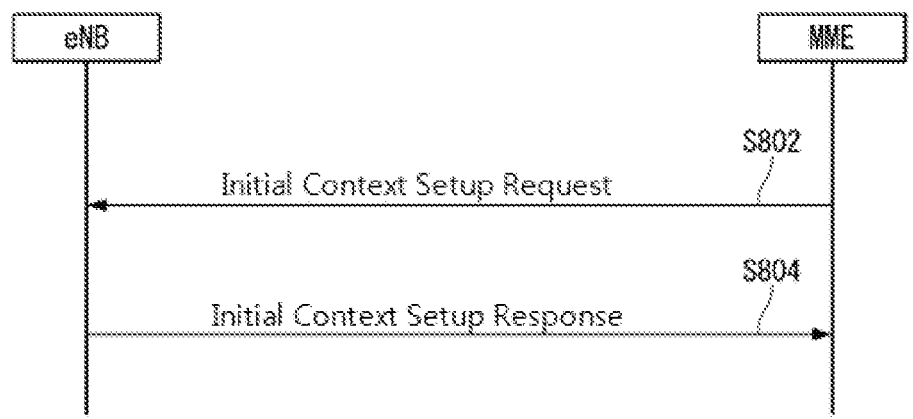
FIG. 8 is a flowchart illustrating an initial context setup method to which the present invention may be applied.

FIG. 8 is a flowchart illustrating an initial context setup method to which the present invention may be applied.

The initial context setup procedure is required for setting necessary entire UE context information, and the UE context information may include an E-RAB context, security key, Handover Restriction List, UE Radio Capability, and/or UE Security Capability. That is, the context information (or UE context information) may include overall information of the UE.

In this case, when the MME has such information, the UE Radio Capability information may be transmitted and thus when the MME does not initially know the UE, the UE Radio Capability information may not be transmitted.

For the initial context setup, the MME may transmit an initial context setup request message to the eNB (S802).

The eNB, having received the initial context setup request message transmits an initial context setup response in response to the initial context setup request message to the MME (S804) and performs an initial context setup procedure.

Figure 9:
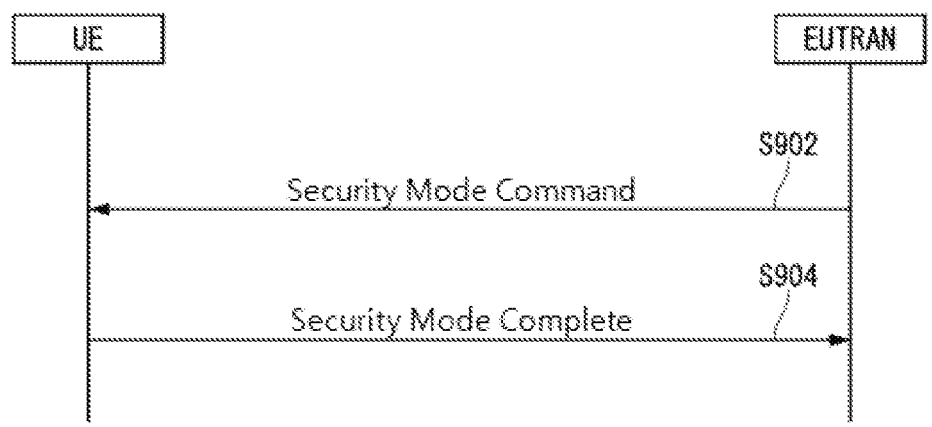
FIGS. 9 and 10 are a flowchart and a diagram, respectively, illustrating an example of a security key that may be used in an initial security activation and security procedure to which the present invention may be applied.
Figure 10:
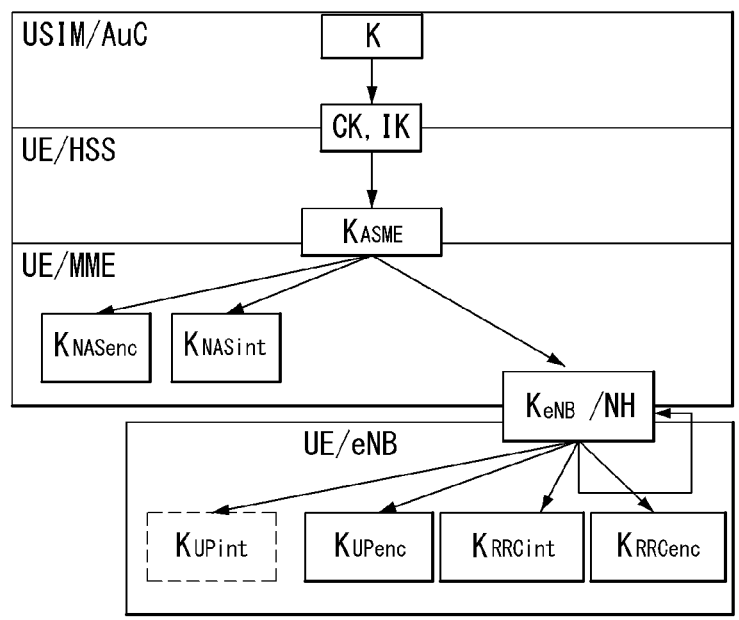

FIGS. 9 and 10 are a flowchart and a diagram, respectively, illustrating an example of a security key that may be used in an initial security activation and security procedure to which the present invention may be applied.

Referring to FIGS. 9 and 10, when the UE accesses to the network, an authentication procedure that determines whether the UE is a UE that may be accessed to the network is performed, and after the authentication procedure, in order to safely transfer data at Non Access Stratum (NAS) and Access Stratum (AS) segments, a security key is generated. Hereinafter, each procedure will be described in detail.

UE Authentication Procedure

The UE accesses to the network and requests access to the MME, and the MME, having received the access request from the UE identifies a corresponding UE with an IMSI and requests an authentication vector for authenticating the UE to the HSS.

The HSS generates an authentication vector AV(s)={RAND, XRES, AUTNHSS, $K_{ASME}$} using EPS Authentication and Key Agreement (AKA) algorithm based on the International Mobile Subscriber Identity (IMSI) and transmits the authentication vector AV(s)={RAND, XRES, AUTNHSS, $K_{ASME}$} to the MME.

The MME stores the authentication vectors and selects one of the authentication vectors to perform mutual authentication with the UE. The MME transmits an RAND value and an $AUTN_{HSS}$ value of the selected authentication vector to the UE, and the UE performs EPS AKA algorithm using the received value and generates RES, $AUTN_{UE}$, and $K_{ASME}$ of FIG. 10.

The UE compares the generated $AUTN_{UE}$ value and the AUTNHSS value received from the MME to authenticate a network, and when network authentication is succeeded, the UE transmits the RES value to the MME. The MME compares XRES received from the HSS and the RES received from the UE to authenticate the UE. When mutual authentication is terminated, the UE and the MME have the same $K_{ASME}$.

NAS Security

When the UE and the MME terminate the mutual authentication and share the $K_{ASME}$, a NAS security setup procedure is started. The NAS Security procedure is a procedure that generates NAS security Keys for safely transmitting the NAS message with the $K_{ASME}$.

First, the MME selects NAS Security algorithms to generate an integrity key $K_{NASint}$ and an ciphering key $K_{NASenc}$ with the $K_{ASME}$.

The integrity key is a key for integrity check/protection, and the integrity check/protection is for checking whether the transmitted/received message is altered or a transmitter is valid.

The encryption key is a key for encrypting the contents of a message, and the transmitter transmits the contents of message by encrypting it using a key value and an algorithm of the transmitter, and a receiver can reconstruct the message with the same algorithm and the same key.

Thereafter, the MME applies the KNASint to a security mode command message to generate the NAS message authentication code (NAS-MAC: Message Authentication Code for NAS for Integrity).

The MME transmits the security mode command message including the selected NAS Security algorithms and the authentication code to the UE. In this case, because the UE does not know ciphering information, only integrity protection is performed and the security mode command message is transferred.

The UE receives the security mode command message, verifies integrity of the received message using the selected NAS integrity algorithm, and generates NAS security keys ($K_{NASint}$ and $K_{NASenc}$) with the $K_{ASME}$ using NAS integrity/ciphering algorithm.

Thereafter, the UE applies and encodes the $K_{NASenc}$ to the security mode complete message, applies the $K_{NASint}$ to the ciphered message to generate NAS-MAC, which is a message authentication code, includes the NAS-MAC in the security mode complete message, and transmits the security mode complete message to the MME.

The MME receives the security mode complete message, and when integrity verification and decoding are succeeded using the NAS security keys ($K_{NASint}$ and $K_{NASenc}$), NAS security setup is successfully terminated.

AS Security Procedure

When a NAS Security setup procedure is terminated, an AS Security setup procedure between the UE and the eNB is performed. The MME calculates KeNB with the KASME and transmits the KeNB to the eNB, and the eNB performs an AS security setup procedure using the KeNB.

The eNB selects AS security algorithms (Alg-ID: Algorithm ID), obtains a ciphering key $K_{RRCenc}$ and an integrity key $K_{RRCint}$ to use for an RRC signaling message from the $K_{eNB}$, and generates an ciphering key $K_{UPenc}$ to use in a user plane. Further, the eNB applies the $K_{RRCint}$ to the security mode command message to generate a Message Authentication Code for Integrity (MAC-I).

Thereafter, the eNB transmits a security mode command message including the selected AS security algorithms and the message authentication code to the UE (S902).

The UE receives the security mode command message from the eNB, verifies integrity of the security mode command message using AS integrity algorithm selected by the eNB, and generates AS security keys ($K_{RRCint}$, $K_{RRCenc}$, $K_{UPenc}$) using AS integrity/ciphering algorithm.

Hereinafter, a key used for encryption in the embodiment of the present invention may generate a new key from the $K_{ASME}$ and the $K_{eNB}$ in order to transmit/receive data in an idle state or use the $K_{UPenc}$ or $K_{RRCenc}$, a key used for integrity protection may generate a new key from the $K_{ASME}$ and the $K_{eNB}$ in order to transmit/receive data in an idle state or use the $K_{RRCint}$.

Thereafter, by applying the RRC integrity key to the security mode complete message, the UE generates MAC-I, which is a message authentication code, and includes the authentication code in the security mode complete message to transmit the security mode complete message to the eNB (S904).

When the eNB succeeds integrity verification of the received security mode complete message using the AS integrity key, AS security setup is successfully terminated.

The present invention suggests a method of generating a new ciphering key and an integrity key using the security keys or the $K_{ASME}$ and enabling the UE and the MME to transmit and receive data.

Figure 11:
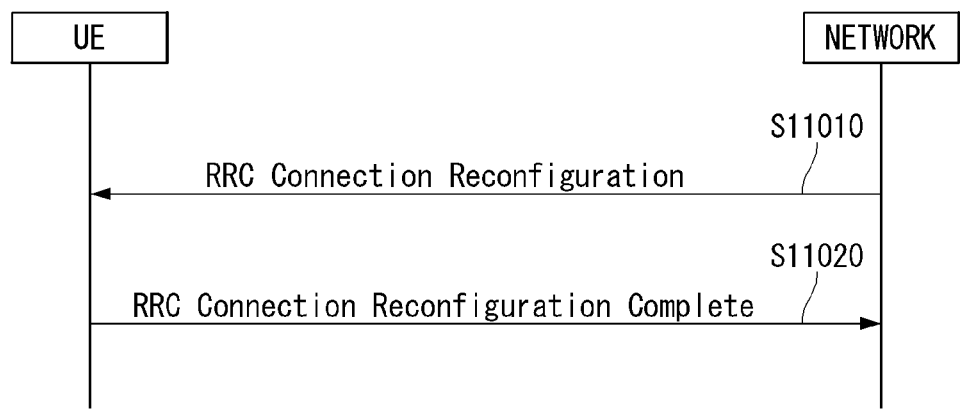
FIG. 11 is a flowchart illustrating an RRC connection reconfiguration process to which the present invention may be applied.

FIG. 11 is a flowchart illustrating an RRC connection reconfiguration process to which the present invention may be applied.

The RRC connection reconfiguration is used for modifying an RRC connection. The RRC connection reconfiguration is used for RB establishment/modify/release, handover execution, and measurement setup/modify/release.

The network transmits an RRC connection reconfiguration message for modifying an RRC connection to the UE (S1102). The UE transmits an RRC connection reconfiguration complete message used for determining successful completion of an RRC connection reconfiguration to the network in response to the RRC connection reconfiguration (S1104).

Hereinafter, an RRC connection re-establishment procedure will be described.

Figure 12:
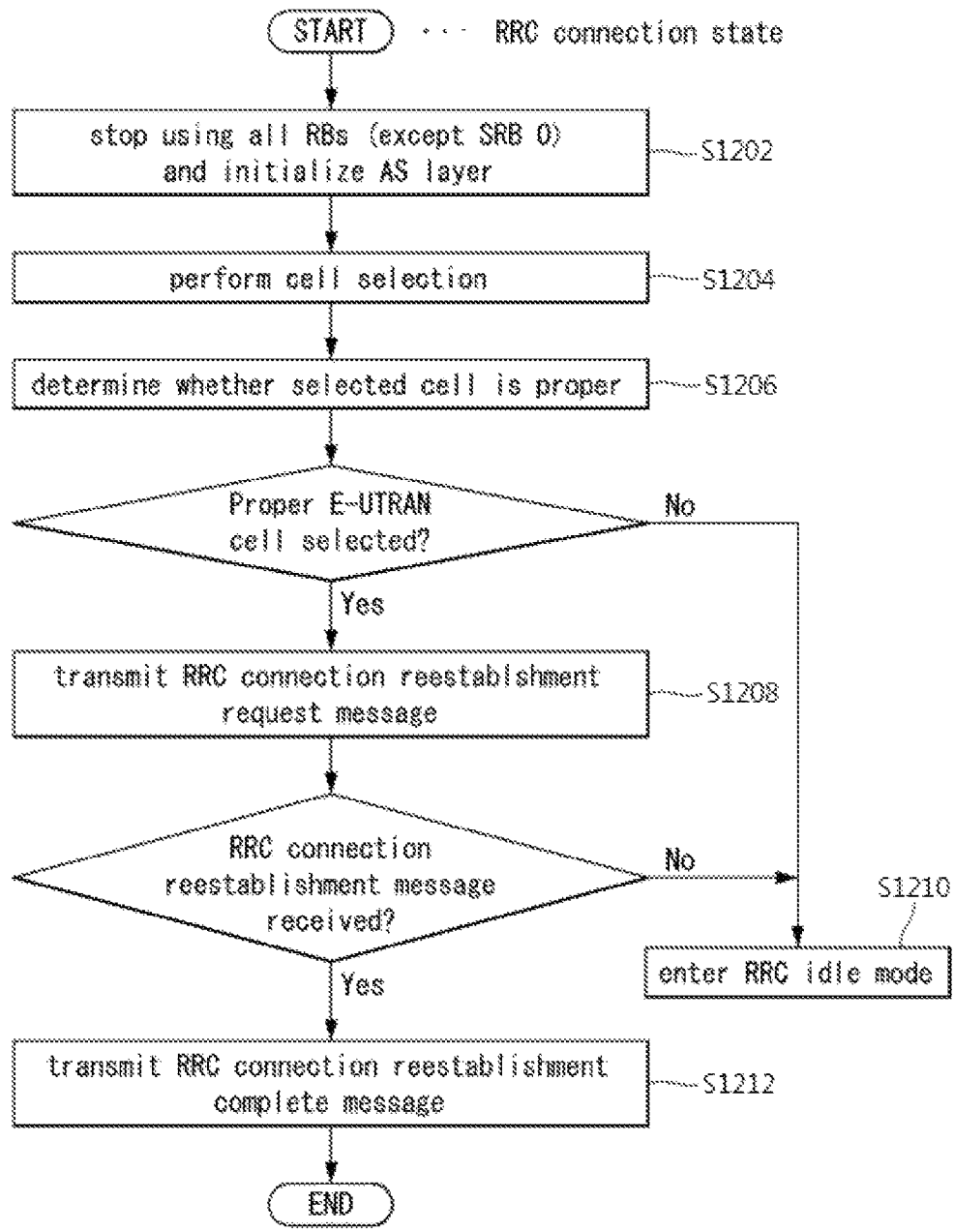
FIG. 12 is a flowchart illustrating an example of an RRC connection re-establishment procedure to which the present invention may be applied.

FIG. 12 is a flowchart illustrating an example of an RRC connection re-establishment procedure to which the present invention may be applied.

Referring to FIG. 12, the UE stops use of preset entire radio bearer, except for Signaling Radio Bearer (SRB 0) and initializes various sub-layers of Access Stratum (AS) (S1202).

Further, the UE sets each sub-layer and physical layer to a default configuration. In such a process, the UE maintains an RRC connected state.

The UE performs a cell selection procedure for performing an RRC connection re-establishment procedure (S1204). A cell selection procedure among an RRC connection re-establishment procedure may be performed to correspond with a cell selection procedure in which the UE performs in an RRC idle state, even when the UE maintains an RRC connected state.

The UE performs a cell selection procedure, determines system information of a corresponding cell, and determines whether the corresponding cell is an appropriate cell (S1206). When the selected cell is an appropriate E-UTRAN cell, the UE transmits an RRC connection re-establishment request message to the corresponding cell (S1208).

When a cell selected through a cell selection procedure for performing an RRC connection re-establishment procedure is a cell using another RAT other than an E-UTRAN, the UE stops an RRC connection re-establishment procedure and enters an RRC idle state (S1210).

The UE may be implemented to finish appropriateness determination of the cell within a limited time through a cell selection procedure and reception of system information of the selected cell. For this reason, the UE may start an RRC connection re-establishment procedure to run a timer. When the UE selects an appropriate cell, the timer may be stopped.

When the timer is terminated, the UE may regard that an RRC connection re-establishment procedure was failed and enter an RRC idle state. Hereinafter, the timer is referred to as a radio link failure timer. In LTE spec TS36.331, a timer named as T311 may be used as a radio link failure timer. The UE may acquire a setup value thereof from system information of a serving cell.

When the cell receives an RRC connection re-establishment request message from the UE and allows a request, the cell transmits an RRC connection re-establishment message to the UE.

The UE, having received the RRC connection re-establishment message from the cell reconfigures a PDCP sub-layer and an RLC sub-layer of SRB1. Further, the UE again calculates various key values related to security setup and reconfigures the PDCP sub-layer that performs security with newly calculated security key values.

Thereby, SRB 1 between the UE and the cell is opened and an RRC control message may be given and received. The UE completes restart of SRB1 and transmits an RRC connection re-establishment complete message in which an RRC connection re-establishment procedure has been complete to the cell (S1212).

However, when the UE receives an RRC connection re-establishment request message from the UE and does not allow the request, the cell transmits an RRC connection re-establishment reject message to the UE.

When an RRC connection re-establishment procedure is successfully performed, the cell and the UE perform an RRC connection re-establishment procedure. Thereby, the UE recovers a state before performing an RRC connection re-establishment procedure and guarantees continuity of the service to the maximum.

Figure 13:
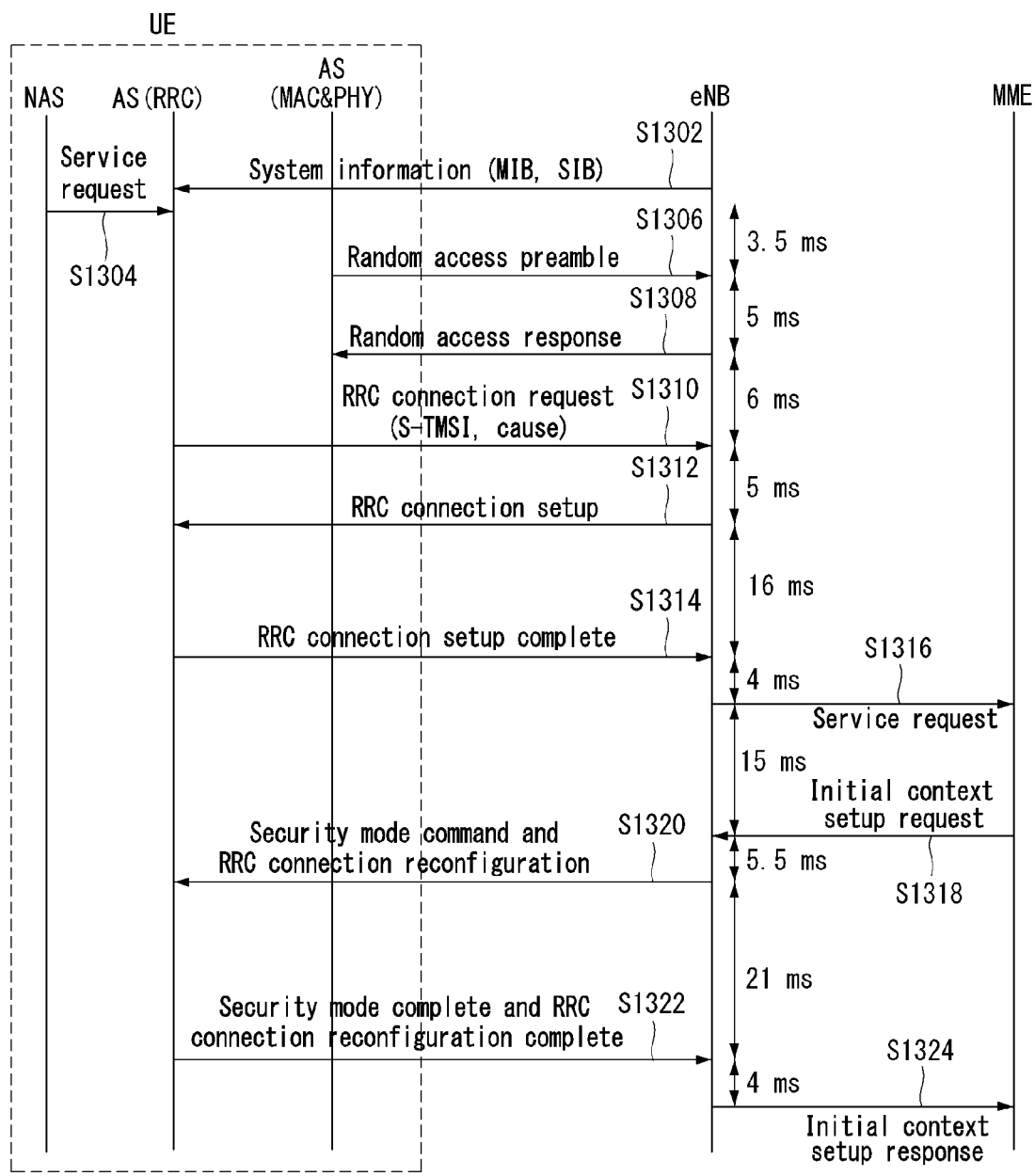
FIGS. 13 and 14 are a flowchart and a diagram, respectively, illustrating a method of converting from an idle state to a connected state and an example of a consumption time of an uplink resource allocation method.
Figure 14:
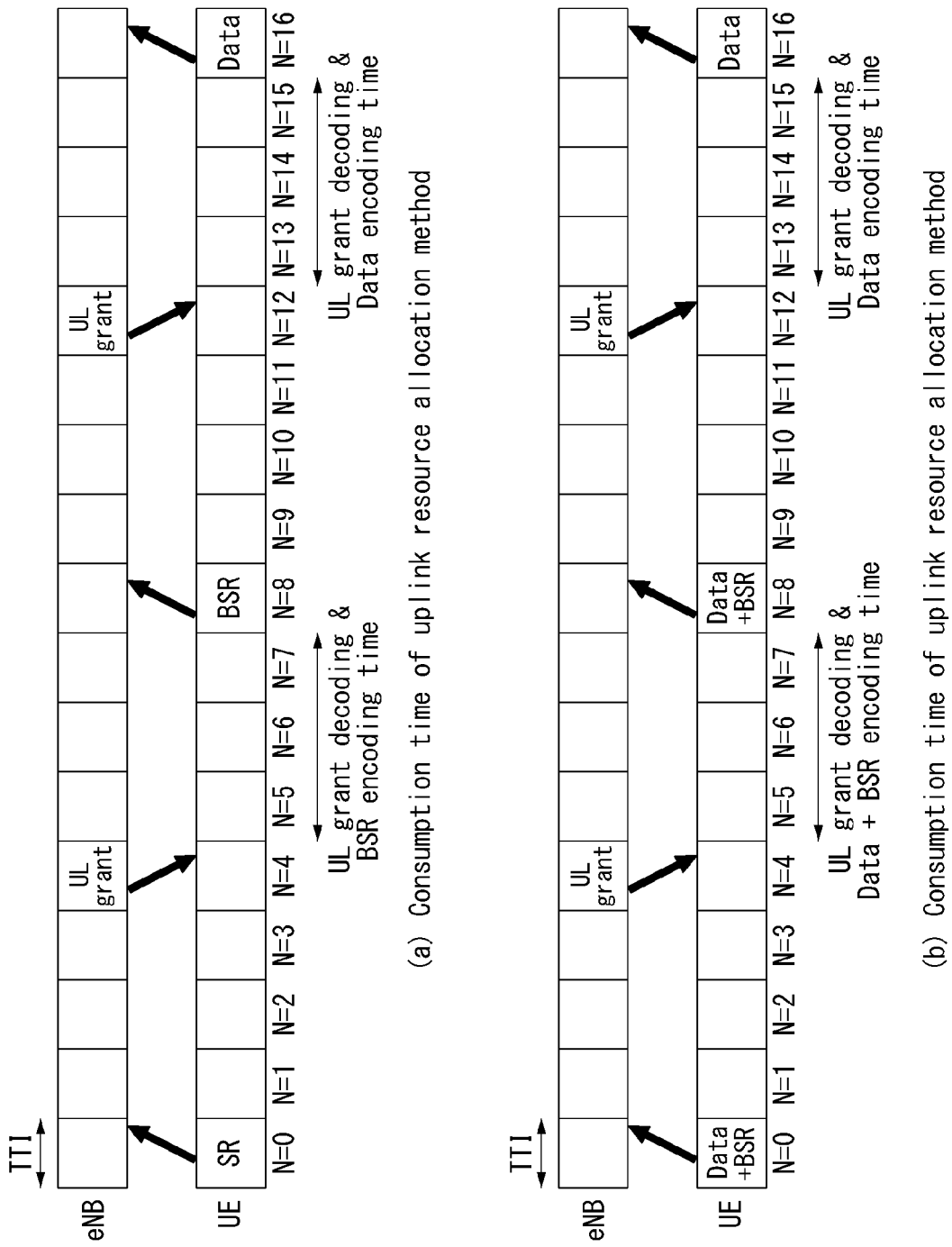

FIGS. 13 and 14 are a flowchart and a diagram, respectively, illustrating a method of converting from an idle state to a connected state and an example of a consumption time of an uplink resource allocation method.

Referring to FIGS. 13 and 14, in order to set a security session and a data session with the eNB, an UE of an idle state should perform an RRC connection procedure and for this, a predetermined time is consumed.

When describing in detail an RRC connection procedure, the UE receives system information from the eNB (S1302).

The system information may be classified into a Mater Information Block (MIB) or a System Information Block (SIB), and the MIB is transmitted through a PBCH, and the SIB is transmitted through a PDSCH.

A detailed description of the system information has been described in the foregoing description.

Thereafter, the UE transmits a service request to the RRC (or AS) layer in the NAS (within the UE) (S1304).

The UE receives and stores information on random access from the base station through the system information, and when random access is required, the UE transmits a random access preamble to the base station in the step (S1306).

When the eNB receives the random access preamble from the UE, the eNB transmits a random access response message to the UE (S1308). Specifically, downward scheduling information about the random access response message may be CRC-masked with a Random Access-Radio Network Temporary Identifier (RA-RNTI) to be transmitted on an L1 or L2 control channel (PDCCH). The UE, having received downward scheduling signal masked with the RA-RNTI may receive and decode a random access response message from a Physical Downlink Shared Channel (PDSCH).

Thereafter, the UE determines whether random access response information instructed thereto exists in the random access response message.

Whether random access response information instructed to the UE exists may be determined by whether a Random Access Preamble ID (RAID) of a preamble transmitted by the UE exists.

The random access response information includes Timing Alignment (TA) representing timing offset information for synchronization, radio resource allocation information used in an uplink, and a temporary identifier (e.g., Temporary C-RNTI) for distinguishing an UE.

Thereafter, in order to request RRC connection establishment with the eNB, the UE transmits an RRC connection request message to the eNB (S1310).

The RRC connection request message may include S-TMIS and a cause field.

The cause field may include information representing an object that transmits an RRC connection request message, and the object may represent an uplink resource allocation request for a low latency service (e.g., mobile originating urgent, mobile terminating urgent).

Thereafter, the UE receives an RRC connection setup message corresponding to a response to the RRC connection Request message from the eNB (S1312).

The RRC connection setup message may include an UL resource response IE representing result information or response information about an uplink resource allocation request of the UE.

Further, the eNB may perform uplink resource allocation of the UE based on the UL resource request IE received from the UE.

The UE transmits an RRC connection setup complete message through an uplink resource allocated from the eNB (S1314).

The eNB, having received the RRC connection setup complete message notifies access of the UE while transmitting a service request message to the MME (S1316).

The MME, having received the service request message transmits context information of the UE including security information of the UE, data bearer information in which the UE uses, information about a serving gateway in which the eNB should transfer data sent by the UE, i.e., S1-U UL information (uplink bearer) GPRS Tunneling Protocol (GTP) tunnel ID (TEID) of the UE and an IP address of a serving gateway), and mobility management information of the UE to the eNB through an initial context setup request message (S1318).

Thereafter, for Access Stratum (AS) security and data bearer setup, the eNB transmits a security mode command and an RRC connection reconfiguration message to the UE (S1320).

The eNB interlocks with the UE based on context information of the UE received from the MME to set Access Stratum (AS) security and data bearer between the UE and the eNB.

When the AC security and data bearer setup is completed, the UE transmits security mode complete and RRC connection reconfiguration complete messages to the eNB (S1322).

Thereafter, the eNB notifies the MME that a context of the UE and data bearer setup have been successfully performed through an initial context setup response message (S1324).

In such an idle state, as shown in FIG. 13, as a conversion time to a connection mode according to RRC connection setup and data connection setup, a time of 35.5 ms is consumed for RRC connection setup and a time of 49.5 ms is consumed for security setup and data connection setup of a radio link (including no backhaul transmitting time).

Further, the UE converted to a connected state should request a radio resource for transmitting uplink data through a scheduling request, as shown in FIG. 14(a) or should request a radio resource for transmitting uplink data through a scheduling request and a buffer state report, as shown in FIG. 14(b).

In this case, in a case of FIG. 14(a), data transmission latency becomes 9.5 ms, and in a case of FIG. 14(b), data transmission latency becomes 17.5 ms.

Therefore, as shown in FIGS. 13 and 14, a time in which the UE in an idle state consumes for data transmission becomes 94 ms or 102.5 ms, which is the sum of 85 ms, which is a state conversion time of the UE for data transmission and reception and 9.5 ms or 17.5 ms, which is a radio resource occupation and data transmission time of the UE converted to a connected state.

However, there is a problem that such a consumption time has large latency in providing a low latency service that should quickly transmit information about various real time application services such as health care, traffic safety, disaster safety, and remote medical control, particularly, a specific event such as an accident or a state that may occur at a time that cannot be estimated by various end users such as a person or a machine (e.g., vehicle, sensor) to an eNB or a peripheral UE/user (hereinafter, data for providing the low latency service is referred to as low latency service data.).

Thus, in order to solve such a problem, the present invention proposes a method for transmitting and receiving data without switching the terminal from the idle state in which the data transmission latency is to occur about five times as compared to that of a terminal in a connection state to the connection state.

In addition, when additional uplink or downlink data is generated during data transmission/reception in the idle state, proposed is a method capable of transmitting the additional uplink or downlink data.

Hereinafter, it is assumed that the terminal is already registered in a network, and EPD bearer information corresponding to data to be transmitted by the terminal exists in the network.

In addition, the encryption and decryption in the present invention may mean a function performed in an upper layer including the MAC (RLC, PDCP, RRC, NAS), and encryption and decryption in the physical layer (PHY) can be independently performed regardless of whether to be encrypted and decrypted in the upper layer.

Figure 15A:
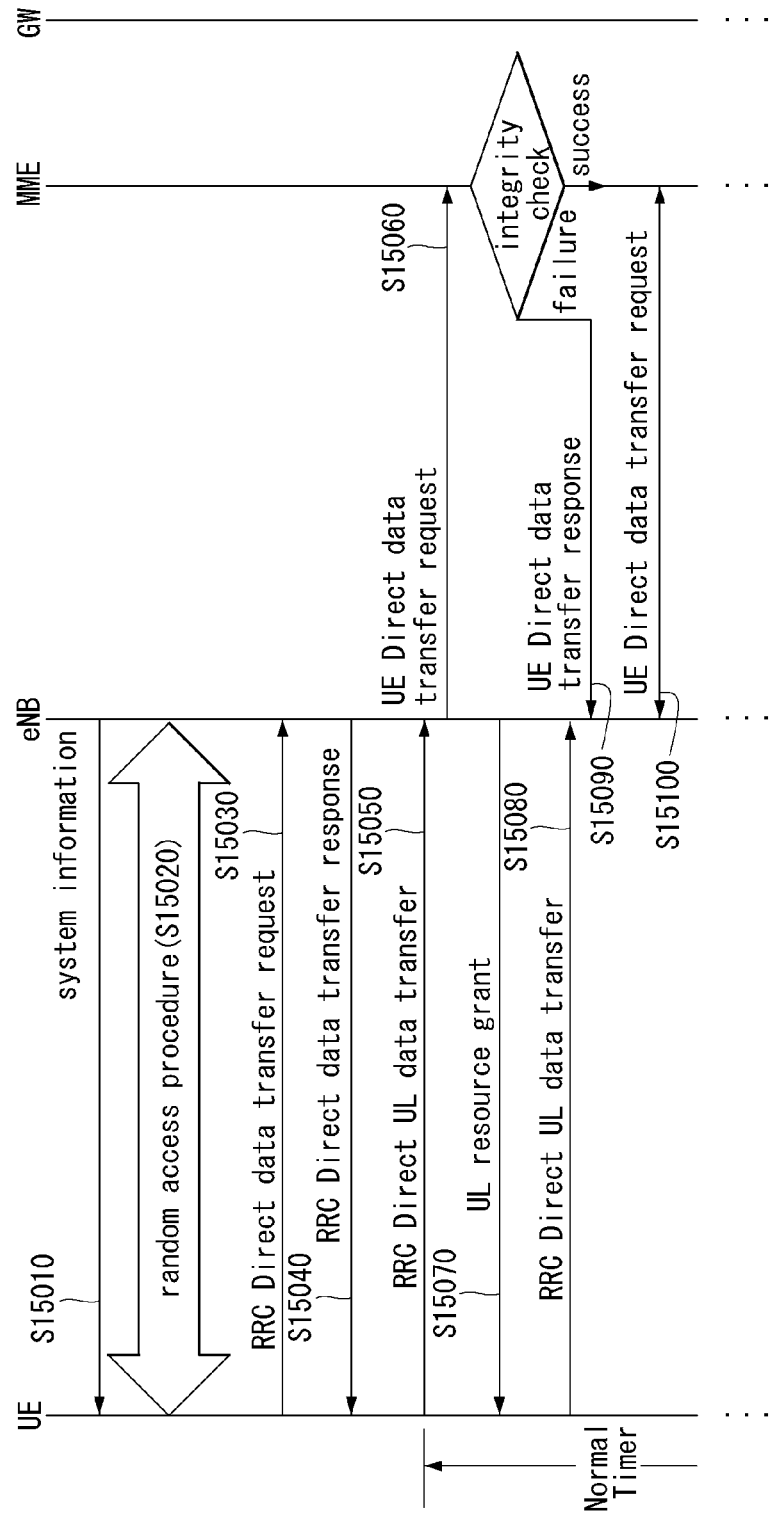
FIG. 15a and FIG. 15b is a flowchart illustrating an example of transmitting and receiving of additional uplink data during uplink data transmission and reception to which the present invention can be applied.
Figure 15B:
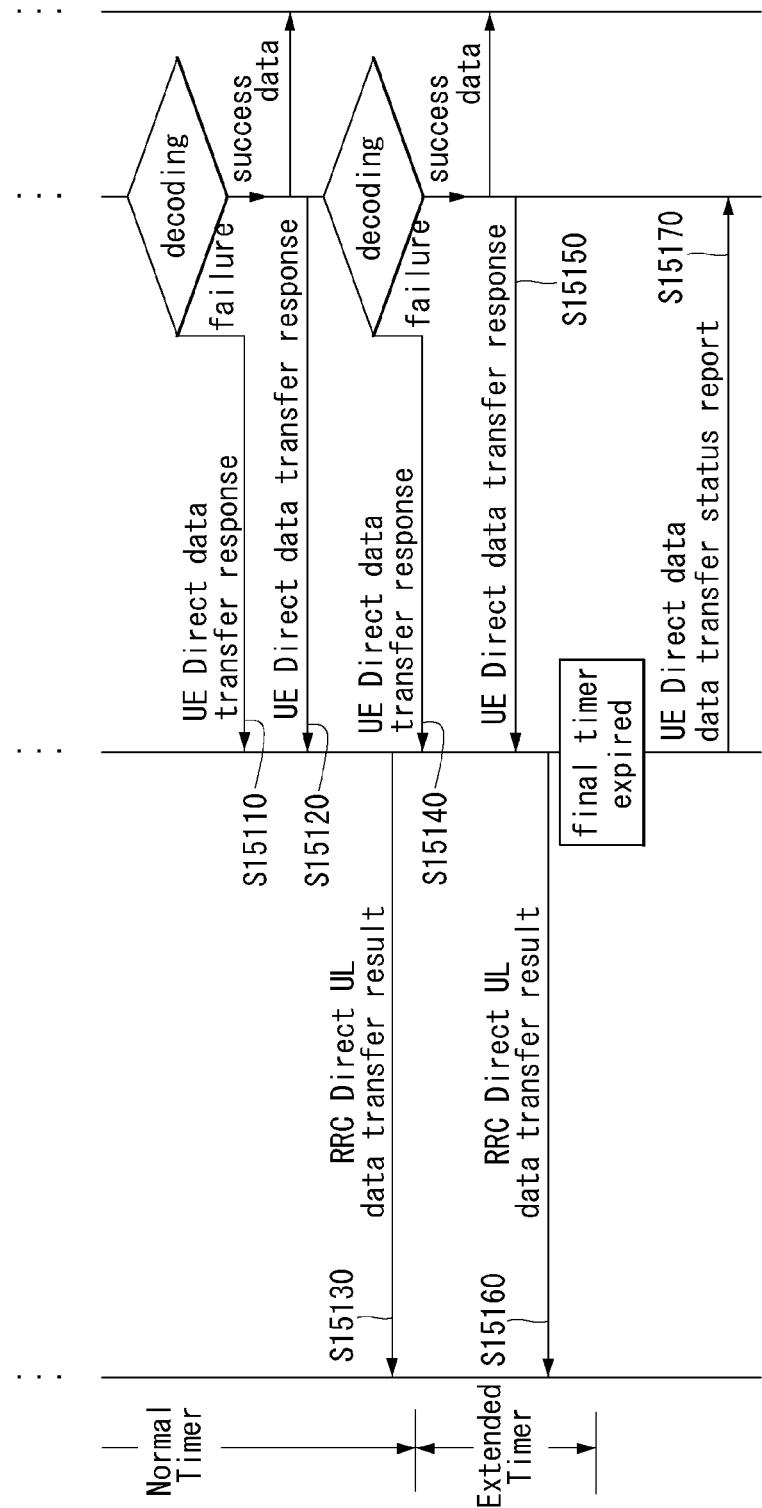

FIG. 15a and FIG. 15b is a flowchart illustrating an example of transmitting and receiving of additional uplink data during uplink data transmission and reception to which the present invention can be applied.

Referring to FIG. 15a and FIG. 15b, when additional uplink data is generated in the process of transmitting data for providing a low latency service in an idle state, (Temporary C-RNTI, RNTI), a release time point of the allocated resource (e.g., Temporary C-RNTI, RNTI, which is a terminal identifier) is extended, thereby the additional uplink data can be transmitted through a base station and an MME (Mobility Management Entity).

Specifically, the terminal can receive system information including information necessary for transmission of uplink data (first data) for providing the low-latency service from the base station (S15010).

The system information is a message periodically transmitted by the base station, and may comprise a support field indicating whether the base station supports data transmission and reception for providing a low latency service in an idle state, and resource information used in a random access procedure for transmitting and receiving the data.

When the base station does not support data transmission/reception for providing a low-latency service in the idle state, the terminal receiving the system information transits to a connection state and transmits/receives data.

However, when the base station supports data transmission and reception for providing a low-latency service in the idle state, in order to transmit a request message for resource allocation for transmission/reception of low-latency service data to the base station, the random access procedure illustrated in FIG. 13 is to be performed with the base station (S15020).

That is, the terminal transmits a random access preamble to the base station, and when the base station receives the random access preamble, it transmits a random access response message to the terminal.

Specifically, the downlink scheduling information for the random access response message may be CRC-masked with a Random Access-Radio Network Temporary Identifier (RA-RNTI) and transmitted on an L1 or L2 control channel (PDCCH). The UE receiving the downlink scheduling signal masked with the RA-RNTI can receive and decode the random access response message from the PDSCH (Physical Downlink Shared Channel). Then, the UE checks whether there is random access response information indicated to itself in the random access response message.

Whether or not there is the random access response information indicated to the user can be checked by whether or not there is a RAID (Random Access Preamble ID) for the preamble transmitted by the UE.

The random access response information includes TA (Timing Alignment) indicating timing offset information for synchronization, radio resource allocation information used in an uplink, and a temporary identifier (e.g., Temporary C-RNTI) etc. for a UE identification.

When the base station supports data transmission and reception for providing the low latency service in the idle state, the terminal transmits a request message (e.g., RRC Direct data Transfer Request message) to request the data transmission to the base station through the resource allocated in the step (S15020) to request data transmission in an idle state (S15030).

The request message may include a message type field indicating a message type, a UE ID IE field indicating a terminal identifier for identifying the UE, a Tx indicator indicating whether the message is a message for transmitting the low latency service data or a message for receiving the low latency service data, and a Quality of Service Information Element (QoSIE) field indicating a characteristics of data to be transmitted when data is transmitted.

The UE ID IE may include an MME (Mobility Management Entity) identifier for managing the terminal and an identifier for distinguishing the terminal in the MME. More specifically, the UE ID IE may include at least any one of a public land mobile network identifier (PLMN ID) which is a network identification number, a MMEGI which is a MME group identifier, a MMEC code indicating a MME code identifier, a MME Temporary Mobile Subscriber Identity (M-TI) indicating a terminal identifier, a parameter for distinguishing whether an identifier is allocated to an MME supporting any communication technology, or a parameter for distinguishing whether an identifier is allocated to the other entity other than the MME.

When there is no direct communication path (for example, S1 interface) between the base station and the MME corresponding to the MME identifier, the base station requests authentication and context information processing to the other MME, and the MME and the other MME may exchange context information on the terminal.

The QoSIE field may be composed of fields for indicating characteristics of data to be transmitted, and may comprise at least one of a QoSclass identity (QCI) as shown in Table 1 below, the maximum allowable latency time (Required packet latency) as shown in Table 2 below, or a data size indicating a size of a transmission message (or an RRC Direct UL data transfer message) in which the data is included.

Table 1 below is an example of the QCI.

TABLE 1

| QCI | Resource Type | Priority Level | Packet Delay Budget | Packet Error Loss Rate | Example Services |
|---|---|---|---|---|---|
| 1 | GBR | 2 | 100 ms | 10-2 | Conversational Voice |
| 2 | | 4 | 150 ms | 10-3 | Conversational Video (Live Streaming) |
| 3 | | 3 | 50 ms | 10-3 | Real Time Gaming |
| 4 | | 5 | 300 ms | 10-6 | Non-Conversational Video (Buffered Streaming) |
| 65 | | 0.7 | 75 ms | 10-2 | Mission Critical user plane Push To Talk voice (e.g., MCPTT) |
| 66 | | 2 | 100 ms | 10-2 | Non-Mission-Critical user plane Push To Talk voice |
| 5 | Non-GBR | 1 | 100 ms | 10-6 | IMS Signalling |
| 6 | | 6 | 300 ms | 10-6 | Video (Buffered Streaming), TCP-based (e.g., www, e-mail, chat, ftp, p2p file sharing, progressive video, etc.) |
| 7 | | 7 | 100 ms | 10-3 | Voice, Video (Live Streaming), Interactive Gaming |
| 8 | | 8 | 300 ms | 10-6 | Video(Buffered Streaming), TCP-based (e.g., www, e-mail, chat, ftp, p2p file, sharing, progressive video, etc.) |
| 9 | | 9 | | | |
| 69 | | 0.5 | 60 ms | 10-6 | Mission Critical latency sensitive signalling (e.g., MC-PTT signalling) |
| 70 | | 5.5 | 20 ms | 10-6 | Mission Critical Data (e.g. example services are the same as QCI 6/8/9) |

Table 2 below is a table showing an example of the maximum latency time.

TABLE 2

| Required packet latency | Descriptions |
|---|---|
| 000 | 10 ms |
| 001 | 20 ms |
| 010 | 30 ms |
| 011 | 50 ms |
| 100 | 60 ms |
| 101 | 75 ms |
| 110 | 100 ms |

The base station may know whether the terminal desires to transmit the first data in an idle state through the Tx indicator received through the request message and that the QoSIE field indicating characteristics of the first data is to be included.

For example, when the Tx indicator has a value of '1', the base station can know that the terminal attempts to transmit the first data in the idle state, and the request message includes the QoSIE field.

The base station can determine a resource allocation time point and a resource allocation size, according to information of a QoSIE field corresponding to data to be transmitted by the terminal, that is, according to the QCI, the maximum latency time, or transmission urgency according to the data size, and transmits the UL resource IE indicating the corresponding resource allocation information to the terminal by including it in a response message (or an RRC Direct data Transfer response message) (S15040).

The response message may be transmitted to be included in the form of an RRC message, a MAC message, or a MAC header.

In addition, since there may be a plurality of UEs selecting the same resource and random access code (or preamble) in the random access procedure, the response message may include a target UE ID field indicating a terminal to which the allocated resource is allocated.

The target UE ID IE field may be composed of one or more fields including the UE ID IE received in the step (S15030).

Table 3 below shows an example of the data format of the response message.

TABLE 3

| Oct 1 | Target UE ID IE |
| Oct 2 | Target UE ID IE |
| Oct 3 | Target UE ID IE |
| Oct 4 | Target UE ID IE |
| Oct 5 | Target UE ID IE |
| Oct 6 | UL Resource IE |
| Oct 7 | UL Resource IE |

The terminal transmits a transmission message (or an RRC Direct UL Data Transfer message) including the first data to the base station using the resource allocated through the response message (S15050).

In this case, when additional data (second data) is generated for providing the low-latency service occurs in addition to the first data, the terminal can request transmission of the second data through the transmission message.

The transmission message may include a UE ID IE field indicating a UE ID for identifying the terminal, a Direct data NAS IE field containing the low-latency service data to be transmitted to the MME, and a data information field indicating information on the second data.

The UE ID IE field may include an MME identifier for managing the terminal and an identifier for distinguishing the terminal in that MME. More specifically, the MME identifier may include at least one of a PLMN ID (Public Land Mobile Network Identifier) which is a network identification number, a MMEGI which is a MME group identifier, an MMEC (MME Code) indicating an MME code identifier, a M-TI which is a terminal identifier, a parameter for distinguishing an identifier allocated to a MME supporting any communication technology (e.g., 2G, 3G, LTE or LTE-A, etc.), or a parameter for distinguishing an identifier allocated to the other entity other than the MME, and it may not include the field transmitted in the step (S15030).

The Direct data NAS IE field may further include a Security IE field and a Data IE field.

The Security IE field may include at least one of a security header type indicating whether security is applied to the Data IE field including the first data, a key set identifier for identifying an EPS security context, or a MAC (Message Authentication Code) for determining integrity, or a NAS count.

According to the applied security, the Security header type may indicate one of not security protected indicating that security is not applied, Integrity Protected indicating that only integrity protection is applied, and Integrity protected and ciphered indicating that both integrity protection and encryption are applied.

The Data IE field may include the first data and an EPS bearer ID corresponding to the first data.

The data information field is a field to be included when additional uplink data (second data) is generated, and when the second data is generated in addition to the first data, the terminal can request through the data information field an extension of the release time point of the allocated resource (e.g., Temporary C-RNTI, C-RNTI) and the generation of the second data to the base station.

The data information field may include an extension request time point field (e.g., Requested extended Timer) indicating a time point at which an extension for a release of the allocated resource is requested, a cause field indicating a reason for the extension, a QoSIE indicating a characteristic and size of the second data and the like.

Thereafter, the base station transmits the UE ID IE and the Direct data NAS IE field to the MME to be included in a data transmission request message (or a UE Direct data transfer message) (S15060), and allocates a radio resource corresponding to the QoSIE of the second data to the terminal (S15070).

The terminal may transmit the second data, through the radio resource allocated in the step (S15070), to the base station to be included in a transmission message (or an RRC Direct uplink data transmission message) (S15080).

In this case, the second data may be encrypted in the same manner with the first data or may be processed differently from the first data, and when the second data is encrypted, the second data may be encrypted through a NAS key.

In addition, the field transmitted through the step (S15050) may not be transmitted in the step (S15080).

The MME having received the data transmission message through the step (S15060) determines whether integrity verification and data decoding are performed or not.

That is, the MME performs integrity verification and decryption according to whether or not the integrity is applied and the encryption is applied, included in the Security IE field received through the data transmission message.

When the UE is not valid as a result of the integrity verification, the MME may notify the base station of the failure of transmission of the first data through a data transmission response message, and in this case, the data transmission response message may include a reason for failure (S15090).

However, when the integrity protection is not applied or when the terminal is valid as a result of integrity verification, the MME can determine whether to decrypt the first data.

After the integrity verification, the MME performs a decryption proc for the first data.

When the decoding of the first data is unsuccessful, the MME can notify the base station of a failure in the transmission of the first data through the transmission response message, and in this case, the transmission response message may include the reason in failure (S15110).

However, when the first data is not encrypted or successfully decoded, the MME transmits the decoded first data to the gateway corresponding to the EPS Bearer ID, and it can be notified to the base station through the data transmission response message that the transmission of the first data is successful (S15120).

After receiving a result for the transmission of the first data from the MME, the base station transmits a data transmission result message including extension time information indicating extension time of the allocated resources (e.g., Temporary C-RNTI, C-RNTI) as a result of the transmission and in the transmission process of the first data (or, RRC Direct UP Data Transfer Result Message) to the base station (S15130).

In addition, the base station receiving the second data through the step (S15080) transmits the data IE field including the second data to the MME through a data transmission request message (or a UE Direct data transmission request message) (S15100).

The second data is subjected to a decoding process, and when the decoding fails, it can be notified to the base station through a data transmission response message (or a UE Direct data transmission response message) that transmission of the second data has failed, and in this case, the data transmission response message may include a failure reason (S15140).

However, when the encryption process is not performed or the decoding is successful, the MME transmits the decoded second data to the gateway corresponding to the EPS Bearer ID, and it can be notified to the base station through the data transmission response message (or a UE Direct data transmission response message) that the transmission of the second data is successful (S15150).

The base station transmits a transmission result message (or an RRC Direct uplink data transmission result message) including the transmission result of the second data received from the MME within the extension time through the step (S15130) to the terminal (S15160).

Thereafter, when the extension time has expired, the base station can notify that the extension time has expired through a report message (or a UE Direct data transmission status report message) (S15170).

Hereinafter, values of the normal time for transmitting the data for providing the low-latency service and the extension time for transmitting the additional data can be transmitted to the base station by ① using a predetermined value, ② transmitting it to the terminal through the system information in a broadcast manner, ③ transmitting it to the terminal in a unicast manner by the base station, or ④ transmitting it to the base station in a unicast manner by the terminal. The above methods be applied at the same time, and when it is applied at the same time, values transmitted in a unicast manner can be applied preferentially.

Also, the extension time may be started ① after the normal time is terminated, or ② after the normal time is stopped at the time point of receiving the extension time information.

According to the present embodiment, uplink data for providing a low-latency service can be transmitted in an idle state, and even when additional uplink data for providing the low-latency service is generated, the allocated resource (e.g., Temporary C-RNTI and C-RNTI) can be extended in time to transmit the additional uplink data.

Figure 16A:
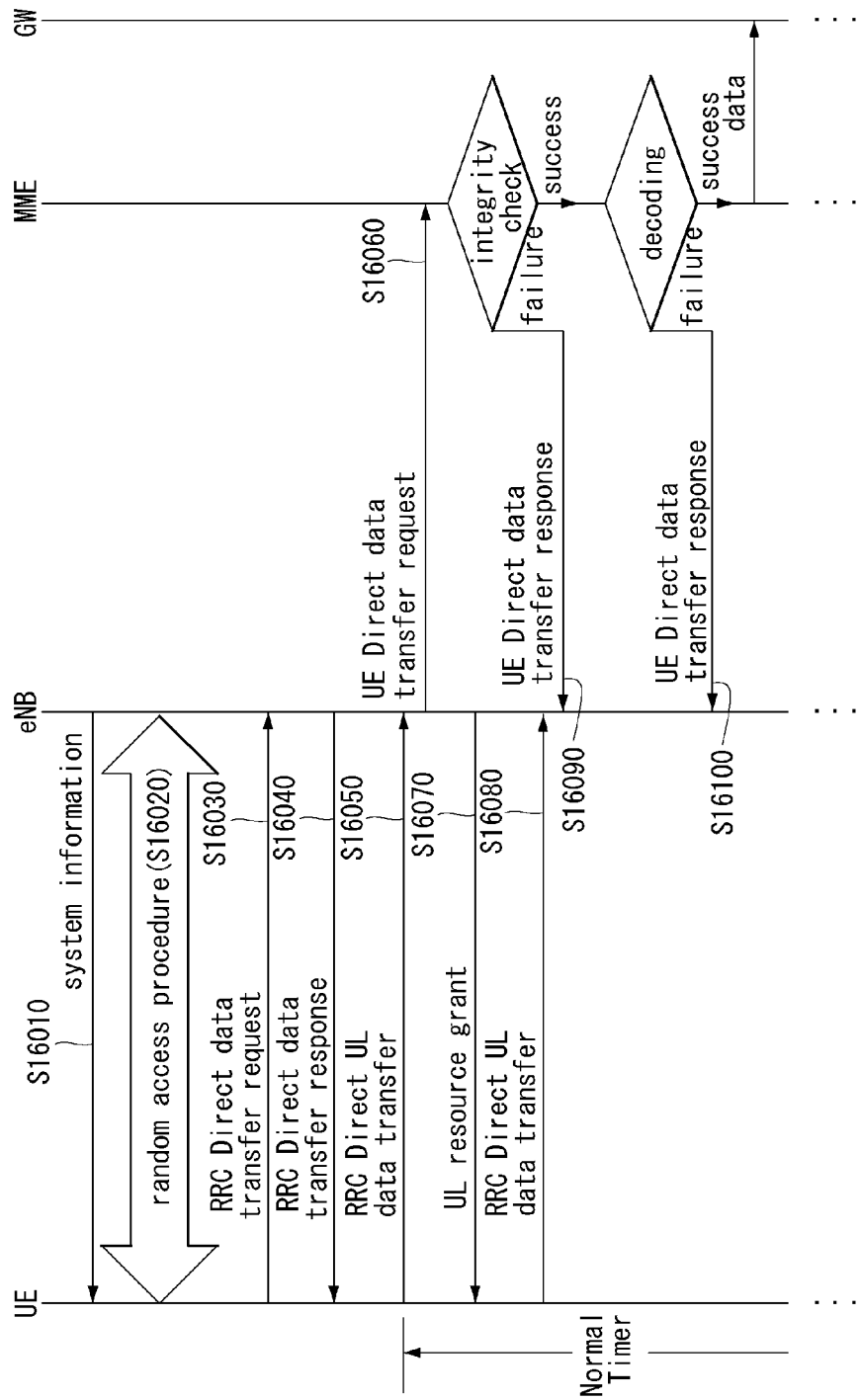
FIG. 16a and FIG. 16b is a flowchart illustrating another example of transmission and reception of additional uplink data during uplink data transmission and reception to which the present invention can be applied.
Figure 16B:
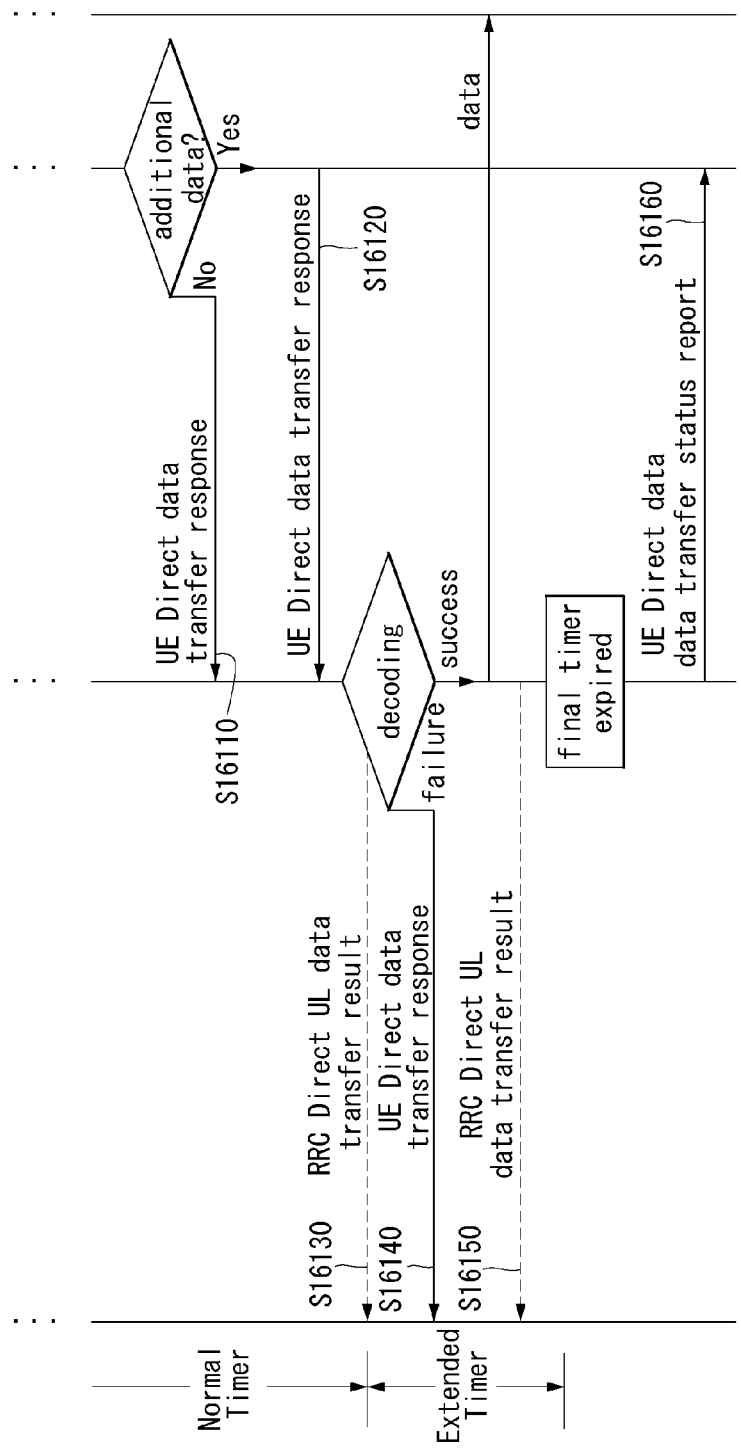

FIG. 16a and FIG. 16b is a flowchart illustrating another example of transmission and reception of additional uplink data during uplink data transmission and reception to which the present invention can be applied.

Referring to FIG. 16a and FIG. 16b, when additional uplink data is generated in the process of transmitting data for providing a low latency service in an idle state, the terminal can extend the release time point of the allocated resource to transmit the additional uplink data to the gateway only through the base station.

Specifically, the terminal may receive system information including information necessary for transmitting uplink data for providing the low-latency service from the base station (S16010).

The system information is a message periodically transmitted by the base station, and includes at least one of a support field indicating whether the base station supports data transmission and reception for providing a low latency service in an idle state, resource information used in a random access procedure for transmitting and receiving the data, and a security algorithm supported by the base station.

In this case, the support field, the resource information, and the security algorithm may all be transmitted through the same system information message or may be transmitted through a system information message having different periods.

For example, the support field is transmitted through a system information message (e.g., MIB, Master Information Block) of a short period, and the resource information and the security algorithm may be transmitted through a system information message (e.g., SIB 2, System Information Block 2) with which general purpose of arbitrary resource information is transferred.

Hereinafter, steps S16020 to S16040 are the same as the steps S15020 to S15040 of FIG. 15a, and thus the description thereof will be omitted.

The terminal transmits a transmission message (or an RRC Direct UL Data Transfer message) including the first data using the resources allocated in step (S16040) to the base station (S16050).

In this case, when additional data (second data) for providing the low-latency service is generated in addition to the first data, the terminal can request transmission of the second data through the transmission message.

The transmission message includes a UE ID IE field indicating a UE ID for identifying the terminal, a Direct data NAS IE field including the low-latency service data to be transmitted to the MME, and a data information field indicating information on the second data when the second data is generated.

In the UE ID IE field, the UE ID IE may include an MME identifier for managing the terminal and an identifier for distinguishing the terminal from the UE in that MME. More specifically, the MME identifier may include at least one of a PLMN ID (Public Land Mobile Network Identifier) which is a network identification number, a MMEGI which is a MME group identifier, an MMEC (MME Code) indicating an MME code identifier, a M-TI which is a terminal identifier, a parameter for distinguishing an identifier allocated to a MME supporting any communication technology (e.g., 2G, 3G, LTE or LTE-A, etc.), or a parameter for distinguishing an identifier allocated to the other entity other than the MME, and it may not include the field transmitted in the step (S16030).

The Direct data NAS IE field may further include a Security IE field and a Data IE field.

The Security IE field may include at least one of a security header type indicating whether security is applied to the Data IE field including the first data, a key set identifier for identifying an EPS security context, or a MAC (Message Authentication Code) for determining integrity, or a NAS count.

According to the applied security, the Security header type may indicate one of not security protected indicating that security is not applied, Integrity Protected indicating that only integrity protection is applied, and Integrity protected and ciphered indicating that both integrity protection and encryption are applied.

The Data IE field may include the first data and an EPS bearer ID corresponding to the first data.

The data information field is a field to be included when additional uplink data (second data) is generated, and when the second data is generated in addition to the first data, the terminal can request through the data information field an extension of the release time point of the allocated resource (e.g., Temporary C-RNTI, C-RNTI) and the generation of the second data to the base station.

The data information field may include an extension request time point field (e.g., Requested extended Timer) indicating a time point at which an extension for a release of the allocated resource is requested, a cause field indicating a reason for the extension, a QoSIE indicating a characteristic and size of the second data and a EPS Bearer ID for identifying a session of the second data, and the like.

Then, the base station transmits the UE ID IE, the Direct data NAS IE field, and the EPS Bearer ID of the second data to be included in a data transmission request message (or a UE Direct data transfer message) to the MME (S16060).

Hereinafter, the steps S16070 and S16080 are the same as the steps S15070 and S15080 of FIG. 15a, and thus the description thereof will be omitted.

The terminal transmits a transmission message (or an RRC Direct uplink data transmission message) including the second data to the base station through the allocated resources (S16080).

In this case, the second data may be encrypted and may be determined according to whether the first data is encrypted or a service type of the second data. In addition, when the second data is encrypted, it can be encrypted using the AS key, and the encryption algorithm transmitted through the above-mentioned system information can be determined in the following manner.

Firstly, when the terminal selects a specific encryption algorithm, the terminal can select one of encryption algorithms (e.g., eea 0, eea 1, eea 2, and ee3-v 1130) supported by the base station, respectively.

The selected encryption algorithm may be included in the data information of step S16050, or may be transmitted to the base station through step S16080.

Secondly, when the security algorithm is selected by a predetermined method, the terminal and the base station can select an algorithm for encryption by the same method as previously set. In this case, the selected encryption and algorithms for integrity assurance may not be explicitly communicated to the base station.

For example, in the predetermined scheme, the base station and the terminal can select in the same manner an algorithm having the largest value among algorithms that can be supported. When the encryption algorithms supported by the base station are eea1, eea2, eea3-v1130, and the encryption algorithms supported by the terminal are eea and eea3-v1130, the selected encryption algorithm may be eea30v1130, and in this case, the encryption algorithm type is defined as an enumerated type (ENUMERATED) so that eea0=1, eea1=2, eea2=3, eea3-v1130=4 can be defined.

The MME having received the data transmission message through the step (S16060) determines whether integrity is verified and the first data is decoded.

That is, the MME performs integrity verification and decoding according to whether the integrity is applied and the encryption is applied, which is included in the Security IE field received through the data transmission message.

When the terminal is not valid, the MME may notify through a data transmission response message to the base station that transmission of the first data has failed, and in this case, the data transmission response message includes a failure reason (S16090).

However, when the integrity protection is not applied or when the terminal is valid as a result of integrity verification, the MME can determine whether to decrypt the first data.

After the integrity verification, the MME performs a decoding procedure for the first data.

When the decoding for the first data fails, the MME can notify the base station that transmission of the first data has failed through a transmission response message (or a UE Direct data transmission response message), and in this case, the data transmission response message may include a failure reason (S16100).

However, when the first data is not encrypted or the decoding is successful, the MME transmits the decoded first data to the gateway corresponding to the EPS Bearer ID, and determines whether there is additional uplink data.

Determining whether there is additional uplink data can be determined by whether the EPS Bearer ID for the additional uplink data is included in the data transmission request message received by the MME, or an additional indicator indicating that there is the additional uplink data is transmitted to be included and thus the MME can determine whether there is the additional uplink data.

When the additional uplink data, i.e., the EPS Bearer ID for the second data is not included, the MME may determine that there is no additional uplink data, and it may notify to the base station through the data transmission response message (or, UE Direct data transmission response message) that the first data has transmitted to the gateway (S16110).

However, when the EPS Bearer ID for the second data is included, the MME determines that there is the second data and includes a Bearer IE field including information related to the EPS Bearer ID of the second data, and the transmission result of the first data may be transmitted to the base station through the data transmission response message (or a UE Direct data transmission response message) (S16120).

The Bearer IE field may include a tunnel ID (e.g., GTP-TEID) and an address of a gateway to which the second data is to be transmitted, an encryption algorithm supported by the terminal, and a basic key (e.g., $K_{eNB}$) to generate a key to be used, and the like.

In this case, the encryption-related information may be included in case of decoding the first data is performed or depending on the service type of the second data.

Hereinafter, the base station transmits extension time information indicating an extension time of a resource (e.g., Temporary C-RNTI, C-RNTI) allocated in the transmission result of the first data and during the transmission of the first data, to the terminal through the result message (or, RRC Direct uplink data transmission result message) (S16130), and determines whether to decode the second data according to whether the encryption related information is included in the Bearer IE field.

When the decoding of the second data is failed, the base station can notify the terminal of the result through a result message (or an RRC Direct Data Transfer Response message), and the result message includes a reason for failure (S16140).

However, when the decoding of the second data is successful or the decoding of the second data is not performed since the second data is not encrypted, the base station may transmit the second data to the corresponding gateway, and the transmission result is notified to the terminal thorough the result message (or an RRC Direct uplink result message) (S16150).

After the extension time has expired, the base station can notify that the extension time has expired through the report message (or a UE Direct data transmission status report message) (S16160).

In yet another embodiment of the present invention, the MME in FIG. 16 may determine whether or not the additional uplink data (second data) is present at the same time as the decoding process proceeds. In this case, the MME may transmit the Bearer IE field to the base station through a separate message without waiting for the decoding process to be completed.

The base station may determine whether to decode the second data at the time point of receiving the Bearer IE field from the MME through the separate message.

Figure 17A:
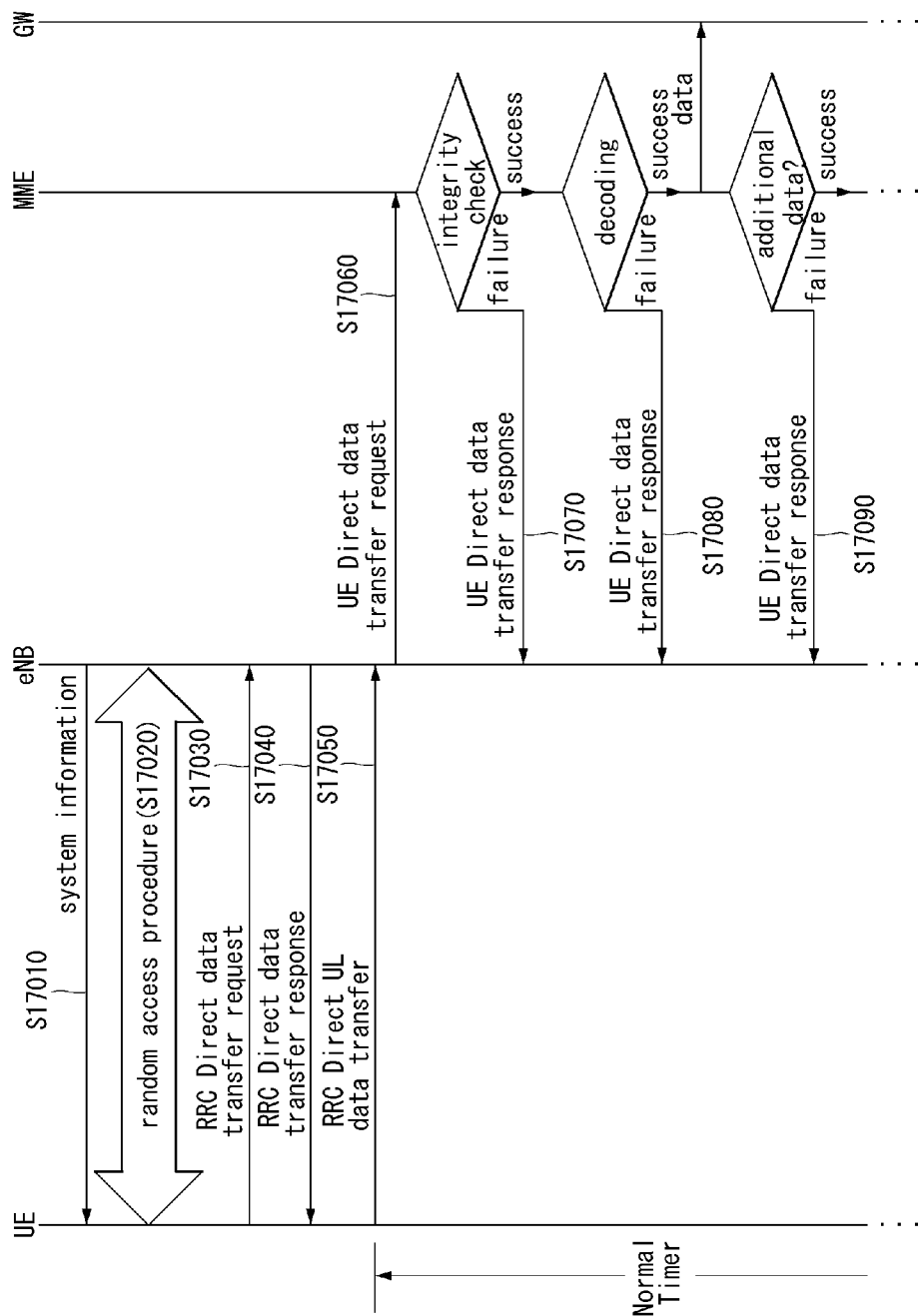
FIG. 17a and FIG. 17b is a flowchart illustrating yet another example of transmitting and receiving additional uplink data during uplink data transmission and reception, to which the present invention can be applied.
Figure 17B:
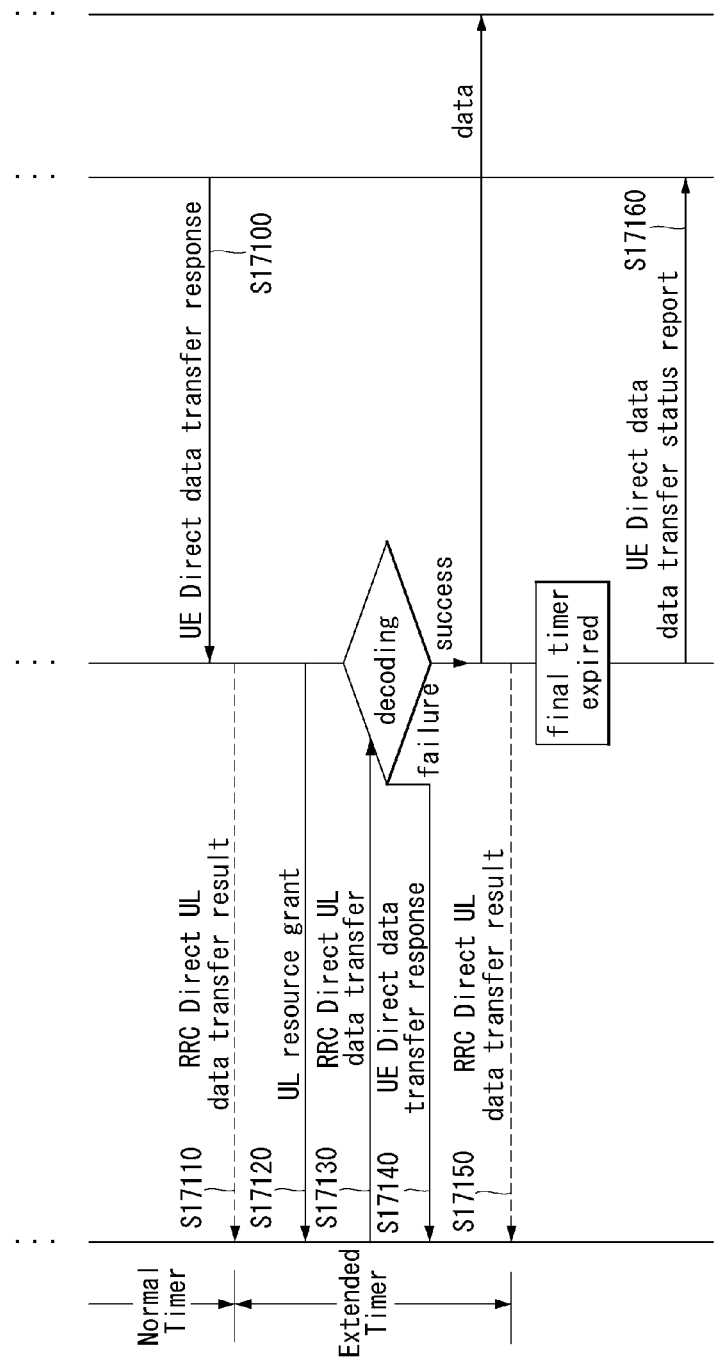

FIG. 17a and FIG. 17b is a flowchart illustrating yet another example of transmitting and receiving additional uplink data during uplink data transmission and reception, to which the present invention can be applied.

Referring to FIG. 17a and FIG. 17b, when additional uplink data is generated in a process of transmitting data for providing a low latency service in an idle state, the terminal can extend the release time point of the allocated resource to transmit the additional uplink data to the gateway only through the base station.

First, steps S17010 to S17060 are as same as steps S16010 to step 16060 of FIG. 16a and steps S17070 to S17100 are as same as steps S16090 to S16120, and thus the description thereof will be omitted.

In this case, the Bearer IE included in the data transmission response message transmitted in step S17100 may further include a QoSIE field indicating a characteristic for the second data.

Thereafter, the base station allocates a radio resource to the terminal based on the QoSIE received from the terminal or the QoSIE received through the Bearer IE from the MME (S17120).

The terminal transmits a transmission message including the second data to the base station through the radio resource allocated from the base station (S17130), and the base station having received the second data determine whether or not to decode the second data according to whether the encryption related information is included or not in the Bearer IE.

When the decoding of the second data is failed, the base station can notify it to the terminal through the result message (or an RRC Direct data response message), and in this case, the result message includes a reason for failure (S17140).

However, when the decoding of the second data is successful or the decoding of the second data is not performed, the base station can transmit the second data to the corresponding gateway, and notify the terminal of the transmission result through the result message (or RRC Direct uplink result message) (S17150).

Hereinafter, the step 17160 is the same as the step S16160 of FIG. 16a, and thus the description thereof will be omitted.

Figure 18A:
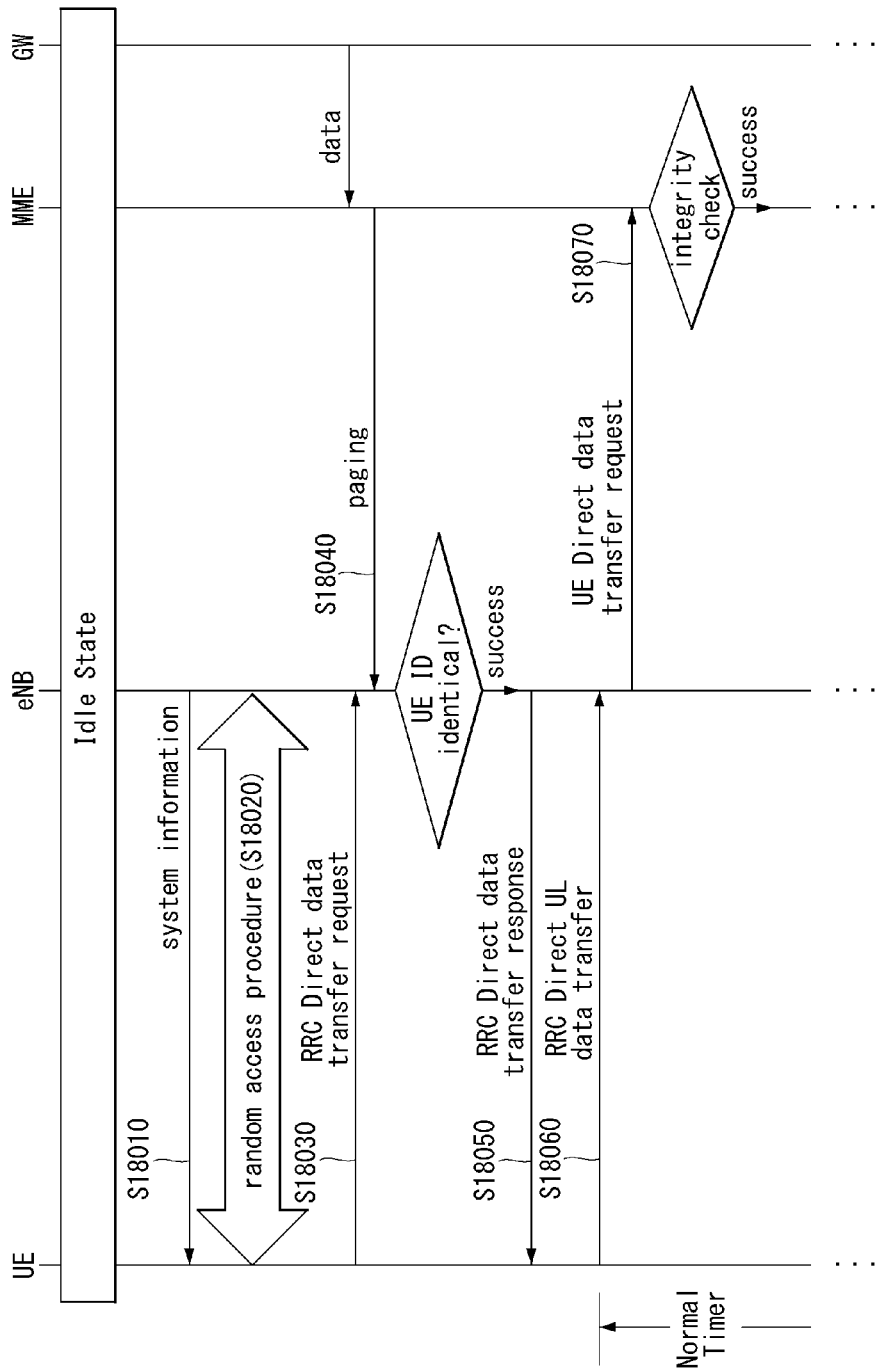
FIG. 18a and FIG. 18b is a flowchart illustrating an example of transmitting and receiving downlink data during uplink data transmission and reception to which the present invention can be applied.
Figure 18B:
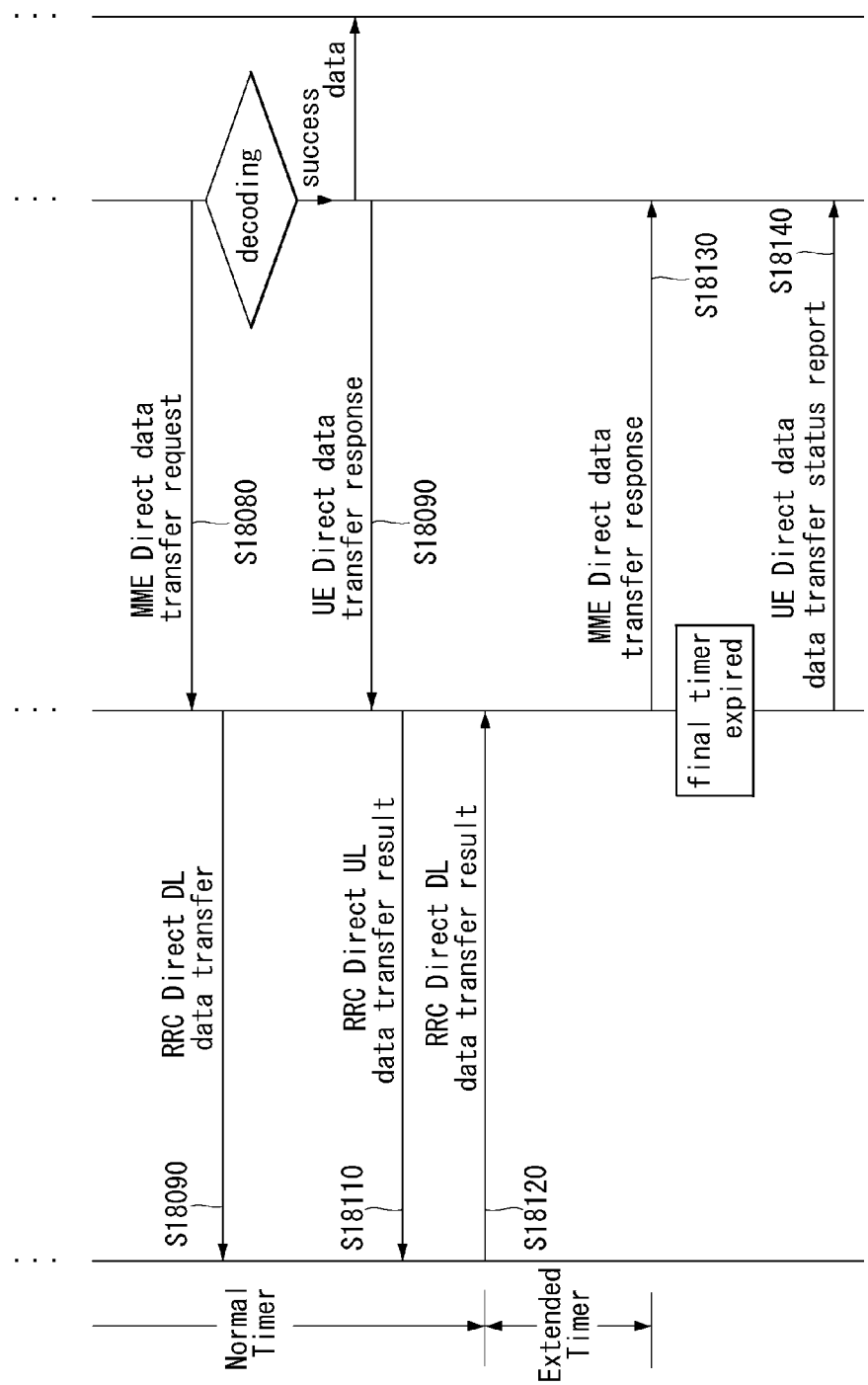

FIG. 18a and FIG. 18b is a flowchart illustrating an example of transmitting and receiving downlink data during uplink data transmission and reception to which the present invention can be applied.

Referring to FIG. 18a and FIG. 18b, in a process of transmitting data for providing a low latency service in an idle state, when downlink data is generated for providing a low latency service, the terminal can extend the release time point of the allocated resource to receive the downlink data through the base station and the Mobility Management Entity (MME).

First, steps S18010 and S18030 in FIG. 18 are the same as steps S15010 and S15030 in FIG. 15, and thus description thereof will be omitted.

Then, when downlink data (second data) for providing a low-latency service is generated from a gateway (e.g., S-GW, P-GW, Edge-GW or Centralized GW), the gateway transmits the second data to the MME. In this case, the gateway can transmit an identifier of the second data, i.e., the EPS bearer ID, the tunnel ID, etc., to the MME.

The MME transmits a paging message to the base station for the second data transmission (S18040).

The paging message may include at least any one of a DT Condition Information Element field for determining whether a data transmission scheme is used and a UE ID IE field indicating a terminal to be paged. The DT Condition Information Element field includes a DT indicator indicating that the data is to be transmitted in the idle state, a QCI indicating the characteristics of the data described in Table 1, or the maximum latency time (Required packet latency), an EPS bearer ID associated with the data.

The base station compares the UE ID IE field of the paging message transmitted from the MME with the UE ID IE field of the RRC Direct Transfer Request message transmitted from the UE, and when a terminal desiring to transmit the uplink data for providing the low latency service is identical to a terminal to receive to the uplink data for providing the low latency service, the base station can extend the release time point of the resource (e.g., Temporary C-RNTI) allocated to the terminal.

In this case, the terminal transmits the extension information element (Extension IE) including information related to extending the release time point to be included in a RRC Direct Data Transfer Response message in step S18050, a RRC Direct Downlink Data Transfer message in step S18090, or a RRC Direct Uplink data transmission result message in step S18110, thereby can explicitly indicate the release time point extension of the resource allocated to the terminal.

The extension information element field may include an extension time field indicating an extended release time point and a cause field indicating an extended reason.

Thereafter, the base station can transmit a response message (or an RRC Direct Data Transmission Response message) to the terminal in response to the request message (S18050).

The response message may include a UL resource IE field indicating an allocated resource, a target UE ID IE field indicating a terminal to which the resource is allocated, and/or the extended information element field.

The resource IE field and the target UE ID IE field indicating the terminal to which resources are allocated are the same as those described in FIG. 15.

The terminal transmits a transmission message (or an RRC Direct UL Data Transfer message) including the first data to the base station using the allocated resource through the response message (S18060).

The transmission message may include a UE ID IE field indicating a terminal identifier for identifying the terminal, and a Direct data NAS IE field including the low-latency service data to be transmitted to the MME.

In the UE ID IE field, the UE ID IE field may include an MME identifier for managing the terminal and an identifier for distinguishing the terminal in that MME. More specifically, the MME identifier may include at least one of a PLMN ID (Public Land Mobile Network Identifier) which is a network identification number, a MMEGI which is a MME group identifier, an MMEC (MME Code) indicating an MME code identifier, a M-TI which is a terminal identifier, a parameter for distinguishing an identifier allocated to a MME supporting any communication technology (e.g., 2G, 3G, LTE or LTE-A, etc.), or a parameter for distinguishing an identifier allocated to the other entity other than the MME, and it may not include the field transmitted in the step (S18030).

The Direct data NAS IE field may further include a Security IE field and a Data IE field.

The Security IE field may include at least one of a security header type indicating whether security is applied to the Data IE field including the first data, a key set identifier for identifying an EPS security context, or a MAC (Message Authentication Code) for determining integrity, or a NAS count.

According to the applied security, the Security header type may indicate one of not security protected indicating that security is not applied, Integrity Protected indicating that only integrity protection is applied, and Integrity protected and ciphered indicating that both integrity protection and encryption are applied.

The Data IE field may include the first data and an EPS bearer ID corresponding to the first data.

Thereafter, the base station transmits the UE ID IE and the Direct data NAS IE field to the MME to be included in a data transmission request message (or a UE Direct data transfer message) (S18070).

The MME determines validity (integrity) for the terminal according to information included in a Security IE field received from the base station, and determines whether the second data is transmitted or not to the terminal according to the determination result.

That is, when the terminal is valid, the base station transmits the MME Direct data transmission request message to be included in the second data to the base station (S18080)

The base station transmits a transmission message (or an RRC Direct downlink data transmission message) including the second data to the terminal (S18090). In this case, when the extension information element is not transmitted in the step (S18050), the extension information element may be transmitted to be included in the transmission message.

Thereafter, the MME performs decoding the first data, and when the first data is decoded or the decoding is not required, the MME transmits the first data to the corresponding gateway.

The MME transmits the transmission result of the first data to be included in the data transmission response message (or the UE Direct Data transmission response message) to the base station (S18090), and the base station transmits the transmission result to be included in the result message to the terminal (S18110).

In this case, when the extension information element is not transmitted in the steps (S18050 and S18090) the extension information element may be transmitted to be included in the result message.

The terminal may transmit a result message (or an RRC Direct downlink data transmission result message) including the transmission result of the second data to the base station (S18120), and the base station may transmit the transmission result of the second data received from the terminal to be included in the MME Direct data transmission response message to the MME (S18130).

Thereafter, when the extension time has expired, the base station can notify the MME that the extension time has expired through a report message (or a UE Direct Data transmission status report message) (S18140).

In this embodiment, in addition to transmitting the extension information element field to the terminal, after transmitting the result message, the base station can extend the resource release time point by using a method of delaying the transmission of the completion message.

Figure 19A:
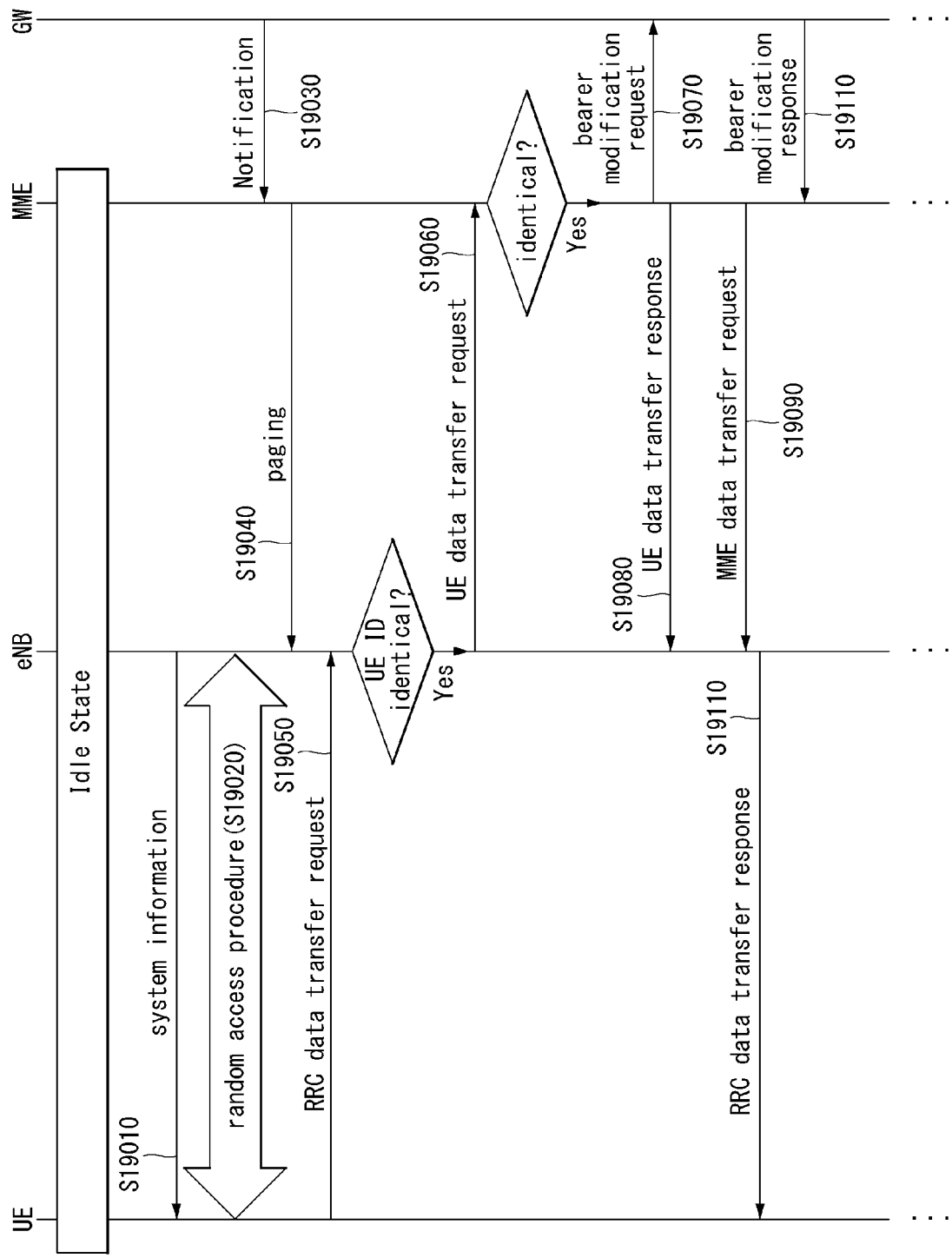
FIG. 19a and FIG. 19b is a flowchart illustrating yet another example of transmitting and receiving downlink data during uplink data transmission and reception to which the present invention can be applied.
Figure 19B:
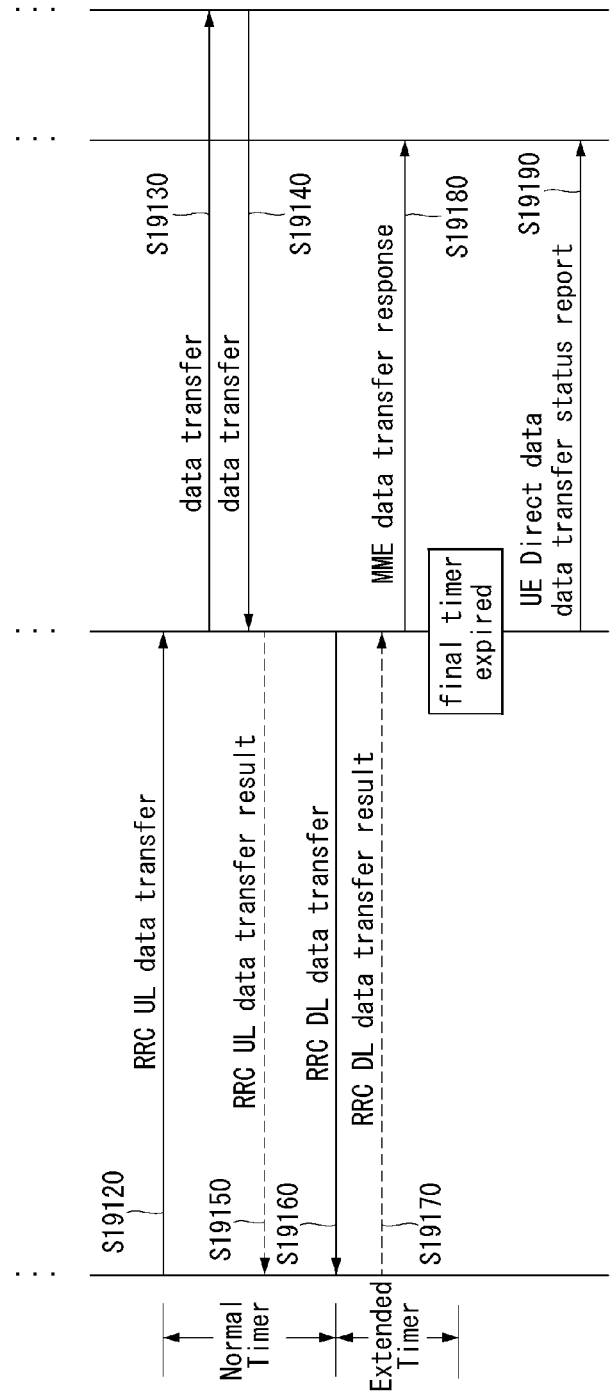

FIG. 19a and FIG. 19b is a flowchart illustrating yet another example of transmitting and receiving downlink data during uplink data transmission and reception to which the present invention can be applied.

Referring to FIG. 19a and FIG. 19b, in a process of transmitting data for providing a low latency service in an idle state, when the downlink data is generated for providing the low latency service, the terminal can extend the release time point of the allocated resource to receive the downlink data through the base station.

First, the steps S19010 and S19020 of FIG. 19a are the same as the steps S15010 and S15020 of FIG. 15a, and thus the description thereof will be omitted.

During the procedure for transmitting the uplink data (first data) for providing the low latency service, when data for providing urgent data or data for providing the low latency service (hereinafter, the second data) is generated to be transmitted from the gateway (e.g., S-GW, P-GW, Edge-GW, Centralized GW, etc.) to the terminal, the gateway can notify the MME (Mobility Management Entity) that the second data has been generated through a Notification message (S19030).

The MME having received the notification message transmits a paging message to the base station to transmit the data to the terminal (S19040).

The paging message may include a UE ID IE field indicating a terminal to which the data is to be transmitted, a data transmission condition IE field indicating a condition for determining with which manner whether to receive the data through by the terminal.

The data transmission condition IE field includes at least one of an indicator for indicating whether data is transmitted or received in an idle state, a QCI indicating characteristics of the data described in Table 1, a Required packet latency indicating a packet transmission and reception latency to be required for providing the low latency service, or an EPS bearer ID corresponding to the data.

Thereafter, when the base station supports data transmission and reception for providing the low latency service in the idle state, the terminal transmits the data transmission (RRC Data Transfer Request Message or Request Message) to the base station through the resource allocated in the step (S19020) to request the data transmission in an idle state (S19050).

In this case, the RRC data transmission request message may be the same as the message transmitted in the step (S15030) of FIG. 15a.

The base station compares the UE ID IE field of the paging message transmitted from the MME with the UE ID IE field of the RRC Data Transfer Request message transmitted from the UE, and when a terminal desiring to transmit the first data is identical to a terminal to receive to the second data, the base station can extend the release time point of the resource (e.g., Temporary C-RNTI) allocated to the terminal.

The terminal transmits an extension information element (Extension EI) field including information related to extending the release time point of the allocated resource to be included in the response message (or, an RRC data transmission response message) of the step (S19100) or in the result message (or, a RRC Direct uplink data transmission response message) of step S19150) to be confirmed in below to extend the release time point of the resource, thereby can explicitly indicate the release time point extension of the resource allocated to the terminal. The extension information element field may include an Extended Timer field indicating the extended release point, and a cause field indicating a reason for the extension.

The base station can transmit the UE ID IE field and the Data NAS IE field received through the request message to be included in the UE data transmission request message (S19060) to the MME, and in this case, a S1 Application protocol between the base station and the MME can be used.

The MME may perform the validity (integrity) check of the terminal according to the information included in the Security IE field received from the base station, and may determine whether to transmit data to the gateway according to the result.

That is, when the terminal is valid, the security setting for the terminal and the data necessary for setting the data path for the first data may be transmitted to be included in the UE data transmission response message (S19080).

Also, the MME can compare the terminal identifier to be paged by the MME with the terminal identifier included in the UE IE ID field received from the base station, and when the terminal identifiers are matched with each other, the MME may transmit to the gateway corresponding to the second data, the information of the base station to which the second data is to be transmitted and that the data is transmitted in an idle state, through the Bearer Modification Request message, (S19070), and may receive the Bearer Modification Response message in response to the Bearer Modification Request message (S19110).

Thereafter, the MME transmits security-related information for encryption and integrity protection of the transmitted messages and information related to the second data to be included in a MME data transmission request message to the base station (S19090).

However, when the terminal identifiers are not matched with each other, the MME may not transmit information necessary for security setting and data path setting for the terminal.

The security-related information may include an encryption algorithm supported by the terminal, an integrity protection algorithm supported by the terminal, and/or a basic key (e.g., $K_{eNB}$) for generating keys for encryption and integrity protection keys in the AS Security procedure shown in FIG. 10.

The information related to the data may include an EPS bearer ID for identifying a path for data transmission, a QoS indicating characteristics of the data, a size of the data, an address of a gateway to which the data is to be transmitted and/or a tunnel ID (e.g., GTP-TEID) indicating a tunnel for transmitting the data to the gateway.

In this case, when an encryption algorithm and an algorithm for integrity protection is selected according to the previously set scheme, the base station can receive the algorithm for encryption and integrity protection supported by the terminal from the MME, thereby it can know that the terminal is to use which algorithm for encryption and integrity protection.

Then, the base station may determine a Quality of Service (QoS) corresponding to the EPS bearer ID of the data to be transmitted by the terminal, e.g., QCI as shown in Table 1, or the resource allocation time point and the resource allocation size according to transmission urgency, and the UL resource IE indicating that resource allocation information is transmitted to be included in the response message (or RRC data transmission response message (Direct data Transfer response message) to the terminal (S19100).

In this case, as described above, the RRC data transmission response message may include an extension information element (Extension EI) field including information related to extension of the release time point of the allocated resource.

The terminal may include the first data and a data IE field including an EPS Bearer ID corresponding to the first data to be included in the transmission message (or an RRC UL Data Transfer Message) to the base station (S19120).

The transmission message is encrypted and protected in integrity by the terminal. That is, the PDCP layer of the terminal performs integrity protection on the transmission message using an integrity protection algorithm. In this case, an input field of the integrity protection algorithm can be a Count (e.g., Hyper frame number+PDCP sequence number), a Direction indicating a transmission direction of the data, a Bearer ID for identifying a transmission path of the data, an integrity key for integrity protection in the AS security procedure examined in FIG. 10, and the RRC uplink data transmission message. The authentication code (MAC-I, Message Authentication Code for Integrity) generated as a result of executing the integrity protection algorithm is in an encryption process together with the RRC uplink data transmission message.

The encryption procedure is performed using an encryption algorithm. The input field of the encryption algorithm can be the Count (e.g., Hyper frame number+PDCP sequence number), the Direction indicating the transmission direction of the data, the Bearer ID for identifying the transmission path of the data, a length of key stream and a key for encryption in the AS security procedure examined in FIG. 10.

The RRC uplink data transmission message and the authentication code can be encrypted by masking (XOR operation) with an encryption key stream resulting from the encryption algorithm.

Thereafter, the PDCP layer of the terminal adds a PDCP header including a security type indicating whether security for the RRC uplink data transmission message is applied.

According to the applied security, the Security header type may indicate one of not security protected indicating that security is not applied, Integrity Protected indicating that only integrity protection is applied, and Integrity protected and ciphered indicating that both integrity protection and encryption are applied.

The base station receiving the transmission message decodes the message, verifies whether or not to be integral, and determines whether the first data is transmitted or not to the gateway (e.g., S-GW, P-GW, Edge-GW or Centralized GW), according to the result.

That is, when the transmission message transmitted from the terminal is not altered (or damaged) or lost, the base station transmits the first data to the gateway corresponding to the EPS Bearer ID of the data (S19130).

Thereafter, the base station can receive the second data from the gateway (S19140), and transmit a result message (or an RRC uplink data transmission result message) to the terminal to notify whether the first data has been successfully transmitted or not (S19150). In this case, when the extension information element (Extension EI) field is not transmitted in the step (S19100), the result message may include the extension information element field.

The base station transmits a data IE field including an EPS bearer ID corresponding to the second data and the second data received from the gateway to be included in the transmission message (or an RRC downlink data transmission message) to the terminal (S19160).

The RRC downlink data transmission message is encrypted and protected in integrity by the base station. That is, the PDCP layer of the base station performs integrity protection on the RRC downlink data transmission message using a protection algorithm.

In this case, an input field of the integrity protection algorithm includes a Count (e.g., a Hyper frame number+PDCP sequence number), a Direction indicating a transmission direction of the data, a Bearer ID for identifying a transmission path of the data, an integrity key for integrity protection in the AS security procedure examined in FIG. 10, and the RRC uplink data transmission message. The authentication code (MAC-I, Message Authentication Code for Integrity) generated as a result of executing the integrity protection algorithm is in an encryption process together with the RRC uplink data transmission message.

The encryption procedure is performed using an encryption algorithm. The input field of the encryption algorithm can be the Count (e.g., Hyper frame number+PDCP sequence number), the Direction indicating the transmission direction of the data, the Bearer ID for identifying the transmission path of the data, a length of key stream and a key for encryption in the AS security procedure examined in FIG. 10.

The RRC downlink data transmission message and the authentication code can be encrypted by masking (XOR operation) with an encryption key stream resulting from the encryption algorithm.

Thereafter, the PDCP layer of the terminal adds a PDCP header including a security type indicating whether security for the RRC downlink data transmission message is applied.

According to the applied security, the Security header type may indicate one of not security protected indicating that security is not applied, Integrity Protected indicating that only integrity protection is applied, and Integrity protected and ciphered indicating that both integrity protection and encryption are applied.

The terminal receiving the RRC downlink data transmission message, decodes the RRC downlink data transmission message and checks whether or not to be integral.

When it is determined that the RRC downlink data transmission message transmitted from the base station is not changed or lost, the terminal transmits the result message (or an RRC downlink data transmission result message) to the base station to notify that the data has been successfully transmitted (S19170).

The base station receiving the result message may inform the MME of the transmission result of the data by transmitting an MME data transmission response message (S19180), and when the extension time has expired, the base station transmits a report message (or UE Direct Data transfer status report message) to the MME to notify the MME that the extension time has expired (S1990).

Figure 20A:
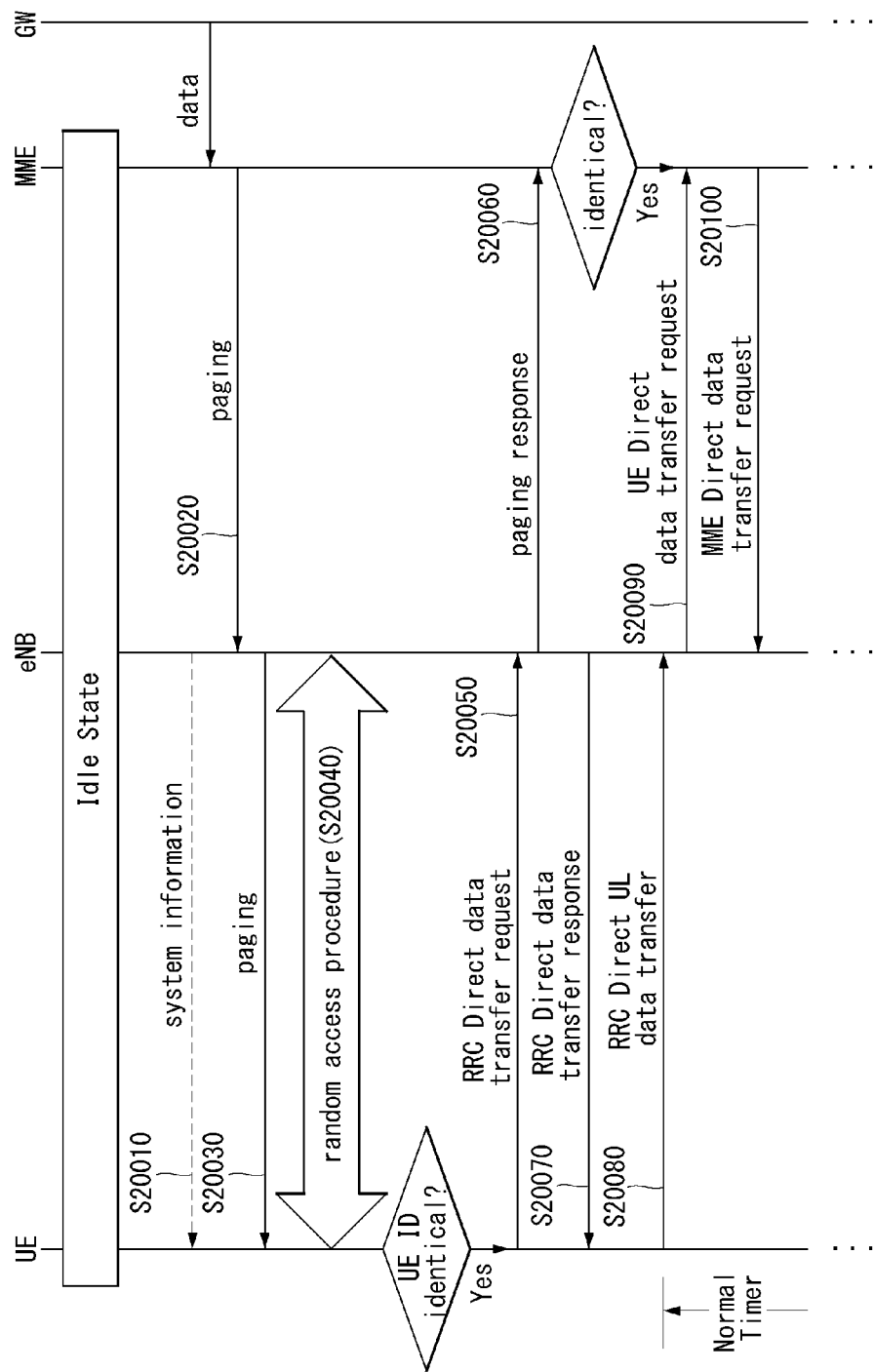
FIG. 20a and FIG. 20b is a flowchart illustrating an example of transmitting and receiving uplink data during downlink data transmission and reception to which the present invention can be applied.
Figure 20B:
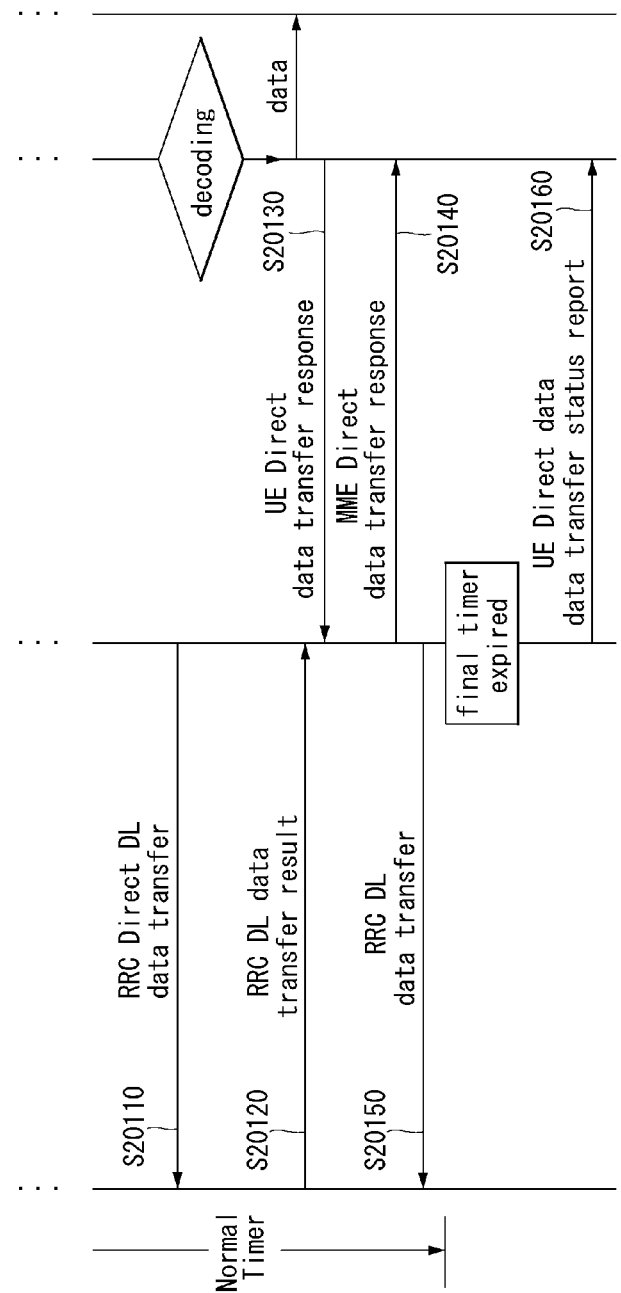

FIG. 20 is a flowchart illustrating an example of transmitting and receiving uplink data during downlink data transmission and reception to which the present invention can be applied.

Referring to FIG. 20, in a process of receiving data for providing a low latency service in an idle state, when the uplink data is generated for providing the low latency service, the terminal can receive the uplink data through the base station and the MME.

Specifically, the UE can receive from the base, station system information including information necessary for receiving downlink data (first data) for providing the low-latency service from the base station (S20010).

The system information is a message periodically transmitted by the base station, and it may include a support field indicating whether the base station supports data transmission and reception for providing a low latency service in an idle state, and resource information used in a random access procedure for transmitting and receiving the data.

Thereafter, when the first data is generated from a gateway (e.g., S-GW, P-GW, Edge-GW, Centralized GW, etc.), the gateway transmits the first data to the MME. In this case, the gateway may transmit the identifier of the first data, i.e., the EPS bearer ID, the tunnel ID, etc., to be included in the message to the MME.

The MME transmits a paging message to the base station for data transmission in the step (S20020), and the base station transfers the paging message to the terminal in step S20030.

The paging message includes a DT condition information element field for determining whether a data transmission method is used and a UE ID IE field indicating a terminal to be paged. The DT Contention Information Element field includes at least one of a DT indicator indicating that the data is to be transmitted in the idle state, a QCI indicating the characteristics of the data described in Table 1, a Required Packet Delay), or the maximum allowable latency time (Required packet latency) as in Table 2, an EPS bearer ID associated with the data.

When the terminal satisfies the condition included in the DT condition IE field of the paging message, the terminal performs the random access procedure described in FIG. 13 with the base station (S20040). For example, when receiving the following paging message, the terminal can perform the random access procedure with the base station if the terminal satisfies the condition included in the following paging message.

Receiving a paging message having a DT indicator value of 1 (when the value of the DT indicator is '1', it means that data is transmitted and received in an idle state).
Receiving a paging message containing a QCI corresponding to a packet latency budget below a specified value.
Receiving a paging message containing an EPS bearer ID corresponding to a packet latency budget below a specified value.
Receiving a paging message containing a value below a specified value for Required packet latency.

In order to perform the random access procedure, the terminal transmits a Random Access Preamble to the base station, and when receiving the Random Access Preamble, the base station transmits a Random Access Response to the terminal.

Specifically, the downlink scheduling information for the random access response message may be CRC-masked with a Random Access-Radio Network Temporary Identifier (RA-RNTI) and transmitted on an L1 or L2 control channel (PDCCH). The UE receiving the downlink scheduling signal masked with RA-RNTI can receive and decode the random access response message from the PDSCH (Physical Downlink Shared Channel). Then, the UE checks whether there is random access response information indicated to itself in the random access response message.

Whether or not there is random access response information indicated to the UE itself can be confirmed by whether or not there is a RAID (Random Access Preamble ID) for the preamble transmitted by the UE.

The random access response information includes TA (Timing Alignment) indicating timing offset information for synchronization, radio resource allocation information used in uplink, and a temporary identifier (e.g., Temporary C-RNTI) for UE identification, and the like.

Thereafter, the terminal determines whether or not there is uplink data (second data) for providing a low latency service, and when the second data exists, a procedure for transmitting the second data is performed.

The terminal may transmit a request message (or an RRC Direct data Transfer request message) to the base station for the second data transmission request (S20050). The request message may include a UE ID IE field, a Tx indicator, a QoSIE field, and a Direct data NAS information element field described in FIG. 15b.

In this case, the Tx indicator may include a value indicating that the request is for bidirectional data transmission and reception, and the base station transmits a UE ID IE field and a Direct data NAS information element field received from the terminal to be included in a paging response message to the MME using the S1 Application protocol (S20060).

The base station may determine a resource allocation time and a resource allocation size, according to information of a QoSIE field corresponding to the second data, i.e., the QCI, according to the transmission urgency based on the maximum latency time, or the data size, and transmit the UL resource IE indicating the corresponding resource allocation information to the terminal to be included in a Direct data Transfer response message or response message (S20070).

Since there may be a plurality of terminals selecting the same resource and random access code (or preamble) in the random access procedure, the response message may include a target UE ID IE field indicating that the allocated resource is allocated to which terminal.

The target UE ID IE field may include one or more fields including the UE ID IE received in step S20050, and it may have the format as shown in Table 3.

The MME determines validity (integrity) of the terminal according to information included in a security information element (Security IE) field received from the base station, and determines whether to transmit data to the terminal according to the determination result.

Thereafter, the terminal transmits a transmission message (or an RRC Direct UL Data Transfer message) including the second data to the base station through the resource allocated through the response message (S20080).

The transmission message may include a UE ID IE field indicating a UE ID for identifying the terminal and a Direct data NAS IE field including the second data, and a field transmitted in the step (S20050) among the fields, may not be transmitted.

Thereafter, the base station transmits the UE ID IE field and the Direct data NAS IE field received from the terminal to the MME to be included in the data transmission request message (or a UE Direct data transmission request message) (S20090).

When the terminal is valid, the MME transmits the first data to be included in the Direct data NAS IE field of the MME Direct Data Transfer Request message to the base station (S20100), and decodes the second data received from the base station to transmit it to the corresponding gateway, and transmits a transmission result to the base station to be included in a transmission response message (or a UE Direct data transmission response message) (S20130).

The base station transmits the Direct data NAS information element field received from the MME to the terminal by including it in a downlink data transmission message (or an RRC Direct DL Data Transfer message) (S20110).

The terminal transmits to the base station whether the data has been successfully received to be included in the result message (or an RRC Direct downlink data transmission result message) (S20120), and the base station transmits the transmission result to be included in the transmission response (or, an MME Direct Data Transfer Response message) to the MME (S20140).

Thereafter, the base station transmits the result of the second data transmitted from the MME to the terminal to be included in the result message (or an RRC Direct uplink data transmission result message) (S20150), when the allocated time of radio resource has expired (normal timer), a report message (or UE Direct data transmission status report message) may be transmitted to the MME to notify the MME that the allocated resource has been released (S20160).

Figure 21A:
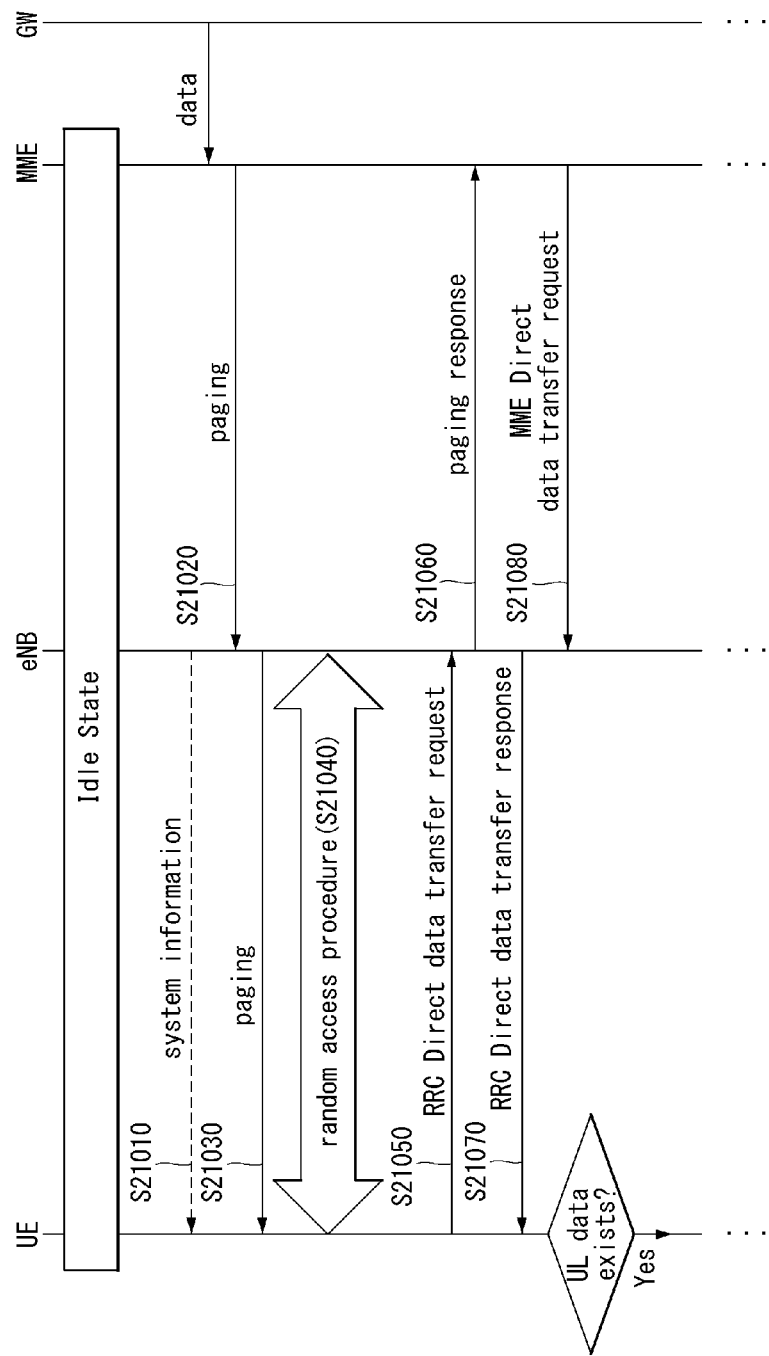
FIG. 21a and FIG. 21b is a flowchart illustrating yet another example of transmitting and receiving uplink data during downlink data transmission and reception to which the present invention can be applied.
Figure 21B:
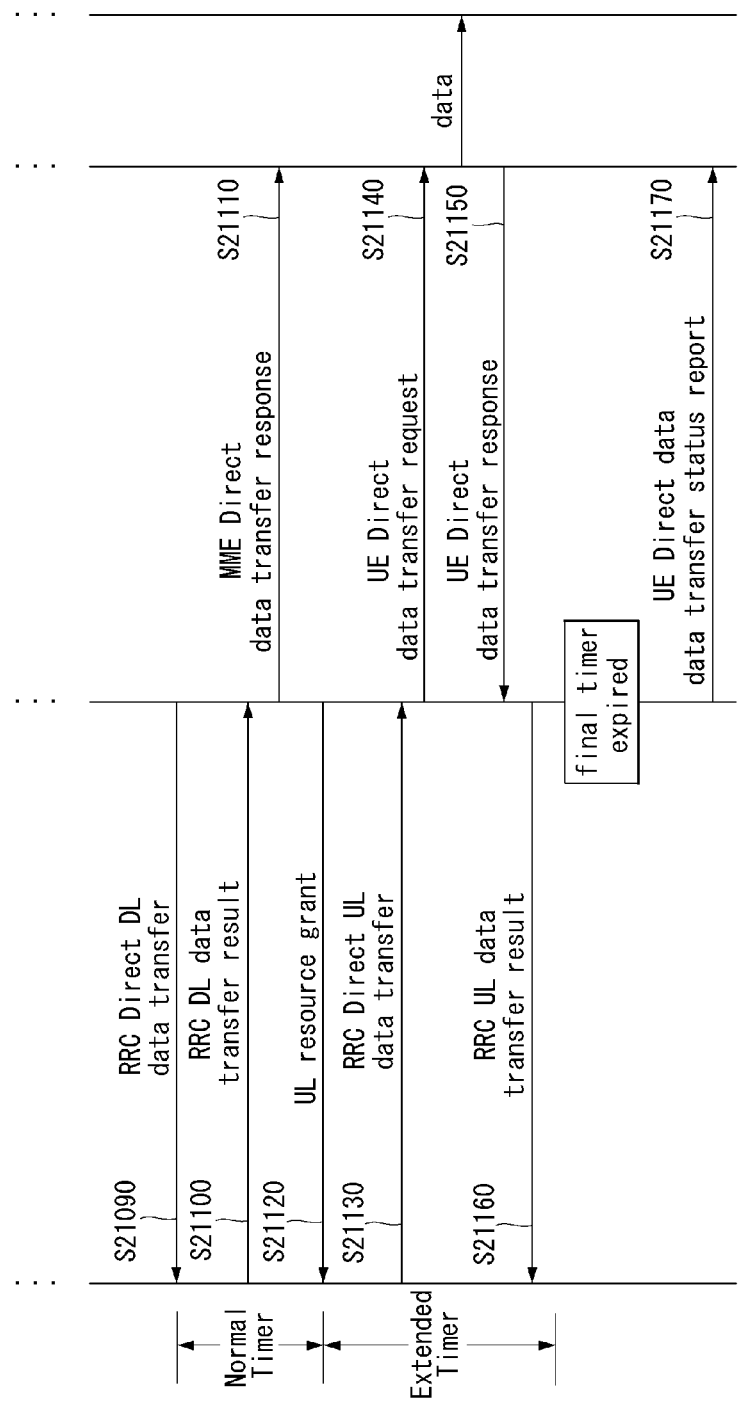

FIG. 21a and FIG. 21b is a flowchart illustrating yet another example of transmitting and receiving uplink data during downlink data transmission and reception to which the present invention can be applied.

Referring to FIG. 21a and FIG. 21b, in a process of receiving data for providing a low latency service in an idle state, when the uplink data is generated for providing the low latency service, the terminal can extent the release time point of the allocated resource to receive the downlink data through the base station and the MME.

First, steps S21010 to S21040 are the same as steps S20010 to S20040 of FIG. 20a, and thus description thereof will be omitted.

The terminal transmits a request message (or, a RRC Direct Data Transfer request message) to the base station in order to request the reception of downlink data (first data) for providing a low-latency service transmitted from the gateway (S21050). The request message may include a UE ID IE field, a Tx indicator, and a Direct data NAS information element field described with reference to FIG. 15.

The UE ID IE may include at least one of an MME identifier for managing the terminal and an identifier for identifying the UE in that terminal. More specifically, it may include at least any one of a public land mobile network identifier (PLMN ID) which is an operator network identification number, a MME group identifier (MMEGI), MMEC (MME Code) indicating a MME Code identifier, a MME Temporary Mobile Subscriber Identity (M-TI) indicating a terminal identifier, and a parameter for distinguishing an identifier allocated from an MME supporting any communication technology, or a parameter for distinguishing an identifier allocated to another entity other than the MME.

When there is no direct communication path (e.g., S1 interface) between the MME and the base station corresponding to the MME identifier, the base station can request another MME to process authentication and context information for the terminal, and the MME and the another MME may exchange context information for the terminal.

The Direct data NAS information element field may include at least one of a security information element (Security IE) field for determining the validity (integrity) of the terminal. The security information element field includes a security header type for determining whether or not to be integral, a key set identifier and an NAS counter for identifying an EPS security context, or an authentication code (MAC: Message Authentication Code) for determining whether or not to be integral.

The security header type indicates whether integrity protection is applied or not and whether encryption is applied or not.

The base station may transmit the UE ID IE field and the Direct data NAS information element field received from the terminal to be included in the paging response message to the MME using the S1 Application protocol (S21060).

Thereafter, the base station may transmit a response message (or a RRC Direct Data Transmission Response message) including the target UE ID IE field indicating the terminal to which the first data is transmitted to the terminal (S21070).

The target UE ID IE field may be composed of one or more fields including the UE ID IE received in the step (S21050), and it may have a format as shown in the Table 3.

The MME determines the validity (integrity) of the terminal according to information included in a Security IE field received from the base station through the paging response message, and determines whether or not to transmit the data to the terminal according to the determination result.

That is, when the terminal is valid, the MME transmits the first data to the base station to be included in the first data in the Direct data NAS IE field of the MME Direct Data Transfer message (S21080).

When the terminal is not valid, the MME notifies the terminal of authentication failure through the base station.

The Direct data NAS information element field may include a security IE field and a data IE field.

The Security IE field may include at least one of a security header type indicating whether security is applied in the Data IE field, a key set identifier for identifying an EPS security context, a NAS count, or a MAC (Message Authentication Code) for determining whether or not to be integral.

According to the applied security, the Security header type may indicate one of not security protected indicating that security is not applied, Integrity Protected indicating that only integrity protection is applied, and Integrity protected and ciphered indicating that both integrity protection and encryption are applied.

The Data IE field may include the first data and an EPS bearer ID corresponding to the first data.

Thereafter, the terminal may determine whether there is the uplink data (second data) for providing a low-latency service. When the second data exists, the terminal can request to extend the release time point of resources (e.g., Temporary C-RNTI, C-RNTI) allocated to itself through the step (S21100).

The base station transmits the Direct data NAS IE field to the terminal to be included in the transmission message (or a RRC Direct DL Data Transfer message) (S21090).

The terminal decrypts the encrypted data IE and notifies the base station of whether the data has been successfully transmitted through a result message (or an RRC Direct downlink data transmission result message) (S21100).

In this case, as described above, it is possible to extend the release time point of the resources allocated for transmitting the second data, and an Extension IE field including the information related to the release time point extension is transmitted to be included in the result message, thereby can request to extend the release time point of the resource allocated to the base station.

The extension information element field may include an extension time point field indicating an extended release time point, a cause field indicating an extended reason, and a QoSIE field indicating a characteristics and size of the second data, and the like.

The base station transmits the transmission result received from the terminal to the MME to be included in a transmission response message (or an MME Direct Data transmission response message) (S21110).

The base station allocates to the terminal, a radio resource for transmission of the second data corresponding to a QoSIE of an extended information element field transmitted from the terminal (S21120).

The terminal may transmit the second data through the radio resource allocated in the step (S21120) to the base station in a transmission message (or an RRC Direct uplink data transmission message) (S21130).

In this case, the second data may be encrypted with the first data in the same manner or may be processed differently, and when the second data is encrypted, it may be encrypted through the NAS key.

The base station having received the second data may transmit the data IE field including the second data to the MME through a data transmission request message (or a UE Direct data transmission request message) (S21140), and when decoding of the second data succeeds or the second data does not require decoding, the second data may be transmitted to the gateway corresponding to the second data.

Thereafter, the MME transmits a transmission response message (or a UE Direct data transmission response message) to be included the transmission result of the second data to the base station (S21150), and the base station transmits the transmission result message of the second data receiving from the MME to the terminal to be included in the result message (or the RRC uplink data transmission result message) to the UE (S21160).

When the extension time has expired, the base station may transmit a report message (or a UE Direct data transmission status report message) to the MME to notify that the extension time has been expired (S21170).

Figure 22A:
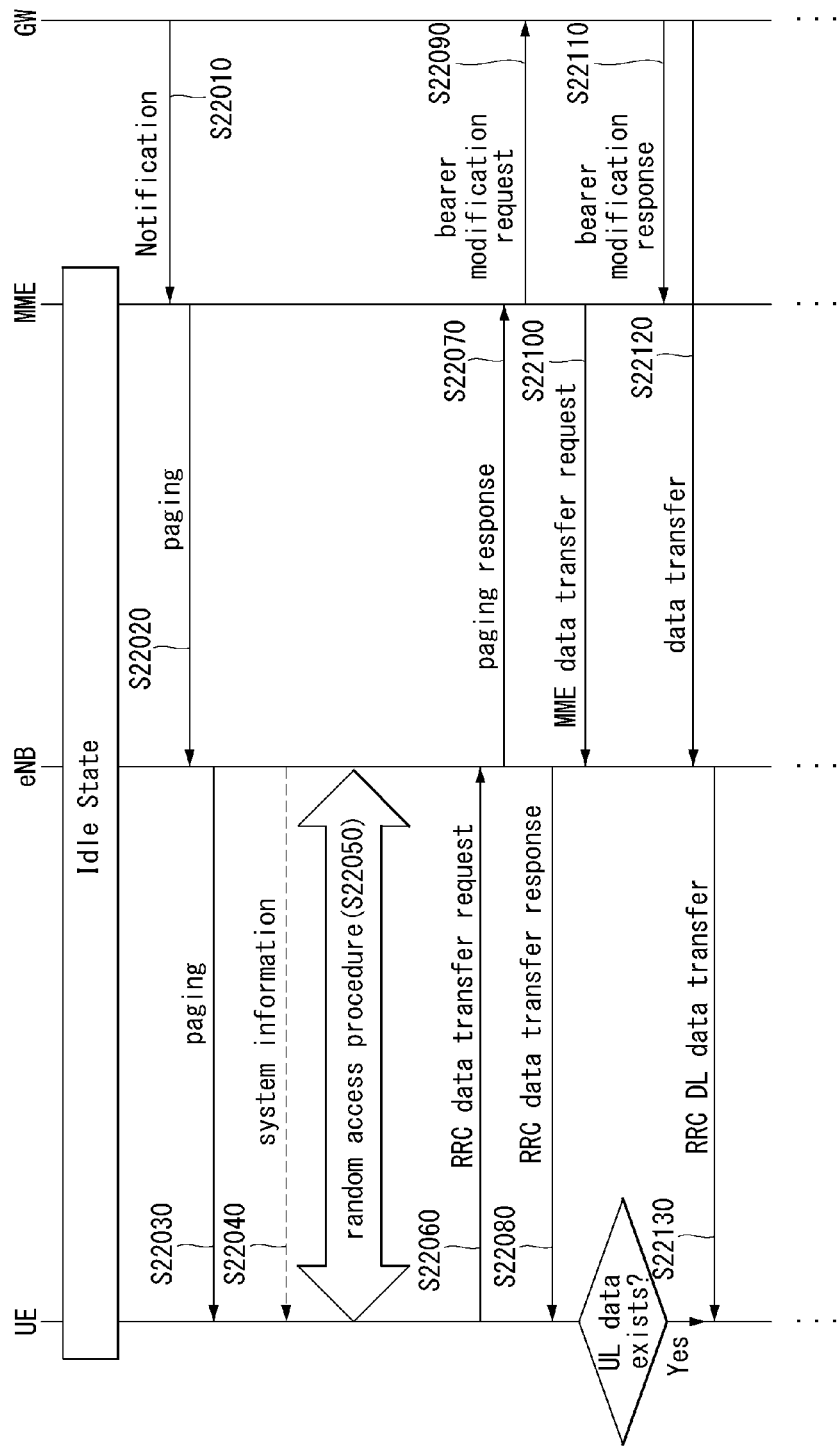
FIG. 22a and FIG. 22b is a flowchart illustrating yet another example of transmitting and receiving uplink data during downlink data transmission and reception to which the present invention can be applied.
Figure 22B:
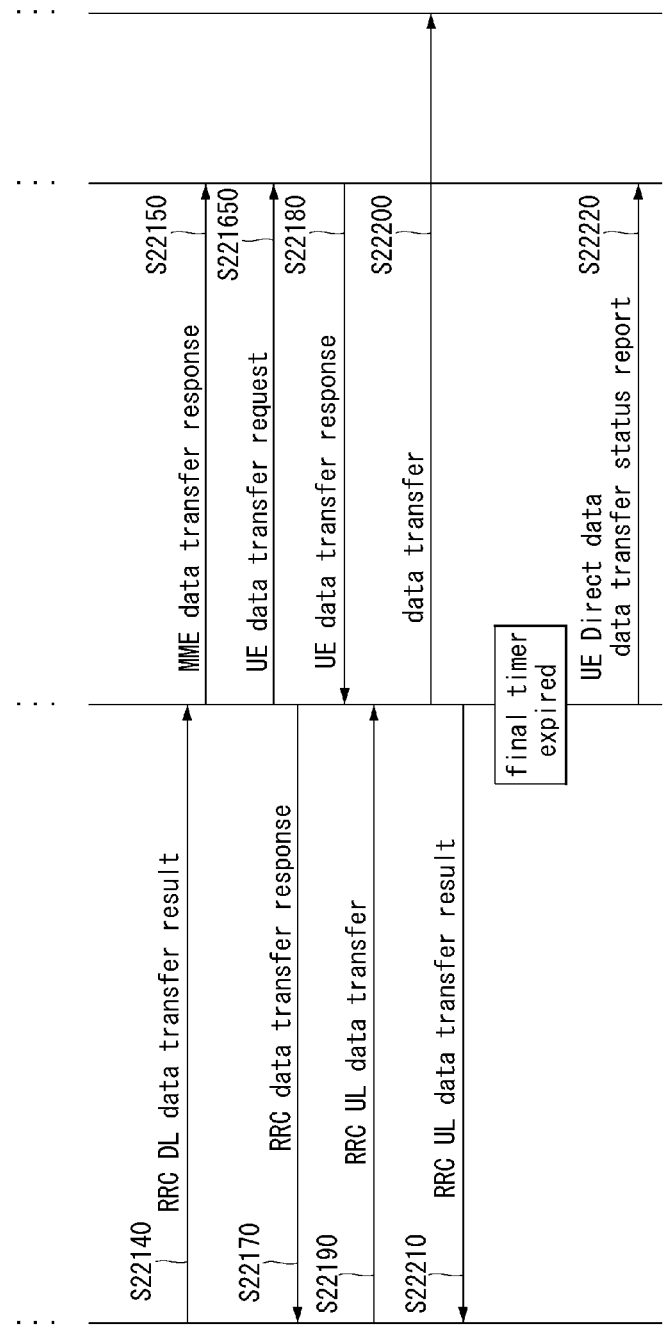

FIG. 22a and FIG. 22b is a flowchart illustrating yet another example of transmitting and receiving uplink data during downlink data transmission and reception to which the present invention can be applied.

Referring to FIG. 22a and FIG. 22b, in a process of receiving data for providing a low latency service in an idle state, when the uplink data is generated for providing the low latency service, the terminal can extend the release time point of the allocated resource to receive the downlink data through the base station.

Specifically, when data (first data) is generated for providing low latency data or urgent data to be transmitted from the gateway (e.g., S-GW, P-GW, Edge-GW, Centralized GW etc.) to the terminal, the gateway can notify the MME (Mobility Management Entity Mobility Management Entity) through a Notification message that the first data has generated (S22010).

In order to notify the base station of the presence of the first data to be transmitted to the terminal, the MME having received the notification message transmits a paging message to the base station (S22020), and the base station transmits the paging message to the terminal (S22030).

The paging message may include a UE ID IE field indicating the terminal to which the data is to be transmitted, a data transmission condition IE field indicating a condition for determining through which manner whether the terminal is to receive the data, and a supporting IE field including system information necessary for data transmission and reception in an idle state.

The data transmission condition IE field includes at least one of an indicator for indicating whether data is transmitted or received or not in an idle state, a QCI indicating a characteristic of the data shown in Table 1, a Required packet latency indicating a packet transmission and reception latency required for providing the low latency service, or an EPS bearer ID corresponding to the data.

The supporting IE field indicates at least one of whether the base station supports data transmission and reception for providing a low latency service in an idle state, resource information for a random access procedure, or a security algorithm supported by the base station.

In this case, the supporting IE field may be transmitted through a system information message transmitted from the base station (S22040).

When the security algorithm included in the paging message or the system information message is a plurality of security algorithms, the terminal can select one of the security algorithms, and the security algorithm can be selected in the same manner as examined in the FIG. 16a and FIG. 16b.

The selected encryption algorithm and the integrity assurance algorithm may thereafter be transmitted to the base station through the step (S22060).

When the base station does not support data transmission and reception for providing a low latency service in the idle state, the terminal received the system information performs a random access procedure as shown in the FIG. 13 with the base station to transmit and receive data by transitions to a connection state.

However, when one or more of the following conditions included in the transmission condition IE field is satisfied, the terminal performs the random access procedure as shown in FIG. 13 with the base station in order to request resource allocation for data transmission and reception (S22050).

When the indicator included in the paging message indicates data transmission and reception in an idle state Receiving a paging message containing a QCI corresponding to a packet latency budget below a specified value.

Receiving a paging message containing an EPS bearer ID corresponding to a packet latency budget below a specified value.

Receiving a paging message containing a value below a specified value for Required packet latency.

In the random access procedure, the terminal transmits a Random Access Preamble to the base station, and when receiving the Random Access Preamble, the base station transmits a Random Access Response to the terminal.

Specifically, the downlink scheduling information for the random access response message may be CRC-masked with a Random Access-Radio Network Temporary Identifier (RA-RNTI) and transmitted on an L1 or L2 control channel (PDCCH). The UE receiving the downlink scheduling signal masked with RA-RNTI can receive and decode the random access response message from the PDSCH (Physical Downlink Shared Channel). Then, the UE checks whether there is random access response information indicated to itself in the random access response message.

Whether or not there is random access response information indicated to the UE itself can be confirmed by whether or not there is a RAID (Random Access Preamble ID) for the preamble transmitted by the UE.

The random access response information includes TA (Timing Alignment) indicating timing offset information for synchronization, radio resource allocation information used in uplink, and a temporary identifier (e.g., Temporary C-RNTI) for UE identification, and the like.

When the base station supports data transmission and reception for providing a low latency service in an idle state, the terminal transmits a request message (or, a RRC Data Transfer Request Message) to request transmitting the first data through the allocated resource to the base station, thereby requesting data reception for providing a low latency service in an idle state (S22060).

The request message may include a message type field indicating a message type, a UE ID IE field indicating a terminal identifier for identifying the terminal, a TX indicator indicating whether the RRC data transmission request message is a message for data transmission, or a message for data reception not, and a Data NAS IE field indicating information for determining the validity of the terminal when the message is a request for data reception (i.e., downlink data).

The UE ID IE may include an MME identifier for managing the UE and an identifier for distinguishing the UE in the MME. More specifically, it may include at least any one of a public land mobile network identifier (PLMN ID) which is an operator network identification number, a MME group identifier (MMEGI), MMEC (MME Code) indicating a MME Code identifier, a MME Temporary Mobile Subscriber Identity (M-TI) indicating a terminal identifier, and a parameter for distinguishing an identifier allocated from an MME supporting any communication technology, or a parameter for distinguishing an identifier allocated to another entity other than the MME.

When there is no direct communication path (e.g., S1 interface) between the MME and the base station corresponding to the MME identifier, the base station can request another MME to process authentication and context information for the terminal, and the MME and the another MME may exchange context information for the terminal.

The Data NAS IE field may include a Security IE field including information for determining the validity (integrity) of the terminal.

The Security IE field may include at least one of a security header type indicating whether security is applied to the Data IE field including the first data, a key set identifier for identifying an EPS security context, or a MAC (Message Authentication Code) for determining integrity, or a NAS count.

According to the applied security, the Security header type may indicate one of not security protected indicating that security is not applied, Integrity Protected indicating that only integrity protection is applied, and Integrity protected and ciphered indicating that both integrity protection and encryption are applied.

In response to the paging message, the base station transmits in the UE data transmission request message a paging response message including the UE ID IE field and the Data NAS IE field received through the RRC data transmission request message to the MME (S22070), and the S1 Application protocol between the base station and the MME can be used.

In addition, the base station transmits a response message (or an RRC Direct data Transmission Response message) to the terminal in response to the request message, and the response message includes a target UE ID field indicating the terminal from which the data is transmitted (S22080).

Thereafter, the terminal determines whether or not three is uplink data (second data) for providing the low latency service, and performs a procedure for transmitting the second data as a determination result.

In order to transmit the uplink data, the terminal may request the release time point extension of the resource (e.g., Temporary C-RNTI) allocated to the terminal, by transmitting a result message (or RRC downlink data transfer result message) of the step (S22140) to be examined below to a base station.

Thereafter, the MME performs validity (integrity) check of the terminal according to information included in the Security IE field of the Data NAS IE field received through the paging response message.

When the terminal is not valid, the MME can notify the base station that the terminal is not valid through an MME data transmission request message. For example, the terminal may notify the base station through the UE data transmission request message that the terminal is determined as an invalid terminal due to a failure in authentication, or that the EPS bearer for transmitting the data is invalid.

However, when the terminal is valid, the MME transmits to the gateway corresponding to the EPS Bearer ID of the data, the information of the base station to which the data is to be transmitted and that the data is transmitted in the idle state, through a bearer modification request message (S22090).

In addition, the MME transmits security-related information for encryption and integrity protection of transmitted messages or information related to the first data to be included in the MME Direct data transmission request message to the base station (S22100).

The security-related information may include an encryption algorithm supported by the terminal, an integrity assurance algorithm supported by the terminal, and/or a basic key (e.g., $K_{eNB}$) for generating keys for encryption and integrity protection keys in the AS Security procedure shown in FIG. 10.

The information related to the data may include an EPS bearer ID for identifying a path for data transmission, a QoS indicating characteristics of the data, a size of the data, an address of a gateway to which the data is to be transmitted and/or a tunnel ID (e.g., GTP-TEID) indicating a tunnel for transmitting the data to the gateway.

In this case, when the encryption algorithm and the algorithm for ensuring integrity are selected according to the previously set method, the base station can receive the algorithm for encryption and integrity assurance supported by the terminal from the MME, and thus it is possible to know which encryption and integrity assurance algorithm to be used by the terminal.

Thereafter, the MME receives a bearer modification response message in response to the bearer modification request message from the gateway (S22110), and the base station can receive the first data from the gateway (S22120).

The base station receiving the first data from the gateway, transmits a data IE field including the EPS bearer ID corresponding to the first data and the first data to be included in a transmission message (or an RRC Direct downlink data transmission message) to the terminal (S22130).

The transmission message is encrypted and protected in integrity by the base station. That is, the PDCP layer of the base station performs integrity protection on the RRC downlink data transmission message using the integrity protection algorithm determined in the step (S22080).

In this case, an input field of the integrity protection algorithm can be a Count (e.g., Hyper frame number+PDCP sequence number), a Direction indicating a transmission direction of the data, a Bearer ID for identifying a transmission path of the data, an integrity key for integrity protection in the AS security procedure examined in FIG. 10, and the RRC uplink data transmission message. The authentication code (MAC-I, Message Authentication Code for Integrity) generated as a result of executing the integrity protection algorithm is in an encryption process together with the RRC uplink data transmission message.

The encryption procedure is performed using an encryption algorithm. The input field of the encryption algorithm can be the Count (e.g., Hyper frame number+PDCP sequence number), the Direction indicating the transmission direction of the data, the Bearer ID for identifying the transmission path of the data, a length of key stream and a key for encryption in the AS security procedure examined in FIG. 10.

The RRC uplink data transmission message and the authentication code can be encrypted by masking (XOR operation) with an encryption key stream resulting from the encryption algorithm.

Thereafter, the PDCP layer of the UE adds a PDCP header including a security type indicating whether security for the RRC uplink data transmission message is applied.

According to the applied security, the Security header type may indicate one of not security protected indicating that security is not applied, Integrity Protected indicating that only integrity protection is applied, and Integrity protected and ciphered indicating that both integrity protection and encryption are applied.

The terminal receiving the RRC Direct downlink data transmission message decodes the RRC downlink data transmission message and checks whether or not to be integral.

When the RRC Direct downlink data transmission message transmitted from the base station is not changed or lost as a result of the check, the terminal transmits a result message (or an RRC Direct downlink data transmission result message) to the base station to notify that the data has been successfully transmitted (S22140).

The result message is a message for notifying the base station of the transmission result of the downlink data, ands as described above, in order to request the extension of the release time point of the allocated resource, it may include an extension element field including information related to the release time point The extension element field may include a release time information field indicating a release request time point, a cause field indicating a reason for extension of the release time point, and a QoSIE field indicating a characteristic of the second data.

Thereafter, the base station transmits an MME Direct data Transmission Response message to the MME to notify the transmission result of the first data (S22150), and transmits a transmission request message (or a UE Direct data transmission request message), thereby can notify the MME of the presence of the second data to be transmitted to the gateway by the terminal (S22160).

The base station determines information of the quality of service (QoS) IE field corresponding to the EPS bearer ID of the uplink data to be transmitted by the UE, e.g., QCI as shown in Table 1, or the resource allocation time point and the resource allocation size according to transmission urgency, and the UL resource IE indicating that resource allocation information is transmitted to be included in the response message (or RRC data transmission response message (Direct data Transfer response message)) to the terminal (S22170).

The base station may receive a transmission response message (or a UE Direct data transmission response message) in response to the transmission request message from the MME (S22180).

Thereafter, the terminal transmits a data IE field including an EPS bearer ID corresponding to the second data and the second data to be included in a transmission message (or an RRC UL Data Transfer Message) to the base station (S21190).

The base station may transmit the second data to the gateway corresponding to the EPS Bearer ID of the second data (S21200), and notify the transmission result of the second data through the result message (or the RRC Direct uplink data transmission result message) to the terminal (S22210).

Thereafter, when the extension time has expired, the base station may transmit a report message (or a UE Direct data transmission status report message) to the MME to notify that the extension time has expired (S22220).

When the uplink data is generated while receiving the downlink data for providing the low-latency service through the above method, the uplink data can be transmitted to the gateway. Particularly, when uplink data is generated after the step (S22060), the uplink data may be transmitted through the present embodiment.

When the MME Direct data transmission request message of the step (S22100) includes information on all data bearers which the terminal has, the steps S22160 and S22180 may be omitted.

Figure 23A:
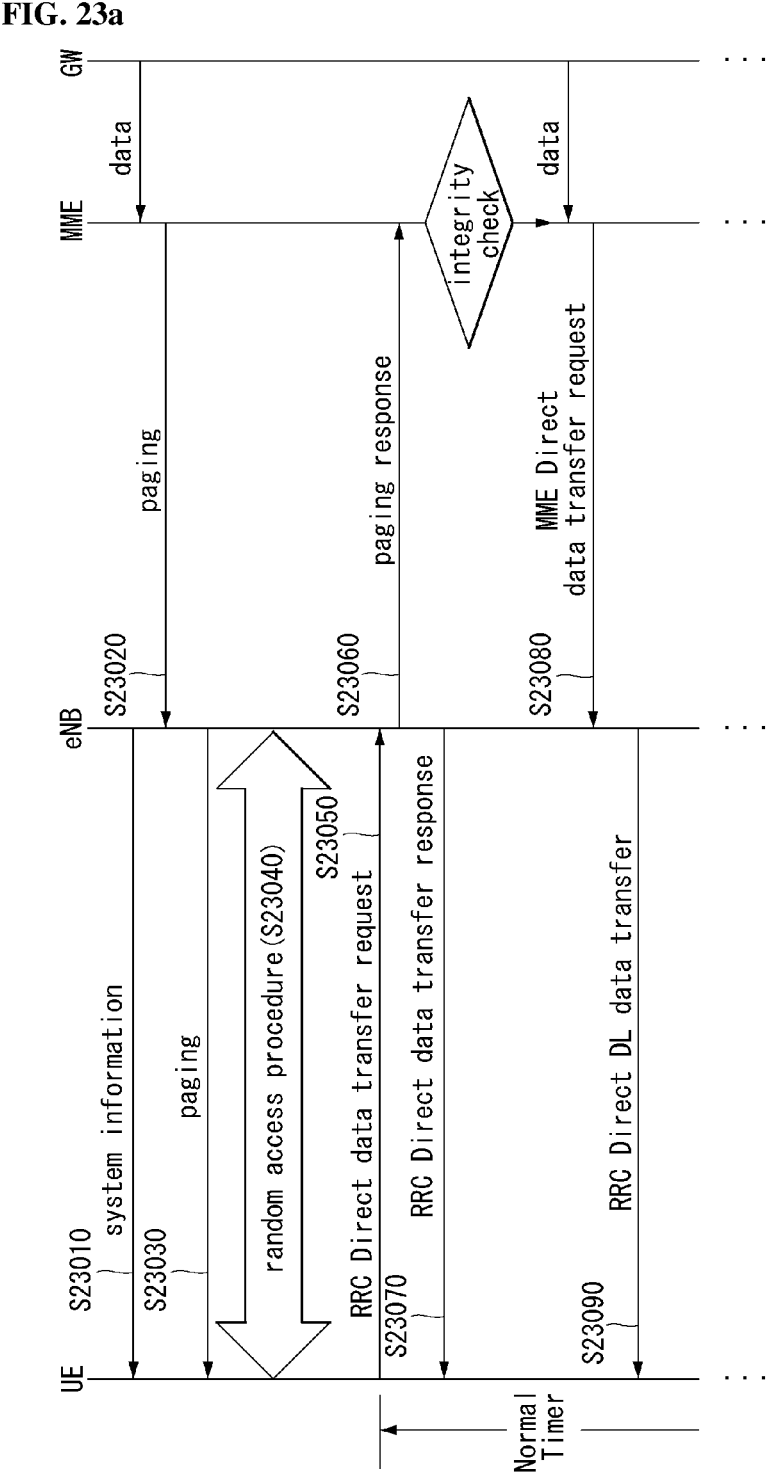
FIG. 23a and FIG. 23b is a flowchart illustrating an example of transmission and reception of additional downlink data during downlink data transmission and reception to which the present invention can be applied.
Figure 23B:
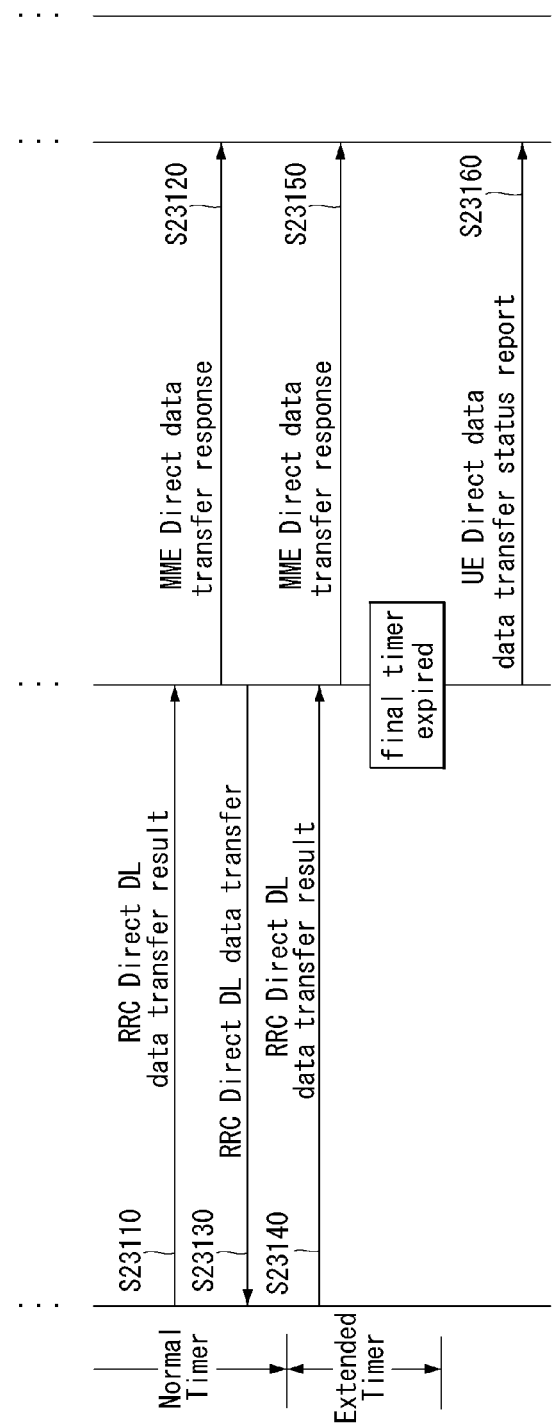

FIG. 23a and FIG. 23b is a flowchart illustrating an example of transmission and reception of additional downlink data during downlink data transmission and reception to which the present invention can be applied.

Referring to FIG. 23a and FIG. 23b, when additional downlink data (second data) is generated while the terminal receives downlink data (first data) for providing a low-latency service in an idle state, the additional downlink data may be received through the base station and the MME.

First, steps S23010 to S23070 are the same as the steps S21010 to S21070 in FIG. 21a, and thus the description thereof will be omitted.

In this case, the paging response message may include a normal timer value indicating a resource allocation time allocated to the terminal. The normal timer value may be shared through a message such as S1 Setup request, eNB Configuration Transfer or S1AP such as the paging response message.

Thereafter, when the second data is generated from the gateway or another gateway, the MME can receive the second data.

When the second data is transmitted to the MME before the MME Direct data transmission request message including the first data is transmitted to the base station, and the time is short for including the second data in the MME Direct data transmission request message but information on the second data can be included, the MME may transmit additional data information indicating information on the first data and the second data to be included in the MME Direct data transmission request message to the base station, (S23080).

The additional data information may include a time point information field indicating the time point to request extending the release of the resource (e.g., Temporary C-RNTI, C-RNTI) allocated to the terminal, a cause field indicating a reason in extension, and a QoSIE field indicating the characteristics and size of the data, and the like.

Thereafter, the base station may determine an extension period of resources allocated to the terminal in consideration of the time point included in the extension time information field, and may transmit to the terminal extension period information indicating the determined extension period with the first data to be included in the RRC Direct downlink data transmission message (S23090).

The release time point of the resource allocated to the terminal through the extension period information may be extended.

Thereafter, the MME may transmit the second data to the base station through the MME Direct data Transmission Request message (S23100), and the terminal may transmit the reception result of the first data to the base station to be included in to the RRC downlink data transmission result message (S23110).

The base station may transmit a result of receiving the first data received from the terminal to the MME in response to the MME Direct data Transmission Response message (S23120), and may transmit the second data received from the MME to the terminal to be included in the RRC Direct downlink data transmission message (S23130).

Thereafter, during the extension period, the base station may receive a RRC Direct downlink data transmission result message including the transmission result of the second data from the terminal (S23140), and may transmit the received second data transmission result may be transmitted to the MME to be included in the MME Direct data transmission response message and transmitted (S23150).

When the extension period has expired, the base station may transmit a report message (or a UE Direct data transmission status report message) to the MME to inform the MME that the extension period has expired (S23160).

In another embodiment of the present invention, when the MME has received the second data after the step (S23080) and cannot transmit the information of the second data in the step (S23080), but the data can be transmitted prior to the normal timer value, the following method can be applied.

In this case, the MME may transmit the second data and the additional data information to the base station through the MME Direct data transmission request message in the step (S23100), and the base station may transmit the additional data information at the step (S23130) other than the step (S23090).

In this case, in the additional data information, a cause field and a QoSIE field, which is duplicated information with the second data, may not be included, and whether the subsequent additional data is generated or not may be informed according to whether it is not included or not.

Figure 24A:
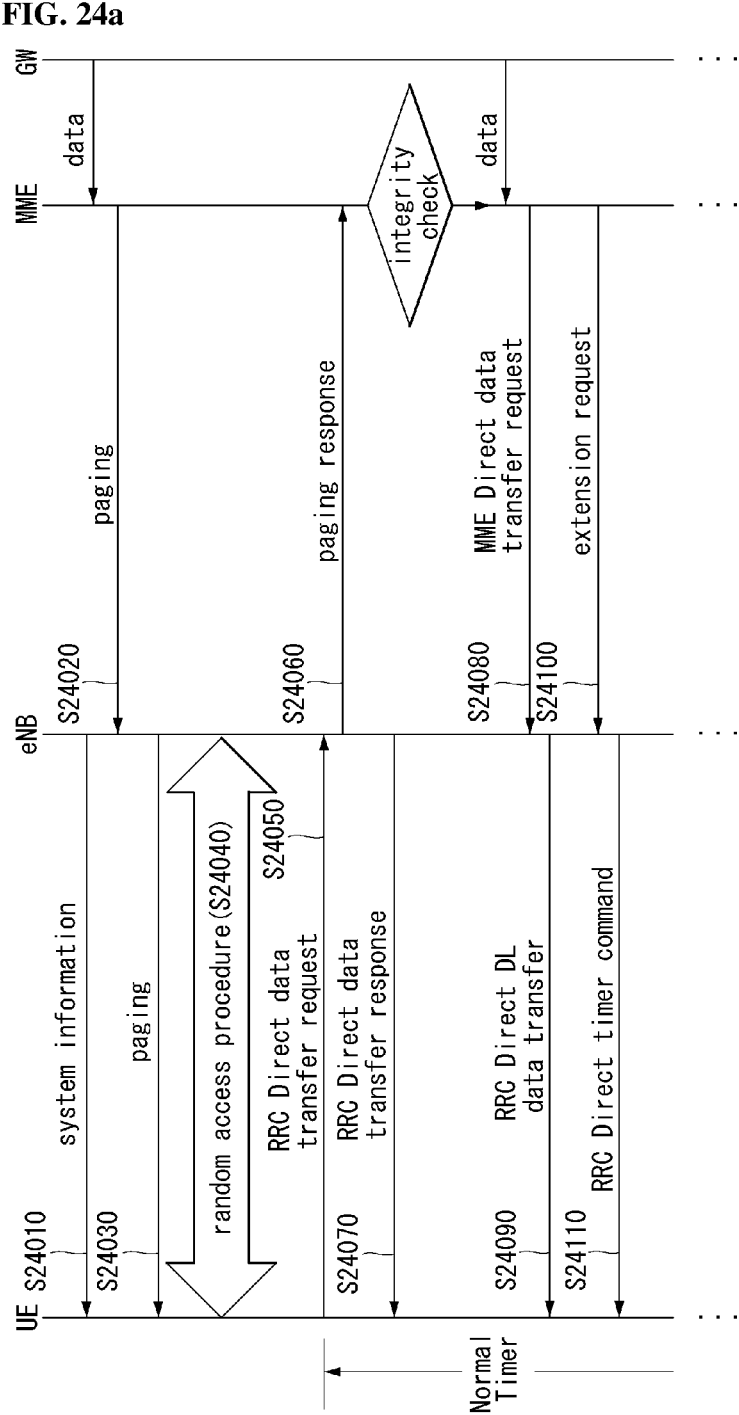
FIG. 24a and FIG. 24b is a flowchart illustrating yet another example of transmitting and receiving additional downlink data during downlink data transmission and reception to which the present invention can be applied.
Figure 24B:
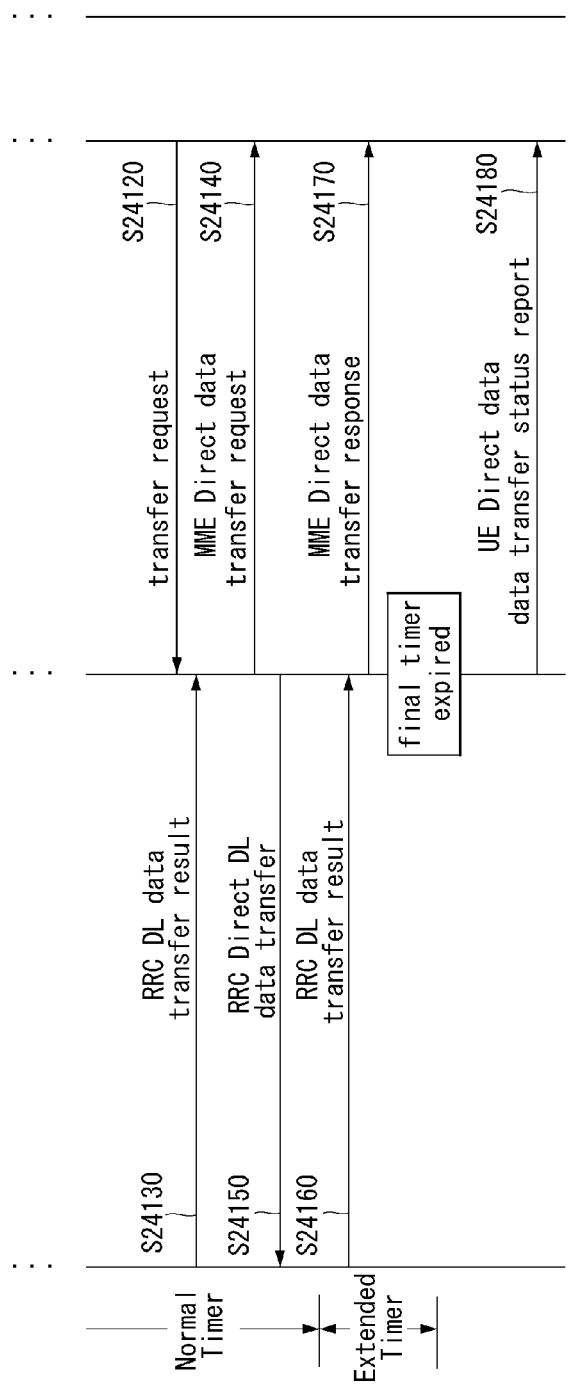

FIG. 24a and FIG. 24b is a flowchart illustrating yet another example of transmitting and receiving additional downlink data during downlink data transmission and reception to which the present invention can be applied.

Referring to FIG. 24a and FIG. 24b, different from the case describe in the FIG. 23, when the MME receives the second data after the step (S24080), and cannot transmit the information of the second data in the step (S24080), and the second data cannot be transmitted within the normal timer value, the MME may transmit the second data information to the base station through a separate message.

First, steps S24010 to S24070 are the same as the steps from S23010 to S23070 in the FIG. 23a, and thus description thereof will be omitted.

In this case, the paging response message may include a normal timer value indicating allocation time of the resource allocated to the terminal. The normal timer value may be shared through a message such as S1 Setup request, eNB Configuration Transfer or S1AP such as the paging response message.

Thereafter, when the second data is generated from the gateway or another gateway, the MME can receive the second data.

When the second data has transmitted to the MME after the MME Direct data transmission request message including the first data was transmitted to the base station, and the information on the second data and the second data cannot be included in the MME Direct data transmission request message, and it is difficult for the second data to be transmitted in the normal timer value, the second data can be transmitted to the terminal in the following method.

The MME may transmit the first data to be included in the MME Direct Data Transmission Request message to the base station (S24080), and the base station may transmit the first data to be included in the Direct downlink data transmission message to the terminal (S24090).

Thereafter, the MME may transmit an extension request message to the base station to extend the release time of resources allocated to the terminal (S24100).

The extension request message includes a time information field indicating a time point when a resource (e.g., Temporary C-RNTI, C-RNTI) allocated to the terminal is requested to be extended against being released, a cause field indicating a reason for extension, and a QoSIE field indicating the characteristics and size of the data, and the like.

Thereafter, the base station may determine an extension period of resources allocated to the terminal in consideration of the time point included in the extension time information field, and may transmit the extension period information indicating the determined extension period to the terminal through a RRC Direct Timer (DT) Command (S24110).

The release time point of the resources allocated to the terminal through the extension period information may be extended.

Thereafter, the MME may transmit the second data to the base station through an MME Direct data Transmission Request message (S24120), and the terminal may transmit the reception result of the first data to be included in the RRC downlink data transmission result message to the base station (S24130).

The base station may transmit a reception result of the first data received from the terminal to be included in the MME Direct data transmission response message to the MME (S24140), and may transmit the second data received from the MME to be included in the RRC Direct downlink data transmission message to the terminal (S24150).

Thereafter, during the extension period, the base station may receive a RRC Direct downlink data transmission result message including the transmission result of the second data from the terminal (S24160), and may transmit the received transmission result of the second data to be included in the MME Direct data transmission response message to the MME (S24170).

When the extension period has expired, the base station may transmit a report message (or a UE Direct data transmission status report message) to the MME to notify the MME that the extension period has expired (S24180).

Figure 25A:
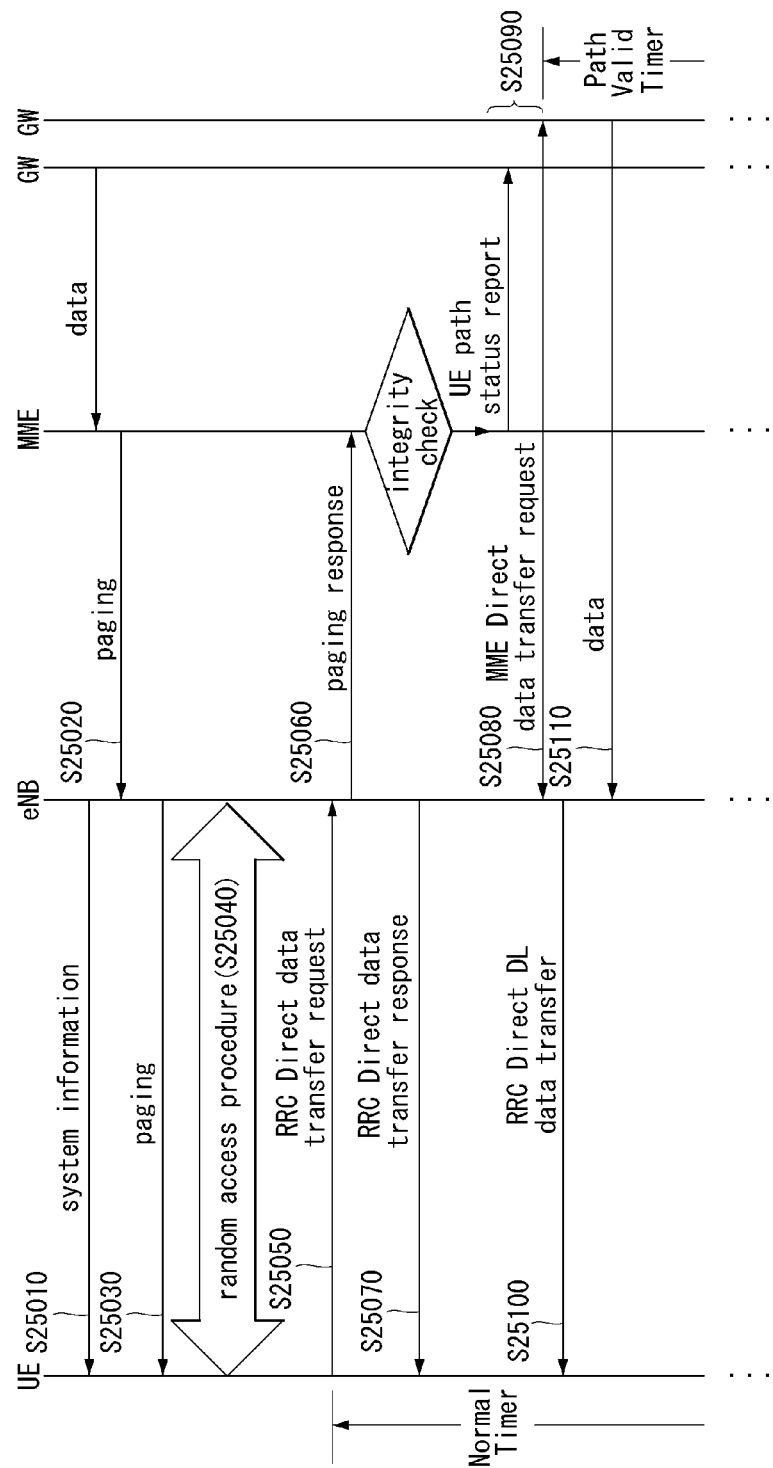
FIG. 25a and FIG. 25b is a flowchart illustrating yet another example of transmission and reception of additional downlink data during downlink data transmission and reception to which the present invention can be applied.
Figure 25B:
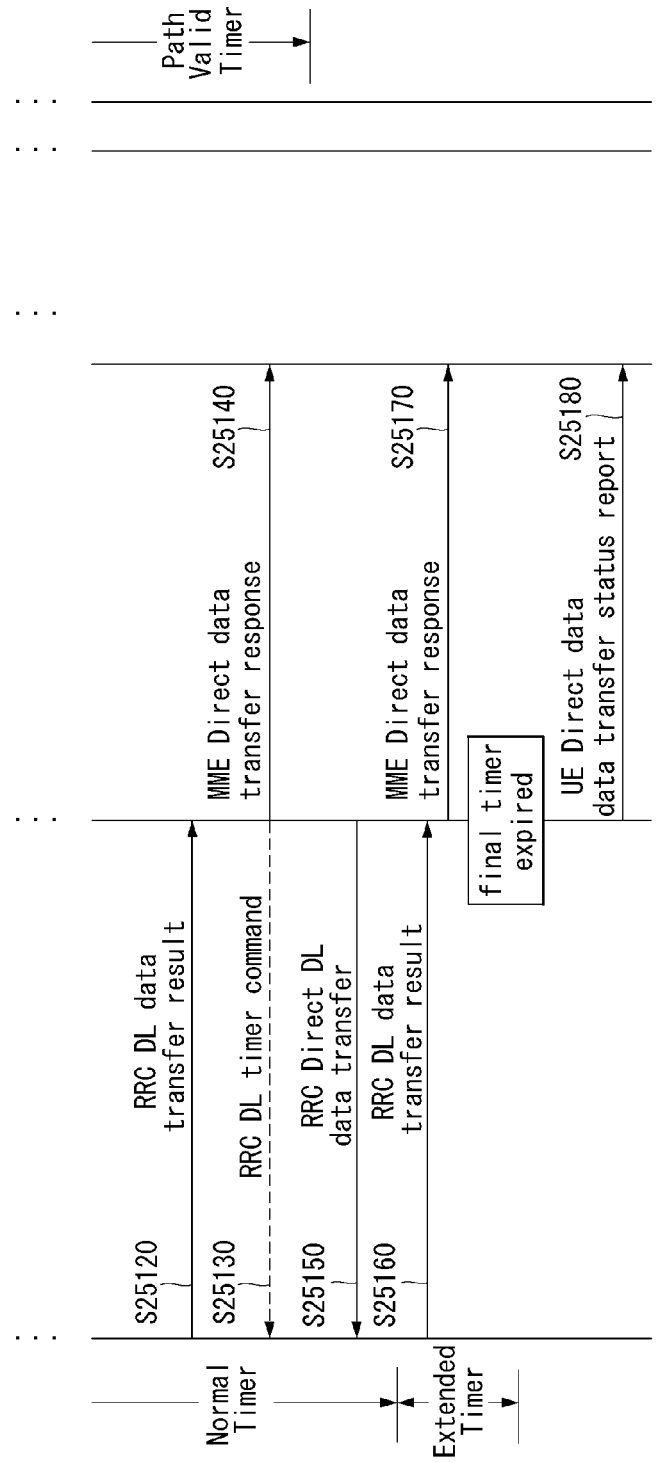

FIG. 25a and FIG. 25b is a flowchart illustrating yet another example of transmission and reception of additional downlink data during downlink data transmission and reception to which the present invention can be applied.

Referring to FIG. 25a and FIG. 25b, while the terminal receives downlink data (first data) for providing a low latency service in an idle state, when additional downlink data (second data) is generated, the additional downlink data may be received through the base station.

First, steps S25010 to S25070 are the same as the steps 23010 to S23070 of FIG. 23a, and thus description thereof will be omitted. In this case, the paging response message may include a Start Time value indicating a start time of a duration of a resource allocated to the terminal.

Thereafter, the MME may transmit the first data to be included in the MME Direct data transmission request message to the base station (S2507). In this case, the MME Direct data transmission request message may further include a Bearer IE field indicating information on one or more EPS bearer retained by the UE.

The Bearer IE field may include an EPS Bearer ID, a tunnel ID (e.g., GTP-TEID) corresponding to the EPS Bearer ID, an address of the gateway, an encryption algorithm supported by the terminal, encryption-related information such as a basic key (e.g., $K_{eNB}$) for generating keys to be used in the encryption and the like.

In this case, whether the encryption-related information is included or not may be determined depending on whether the first data is encrypted or the service type of the second data.

The MME may transmits the MME Direct data Transmission Request message and at the same time it may transmits a UE Path Status Report Message including a UE Path IE field to one or more gateways corresponding to the EPS Bearer ID (S25090).

The UE Path IE field may include the following information.

Terminal identifier such as an International Mobile Subscriber Identity (IMSI)
Data session identifier such as EPS Bearer ID
Tunnel ID for downlink data section identification purpose such as TEID (Tunnel Endpoint ID)
Base station identifier such as IP address or ECGI (E-UTRAN Cell Global Identifier)
Time when a path for downlink data is valid (Path Valid Timer): The remaining time value of Normal Timer ≥Path Valid Timer value (Path Valid Timer may be set to a smaller value than the remaining time value of normal timer in consideration of base station processing time such as scheduling)

Thereafter, the base station transmits the first data received from the MME to the terminal to be included in the RRC Direct downlink data transmission message (S25100).

When the second data to be transmitted to the terminal is transmitted to the gateway in the Path Validation Timer, the gateway may transmit immediately to the base station a message including the second data, and an EPS Bearer ID and a tunnel ID, and the like, corresponding to the second data, (S25110).

When an extension of the Normal Timer is required after the second data is transmitted from the gateway, the base station may transmit an RRC Direct Timer command indicating an extension of the Normal Timer to the terminal (S25130).

The RRC Direct timer command may include extension period information indicating an extension period.

Thereafter, when encryption of the second data is performed, the base station encrypts the second data with the AS key according to an encryption algorithm and encryption-related information in the Bearer IE, and transmits the encrypted second data to be included in the RRC Direct downlink data transmission message to the terminal (S25150).

In this case, when the base station does not transmit the RRC Direct Timer command, the extension period information may be included in the RRC Direct downlink data transmission message.

Thereafter, during the extension period, the base station may receive a RRC Direct downlink data transmission result message including the transmission result of the second data from the terminal (S25160), and may transmit the received transmission result of the second data to be included in the MME Direct data transmission response message to the MME (S25170).

When the extension period has expired, the base station may transmit a report message (or a UE Direct data transmission status report message) to the MME to notify the MME that the extension period has expired (S25180).

Figure 26:
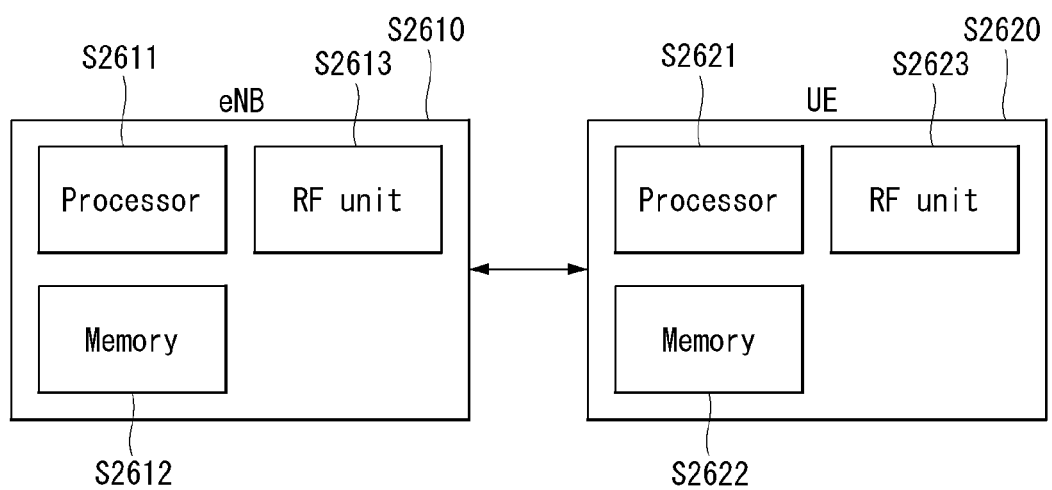
FIG. 26 is a diagram illustrating an example of an internal block diagram of a wireless device to which the present invention can be applied.

FIG. 26 is a diagram illustrating an example of an internal block diagram of a wireless device to which the present invention can be applied.

Herein, the wireless device may be a base station and a UE, and the base station includes both a macro base station and a small base station.

As shown in FIG. 26, the base station 2610 and the UE 2620 include a communication unit (transceiver unit, RF unit) 2613 and 2623, a processor 2611 and 2621, and a memory 2612 and 2622.

In addition, the base station and the UE may further include an input unit and an output unit.

The communication unit 2613 and 2623, the processor 2611 and 2621, an input unit and an output unit, and the memory 2612 and 2622 are functionally connected to perform the method proposed in the present description.

When receiving information produced by a physical layer (PHY) protocol, the communication unit (or the transmission/reception unit or the RF unit) 2613, 2623 moves the received information to an RF spectrum, performs filtering and amplification on the information, and sends the signal to an antenna. Furthermore, the communication unit moves the RF signal, received from the antenna, to a band that may be processed in the PHY protocol and performs filtering on the RF signal.

Furthermore, the communication unit may include a switch function for switching the transmission and reception functions.

The processor 2611 and 2621 implements the functions, processes, and/or methods proposed in the present description. The layers of a radio interface protocol may be implemented by the processor.

The processor may be represented by a control module, a controller, a control unit, a computer, or the like.

The memory 2612 and 2622 is connected to the processor and store protocols and parameters for performing an uplink resource allocation method.

The processor 2611, 2621 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module process or function for performing the functions.

The module may be stored in the memory and may be executed by the processor. The memory may be placed inside or outside the processor and may be connected to the processor by well-known means.

The output unit (or display unit) is controlled by the processor and outputs information output by the processor along with a key entry signal generated from a key input unit and various information signals from the processor.

The present invention described above, may be variously modified and changed by those skilled in the art to which the present invention pertains without departing from the scope of the technical concept of the present invention, and thus are not limited to the aforementioned embodiments and accompanying drawings.

INDUSTRIAL APPLICABILITY

Although the RRC connection method in the wireless communication system of the present invention has been described with reference to the example applied to the 3GPP LTE/LTE-A system, it can be applied to various wireless communication systems other than the 3GPP LTE/LTE-A system.

The invention claimed is:

1. A method for transmitting and receiving data for providing a low latency service in a wireless communication system supporting the low latency service, the method performed by a terminal, the method comprising:
   performing a random access procedure with a base station;
   transmitting a first request message requesting transmission of first data for a low latency service to the base station through a resource allocated from the random access procedure;
   receiving a response message including first resource information for transmission of the first data in response to the first request message;
   generating second data for providing the low latency service before the first data is transmitted to the base station,
   wherein the second data is transmitted to base station without an additional random access procedure;
   transmitting a transmission message including the first data to the base station based on the first resource information,
   wherein the transmission message further includes data information related to the second data for providing the low latency service,
   wherein the data information includes first release time point information related to extension of release time point of a first identifier allocated to the terminal;
   receiving second resource information for transmission of the second data from the base station; and
   transmitting the second data based on the second resource information to the base station,
   wherein the second data is transmitted to a gateway (GW) and not received by a mobility management entity (MME), and
   wherein the method is performed in an idle state of the terminal.

2. The method according to claim 1,
   wherein the first request message further includes a first Quality of Service (QoS) Information Element (IE) field indicating a characteristic of the first data, and
   wherein the data information includes at least one of a cause field indicating a reason, or a second QoS IE field indicating a characteristic of the second data.

3. The method according to claim 1, further comprising:
   receiving system information from the base station,
   wherein the system information includes at least one of a support field indicating whether the base station supports transmission and reception of the low latency service data in an idle state of the terminal, or a security algorithm field indicating the security algorithm field which the base station supports.

4. The method according to claim 3,
   wherein the security algorithm field includes at least one of an encryption algorithm supported by the base station for encrypting the transmission message or an integrity algorithm for verifying whether the transmission message has been changed.

5. The method according to claim 1,
   wherein the first request message includes at least one of a UE ID IE field indicating the terminal or a Tx indicator field indicating transmission and reception of the first data.

6. The method according to claim 1,
   wherein the transmission message further includes a security information element field for determining a validity of the terminal.

7. The method according to claim 6,
   wherein the security information includes at least one of a security header type field indicating whether the transmission message is encrypted or integrity protection is applied to determine whether the transmission message is changed or damaged or an authentication code for determining whether the low latency service data has been changed.

8. The method according to claim 1, further comprising:
   receiving a first result message including at least one of a first result field indicating a result of transmission of the first data or an extension time information indicating an extension time of a release time point of an identifier for identifying the terminal by the base station;
   receiving a second result message including a second result field indicating a result of transmission of the second data during the extension time;
   performing the random access procedure with the base station after completing transmission of the second data,
   wherein the base station generates downlink data for providing the low latency service; and
   determining whether third data for providing the low latency service is generated or not before or after transmitting a second request message requesting reception of the downlink data,
   wherein the second request message including Tx indicator is transmitted to the base station when the third data is generated before transmitting the second request message
   wherein the Tx indicator indicates bidirectional(uplink/downlink) data transmission and reception,
   wherein downlink data transfer result message for the downlink data is transmitted to the base station when the third data is generated after transmitting the second request message, and
   wherein the downlink data transfer result message includes second release time point information related to extension of release time point of a second identifier allocated to the terminals.

9. A method for transmitting and receiving data for providing a low latency service in a wireless communication system supporting the low latency service, the method performed by a base station, the method comprising:
performing a random access procedure with a terminal;
receiving a request message requesting transmission of first data for a low latency service from the terminal using a resource allocated to the terminal through the random access procedure;
transmitting a response message including first resource information for transmission of the first data in response to the request message;
receiving a transmission message including the first data from the base station based on the first resource information,
wherein the transmission message further includes data information related to second data for providing the low latency service,
wherein the second data is generated before the first data is transmitted to the base station,
wherein the second data is transmitted to base station without an additional random access procedure, and
wherein the data information includes release time point information related to extension of release time point of an identifier allocated to the terminal;
transmitting second resource information for transmission of the second data to the terminal; and
receiving the second data from the terminal based on the second resource information; and
transmit the second data to gateway (GW) directly,
wherein the second data is not received by a mobility management entity (MME), and
wherein the method is performed in an idle state of the terminal.

10. The method according to claim 9,
wherein the request message further includes a first Quality of Service (QoS) Information Element (IE) field indicating a characteristic of the first data, and
wherein the data information includes at least one of a cause field indicating a reason, or a second QoS IE field indicating a characteristic of the second data.

11. The method according to claim 9, further comprising:
transmitting system information to the terminal, wherein the system information includes at least one of a support field indicating whether the base station supports transmission and reception of the low latency service data in an idle state of the terminal, or a security algorithm field indicating the security algorithm field which the base station supports.

12. The method according to claim 11, wherein the security algorithm field includes at least one of an encryption algorithm supported by the base station for encrypting the transmission message or an integrity algorithm for verifying whether the transmission message has been changed.

13. The method according to claim 9,
wherein the request message includes at least one of a UE ID IE field indicating the terminal or a Tx indicator field indicating transmission and reception of the first data.

14. The method according to claim 9,
wherein the transmission message further includes a security information element field for determining a validity of the terminal.

15. The method according to claim 9,
wherein the security information includes at least one of a security header type field indicating whether the transmission message is encrypted or integrity protection is applied to determine whether the transmission message is changed or damaged or an authentication code for determining whether the low latency service data has been changed.

16. The method according to claim 9, further comprising:
transmitting a data transmission request message including the first data to a Mobility Management Entity (MME);
receiving a data transmission response message from the MME in response to the data transmission request message; and
transmitting the second data to the MME or gateway.

17. The method according to claim 16, further comprising:
when transmitting the second data to the MME, receiving a transmission result message including a transmission result field indicating a transmission result of the second data from the MME.

18. The method according to claim 16, when transmitting the second data to the gateway, wherein the transmission message further includes at least one of an EPS Bearer ID for identifying a session of the second data or a data size field indicating a size of the second data.

19. A terminal for transmitting and receiving data in a wireless communication system supporting a low latency service, the terminal comprising:
a communication configured to transmit and receive a radio signal with external; and
a processor operatively coupled to the communication unit, and control to:
perform a random access procedure with a base station;
transmit a first request message requesting transmission of first data for a low latency service to the base station through a resource allocated from the random access procedure;
receive a response message including first resource information for transmission of the first data in response to the first request message;
generate second data for providing the low latency service before the first data is transmitted to the base station,
wherein the second data is transmitted to base station without an additional random access procedure;
transmit a transmission message including the first data to the base station based on the first resource information,
wherein the transmission message further includes data information related to the second data for providing the low latency service,
wherein the data information includes first release time point information related to extension of release time point of a first identifier allocated to the terminal;
receive second resource information for transmission of the second data from the base station; and
transmit the second data based on the second resource information to the base station,
wherein the second data is transmitted to a gateway (GW) and not received by a mobility management entity (MME), and
wherein the method is performed in an idle state of the terminal.

20. A base station for transmitting and receiving data in a wireless communication system supporting a low latency service, the method performed by a base station, the base station comprising:
a communication unit configured to transmit and receive a radio signal with external; and a processor operatively coupled to the communication unit, and control to:

perform a random access procedure with a terminal;

receive a request message requesting transmission of first data for a low latency service from the terminal using a resource allocated to the terminal through the random access procedure;

transmit a response message including first resource information for transmission of the first data in response to the request message;

receive a transmission message including the first data from the base station based on the first resource information, wherein the transmission message further includes data information related to second data for providing the low latency service, wherein the second data is generated before the first data is transmitted to the base station, wherein the second data is transmitted to base station without an additional random access procedure, and wherein the data information includes release time point information related to extension of release time point of an identifier allocated to the terminal;

transmit second resource information for transmission of the second data to the terminal;

receive the second data from the terminal based on the second resource information; and transmit the second data to gateway (GW) directly, wherein the second data is not received by a mobility management entity (MME), and wherein the method is performed in an idle state of the terminal.

* * * * *